(12) United States Patent
Grosse et al.

(10) Patent No.: US 10,399,773 B2
(45) Date of Patent: Sep. 3, 2019

(54) TRANSPORT VEHICLE AND METHOD FOR STORING OR REMOVING PIECE GOODS, AND STORAGE SYSTEM

(71) Applicant: TGW Mechanics GmbH, Wels (AT)

(72) Inventors: Eric Grosse, Langen (DE); Thomas Gruber, Pettenbach (AT); Martin Rausch, Gmunden (AT); Johannes Schauer, St. Marienkirchen a.d. Polsenz (AT)

(73) Assignee: TGW Mechanics GmbH, Wels (AT)

( * ) Notice: Subject to any disclaimer, the term of this patent is extended or adjusted under 35 U.S.C. 154(b) by 93 days.

(21) Appl. No.: 15/577,455

(22) PCT Filed: May 23, 2016

(86) PCT No.: PCT/AT2016/050153
§ 371 (c)(1),
(2) Date: Apr. 12, 2018

(87) PCT Pub. No.: WO2016/191777
PCT Pub. Date: Dec. 8, 2016

(65) Prior Publication Data
US 2018/0370726 A1 Dec. 27, 2018

(30) Foreign Application Priority Data

May 29, 2015 (AT) .............................. A 50439/2015
Dec. 23, 2015 (AT) .............................. A 51101/2015

(51) Int. Cl.
*B65G 1/04* (2006.01)
*B65G 39/12* (2006.01)
(Continued)

(52) U.S. Cl.
CPC ......... *B65G 1/0492* (2013.01); *B65G 1/0457* (2013.01); *B65G 1/1371* (2013.01);
(Continued)

(58) Field of Classification Search
CPC combination set(s) only.
See application file for complete search history.

(56) References Cited

U.S. PATENT DOCUMENTS 4,784,201 A * 11/1988 Palinkas .................. B60B 9/12
152/12
8,425,173 B2 * 4/2013 Lert ....................... B65G 1/045
414/280
(Continued)

FOREIGN PATENT DOCUMENTS

AT          14 556 U1      1/2016
DE      195 34 291 A1      3/1997
(Continued)

OTHER PUBLICATIONS

Response of Austrian Patent Attorney to the European Patent Office in PCT/AT2016/050153, dated Aug. 18, 2017, with English translation of relevant parts.
(Continued)

*Primary Examiner* — Kyle O Logan
(74) *Attorney, Agent, or Firm* — Collard & Roe, P.C.

(57) ABSTRACT

The invention relates to a transport vehicle (7) for storing unit loads in a storage rack (1) and removing unit loads from a storage rack. The transport vehicle comprises a base frame (27), running wheels (29) which rest on a first guide (36) in a rollable manner, the first guide extending parallel with the longitudinal direction of the storage rack and in a first guide plane extending parallel with a driving plane, and a guide unit (31; 60; 62; 74; 86) which is mounted to the base frame via a bearing device (46; 61; 63; 75; 87) and has guide wheels (49) which rest on a second guide (47; 88) and are rollable in guide sections (48), the second guide extending parallel with the longitudinal direction of the storage rack and in a second guide plane intersecting the driving plane in order to move the transport vehicle in a guided manner. The
(Continued)

Figure 1:
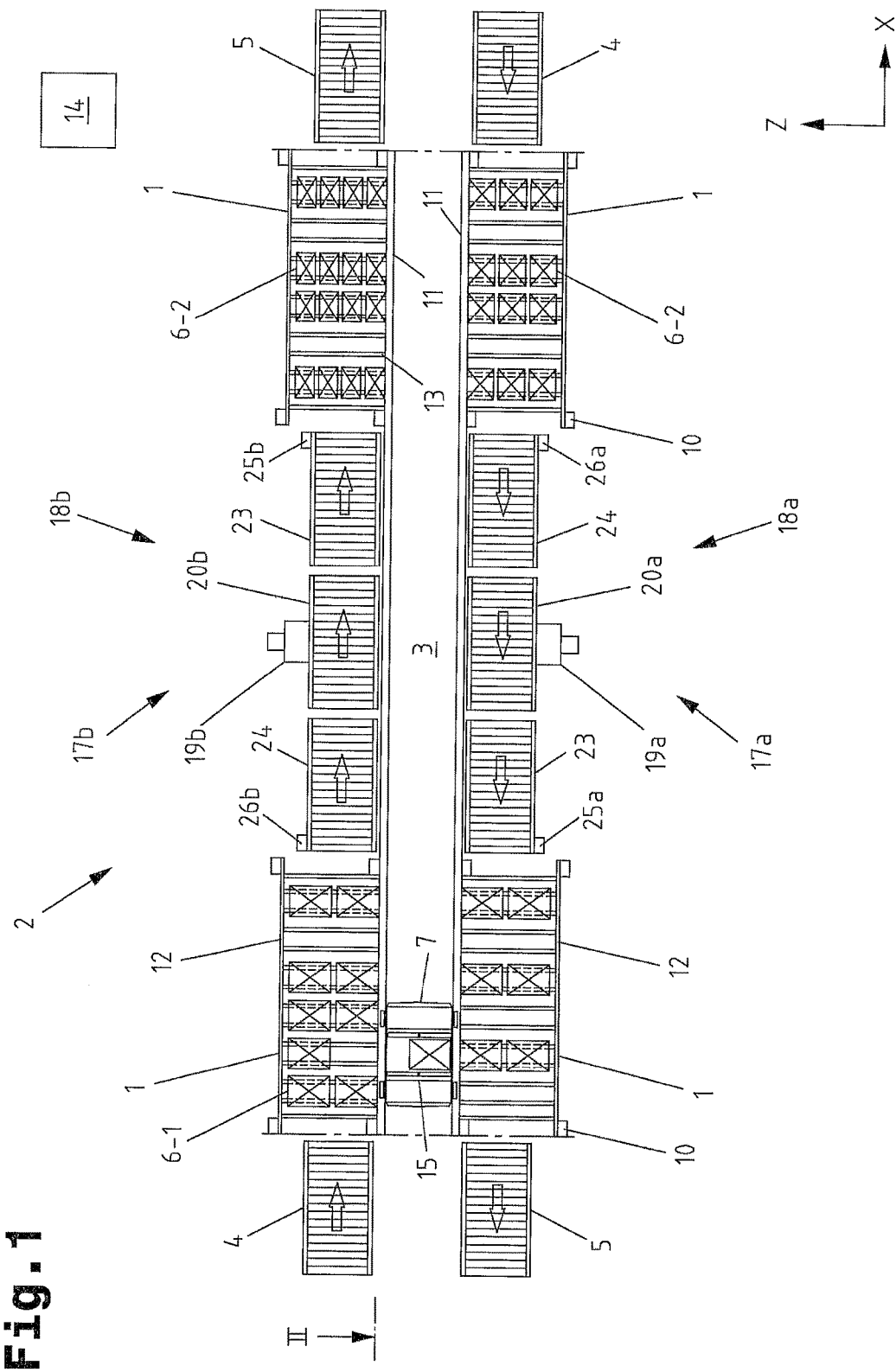

bearing device comprises an elastic compensating element (53; 54; 67, 68; 79, 80) which is arranged in such a way that one of the guide wheels is movable relative to the base frame. The invention further relates to a method for storing different unit loads on differently classified storage spaces.

14 Claims, 28 Drawing Sheets

(51) Int. Cl.
  *B65G 1/137* (2006.01)
  *B65G 39/09* (2006.01)
  *B65G 43/08* (2006.01)

(52) U.S. Cl.
  CPC ............ *B65G 39/09* (2013.01); *B65G 39/12* (2013.01); *B65G 43/08* (2013.01); *B65G 2203/0208* (2013.01); *B65G 2207/32* (2013.01); *B65G 2207/40* (2013.01)

(56) References Cited

U.S. PATENT DOCUMENTS

| | | | |
|---|---|---|---|
| 8,790,061 B2* | 7/2014 | Yamashita | B65G 1/0492 414/280 |
| 8,974,168 B2* | 3/2015 | Yamashita | B65G 1/065 414/279 |
| 9,266,675 B2* | 2/2016 | Yamashita | B65G 1/0492 |
| 9,522,781 B2* | 12/2016 | Hortig | B65G 1/065 |
| 9,630,777 B2* | 4/2017 | Yamashita | B65G 1/0414 |
| 9,764,900 B2* | 9/2017 | Grosse | B60M 1/34 |
| 2012/0189409 A1* | 7/2012 | Toebes | B65G 1/0492 414/273 |
| 2014/0277689 A1* | 9/2014 | Salichs | B65G 1/1371 700/214 |

FOREIGN PATENT DOCUMENTS

| | | |
|---|---|---|
| DE | 10 2004 046 176 A1 | 4/2006 |
| EP | 0 245 789 A2 | 11/1987 |
| EP | 1 627 830 A1 | 2/2006 |
| EP | 2 327 643 A1 | 6/2011 |
| EP | 2 351 698 A1 | 8/2011 |
| EP | 2 419 365 B1 | 2/2012 |
| EP | 2 436 620 A2 | 4/2012 |
| EP | 2 530 034 A1 | 12/2012 |
| EP | 2 530 035 A1 | 12/2012 |
| EP | 2 543 446 A1 | 1/2013 |
| EP | 2 543 611 A1 | 1/2013 |
| EP | 2 754 625 A1 | 7/2014 |
| EP | 2 759 494 A1 | 7/2014 |
| EP | 2 526 032 B2 | 7/2016 |
| FR | 433 812 A | 1/1912 |
| JP | H02-70571 A | 3/1990 |
| JP | H06-64712 A | 3/1994 |
| JP | H09-315522 A | 12/1997 |
| JP | 2000-118639 A | 4/2000 |
| JP | 2000351417 A | 12/2000 |
| JP | 3249900 B2 | 1/2002 |
| JP | 2004-276622 A | 10/2004 |
| JP | 2004-359436 A | 12/2004 |
| JP | 2005-047696 A | 2/2005 |
| JP | 2005-188033 A | 7/2005 |
| JP | 2005-219832 A | 8/2005 |
| JP | 2008-143660 A | 6/2008 |
| JP | 2010-070300 A | 4/2010 |
| JP | 2013-237520 A | 11/2013 |
| WO | 2012/044734 A1 | 4/2012 |
| WO | 2012/106744 A1 | 8/2012 |
| WO | 2012/106745 A1 | 8/2012 |
| WO | 2013/006879 A2 | 1/2013 |
| WO | 2013/013252 A1 | 1/2013 |
| WO | 2013/090970 A2 | 6/2013 |
| WO | 2015/027261 A1 | 3/2015 |

OTHER PUBLICATIONS

International Search Report of PCT/AT2016/050153, dated Nov. 8, 2016.

* cited by examiner

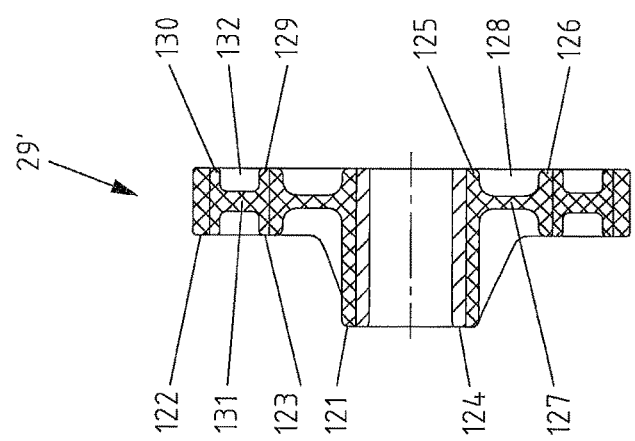
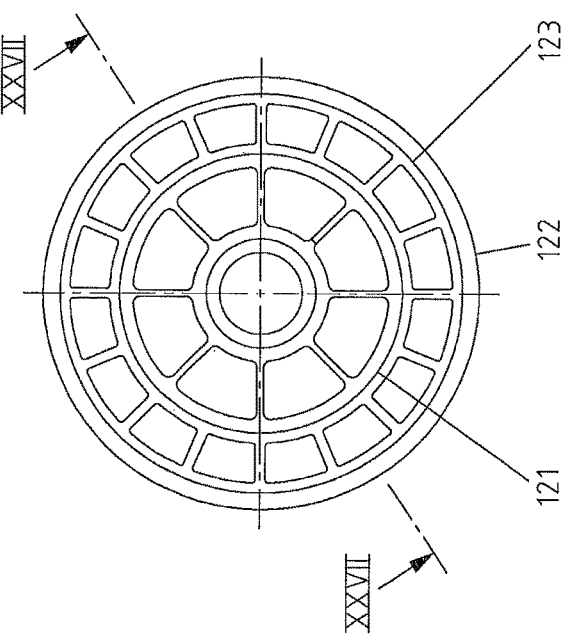
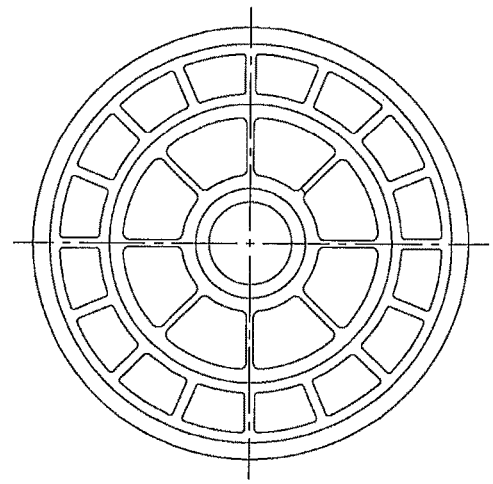

TRANSPORT VEHICLE AND METHOD FOR STORING OR REMOVING PIECE GOODS, AND STORAGE SYSTEM

CROSS REFERENCE TO RELATED APPLICATIONS

This application is the National Stage of PCT/AT2016/050153 filed on May 23, 2016, which claims priority under 35 U.S.C. § 119 of Austrian Application Nos. A 50439/2015 filed on May 29, 2015, and A 51101/2015 filed on Dec. 23, 2015, the disclosures of which are incorporated by reference. The international application under PCT article 21(2) was not published in English.

The invention relates to a transport vehicle for storing unit loads in a storage rack and removing unit loads from a storage rack in a storage system having driving planes lying one above the other and extending horizontally in front of the storage rack along which a transport vehicle can be moved, and the transport vehicle comprises a base frame and running wheels which rest on a first guide in a rollable manner and are rotatably mounted on the base frame, the first guide extending parallel with the longitudinal direction of the storage rack and in a first guide plane extending parallel with the driving plane, and at least one guide unit which is mounted on the base frame via a bearing device and which has guide wheels which rest on a second guide in a rollable manner against guide sections facing away from one another, the guide wheels being rotatably mounted on the bearing device, and the second guide extends parallel with the longitudinal direction of the storage rack and in a second guide plane intersecting the driving plane in order to move the transport vehicle during the traveling movement along the storage rack in a guided manner transversely to the second guide plane, and a travel drive which is coupled with at least one running wheel. The invention further comprises a storage system having such a transport vehicle.

From the prior art based on EP 2 327 643 A1, EP 2 543 611 A1, EP 2 754 625 A1, EP 2 530 035 A1 and WO 2013/090970 A2, storage systems are known which comprise a first storage rack having adjacently disposed storage channels in rack levels lying one above the other, a second storage rack having adjacently disposed storage channels in rack levels lying one above the other, a rack aisle extending in the x-direction between the first storage rack and second storage rack, and a plurality of transport vehicles which can be moved in the x-direction on guide tracks for storing unit loads in the storage rack and retrieving unit loads from the storage rack. These transport vehicles are so-called single-level storage and retrieval devices and therefore service one rack level. These storage systems further comprise a load handling unit having at least one unit load lifting device with a transport device which can be raised and lowered for storing and/or retrieving unit loads and a buffer device with waiting devices for temporarily buffering unit loads. The unit load lifting device is connected to a conveyor system for conveying unit loads in and out, to and away from the unit load lifting device. The guide tracks are arranged in pairs on every rack level and are mounted to the storage racks, one of the guide tracks on every rack level forming a first guide and a second guide. The transport vehicles are able to move alongside the storage channels and waiting devices via the guide tracks in order to transport unit loads between the storage channels and waiting devices. The first guide extends parallel with the longitudinal direction of the storage racks and in a first guide plane extending parallel with the rack level. The second guide extends parallel with the longitudinal direction of the storage racks and in a second guide plane extending substantially perpendicular to the rack level.

The transport vehicle, such as known from EP 2 351 698 A1, EP 2 526 032 A1, EP 2 530 034 A1, EP 2 759 494 A1 and WO 2013/013252 A1 for example, comprises a base frame, running wheels, a transport device for transferring unit loads into the storage channel and retrieving unit loads from the storage channel, a receiving platform, a travel drive, an electronic control unit and at least one guide unit. The receiving platform is configured to transport at least one unit load. The transport device comprises telescopic units disposed parallel with the longitudinal sides of the receiving platform which respectively have a base frame, a first rail displaceable relative to the base frame and a second rail displaceable relative to the first rail. At their oppositely lying end regions, the second rails are each provided with an outer transport element respectively and at least one inner transport element disposed in between. The transport elements are displaceable between an initial position moved back from the unit load and an operating position gripping the unit load.

The running wheels lie on the first guide in a rollable manner and are mounted on the base frame so as to be e. At least one of the running wheels is driven by the travel drive.

The guide unit is fixedly mounted on the base frame via a bearing device and has guide wheels lying on the second guide in a rollable manner on mutually spaced and parallel guide sections, the guide wheels being rotatably mounted on the bearing device. The transport vehicle is guided during the traveling movement along the storage racks in the guide plane perpendicular to the second guide plane, as described in WO 2013/006879 A2 for example. The transport vehicle is forcibly guided along the guide track by means of the guide wheels.

A serious problem that has now been found with these known storage systems is that guiding inaccuracies caused by manufacturing tolerances on the second guide have a direct impact on the guiding of the transport vehicle. The same applies when traveling over connecting joints between mutually connected guide tracks. With higher demands for efficiency being placed on the storage system, high travel speeds are required of the transport vehicles and these guiding inaccuracies are transmitted to the storage racks in the form of vibrations. The more transport vehicles there are being used in a storage system, the more these vibrations cause "rocking" and there is a risk that the unit loads will shift in the storage channels in an undefined manner. The actual storage position of the unit load in the storage channel then no longer corresponds to the storage position in which the unit load was deposited in the storage channel by the transport device. As a result, the transport device is not able to grip a unit load which has to be retrieved from a storage channel or collides with the unit load. This has dramatic consequences for the efficiency and availability of a storage system.

It has also been found in practice that as speed increases, the transport vehicles create turbulent air flows which cause undesired shifting of the unit loads in the storage rack. As a result, the transport device is not able to grip a unit load which has to be retrieved from a storage channel or collides with the unit load, as described above. This phenomenon can be observed not just with storage systems having transport vehicles (single-level storage and retrieval devices) disposed in driving planes lying one above the other but also in storage systems having a transport vehicle that is movable along the storage rack in a first direction (x-direction) and the transport device is movable into the storage rack in a second direction (z-direction) and is disposed on a lifting platform that can be raised/lowered.

Figure 16:
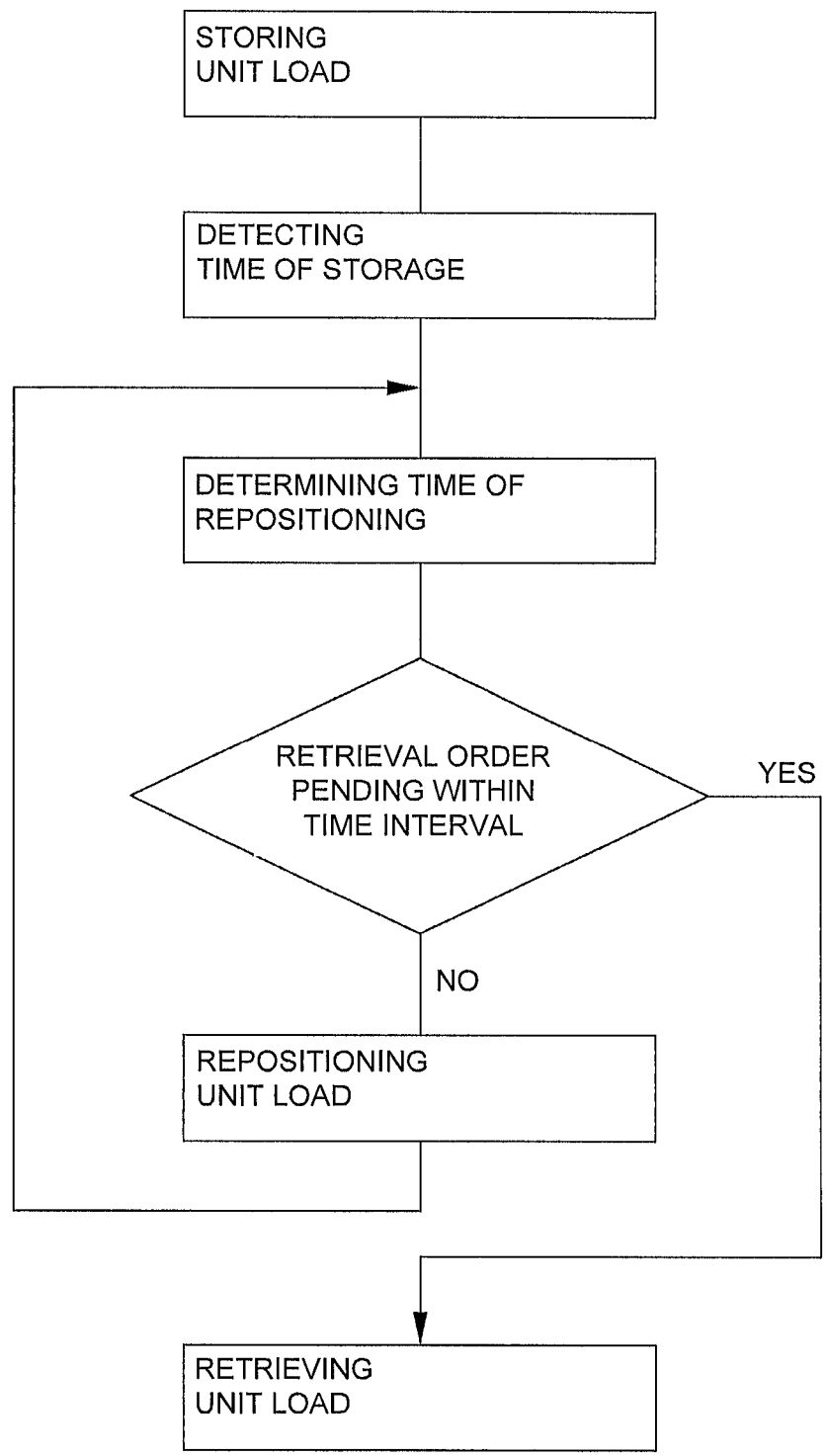

Based on one control method known from the prior art, after a defined time interval, those unit loads for which there is no retrieval order within this time interval are re-positioned, as illustrated in FIG. 16. To this end, in a first step, the time of storage of every unit load is stored and, in a second step, a time of repositioning is determined by a control device. The time of repositioning is based on empirical calculations, for example, and is based on the fact that at this time, the unit load can be handled by the transport device without being damaged. If the unit load were not re-positioned by the end of the time of repositioning, the transport device would no longer be able to grip the unit load or the transport device would collide with the unit load. The time interval is calculated from the time of storage and time of repositioning. In a third step, retrieval orders that were previously electronically detected by the control device are evaluated. If, within the time interval, there is no retrieval order for a unit load that has been transferred to the storage rack, the unit load has to be positioned in the x-direction and z-direction again. In order to make this shifting process as efficient as possible, the x-positioning and z-positioning take place within the storage rack. Thereafter, a time of repositioning is calculated by the control device again and this unit load is repositioned again provided there is also no retrieval order pending within the time interval between the preceding time of repositioning and subsequent time of repositioning. However, if a retrieval order occurs within the time interval between the time of storage and the time of repositioning, repositioning is not absolutely necessary.

If a plurality of unit loads that have a low turnaround frequency are being stored in a storage rack, the transport vehicle and transport device also have to perform a large number of repositioning operations, which has a negative effect on the availability and power consumption of the storage system. The storage efficiency can also be impaired because the capacities of the of the transport vehicle and transport device are tied up with repositioning operations.

The underlying objective of the invention is to propose a transport vehicle and a storage system as well as a method for storing unit loads in a storage rack of the storage system, whereby reliable storage operation can be guaranteed, even with demands for increased efficiency.

The objective of the invention is achieved due to the fact that the bearing device has at least one elastically flexible compensating element which is arranged and designed in such a way that at least one of the guide wheels is movable relative to the base frame. The advantage of this is that guiding inaccuracies which might occur due to unevenness on the second guide and/or on a connecting joint between mutually connected guides are compensated by means of the compensating element, and the transport vehicle barely causes any vibrations on/in the storage rack even at high travel speeds. Manufacturing tolerances on the second guide therefore have no negative effects on the accuracy with which the unit loads are deposited in the storage channels. The guides used may be of a lower production quality and be of longer guide lengths. The installation costs for a storage system are therefore reduced. The storage rack may also be based on a thin-walled design and acquisition costs reduced. Any number of transport vehicles based on the invention can be used in a storage system. Such a storage system is distinctive due to a high availability.

It is also of advantage if the bearing device comprises a bearing body and an elastically flexible first compensating element, and the guide wheels are rotatably mounted at a fixed distance on the bearing body, and the first compensating element is disposed between the base frame and the bearing body and is configured so that the bearing body is movable relative to the base frame by means of the guide wheels. The elastically flexible first compensating element may be provided in the form of a preferably biased spring element. This embodiment is distinctive due to its compact structure and can be very easily retrofitted on transport vehicles already in operation. In this respect, the elastically flexible compensating element may be provided in the form of a damping plate which absorbs compressive forces acting in the direction perpendicular to the plate plane and thus reduces kinetic energy. Depending on shape deviation on the second guide, the compressive forces may act in the opposite direction.

Based on another embodiment of the invention, the bearing device has a bearing body, an elastically flexible first compensating element and an elastically flexible second compensating element, and the guide wheels are rotatably mounted at a fixed distance on the bearing body and the compensating elements are disposed on both sides of the base frame and one of the compensating elements is disposed between the base frame and the bearing body and the compensating elements are designed such that the bearing body is movable relative to the base frame by means of the guide wheels. The elastically flexible compensating elements are respectively formed by a preferably biased spring element. Based on this embodiment, the base frame is accommodated between the first compensating element and second compensating element so that even greater shape deviations of the second guide can be compensated and an optimum equilibrium of forces obtained under load. A particularly good damping characteristic is obtained as a result.

Based on a first embodiment, the first compensating element or the first compensating element and second compensating element is a compensating plate or damping plate made from plastic, in particular elastomer, such as polyurethane elastomer, or rubber. The compensating element has a hardness in the range of 30 Shore A to 50 Shore A (DIN 53505) so that a sufficiently precise guiding action and sufficiently high damping effect can be obtained.

Based on one embodiment of the invention, it is also possible for the bearing device to have a bearing body with a first bearing arm and a second bearing arm, an elastically flexible first compensating element and an elastically flexible second compensating element, and the first guide wheel is rotatably mounted on the first bearing arm and the second guide wheel on the second bearing arm, and the first bearing arm is connected to the first compensating element and the second bearing arm is connected to the second compensating element so that the guide wheels are movable relative to the base frame, and the bearing device is mounted to the base frame (substantially rigidly). The compensating elements are preferably each provided in the form of a leaf spring, in particular made from spring steel, and at least one of the leaf springs (close to the base frame) is clamped at one end. This embodiment enables any unevenness on each guide section of the second guide to be compensated. The guide wheels are pressed against the guide sections independently of one another with a pre-set contact force so that guiding inaccuracies can be optimally compensated. Even at travel speeds of the transport vehicle of 5 m/sec and more, irregularities on the second guide are not able to cause any relevant vibrations in/on the storage rack. In addition, the material properties of the compensating elements are maintained during service and the compensating elements may be based on a very compact design.

Also of advantage is an embodiment of the invention in which the bearing device has a bearing body with a first bearing arm and a second bearing arm, an elastically flexible first compensating element and an elastically flexible second compensating element, and the first guide wheel is mounted by its axle via the elastically flexible first compensating element on the first bearing arm and the second guide wheel is mounted by its axle via the elastically flexible second compensating element on the second bearing arm so that the guide wheels are movable relative to the base frame. Based on this embodiment, the guide wheels are able to compensate for guidance inaccuracies on the guide sections of the second guide independently of one another. Irregularities on the second guide are therefore not able to cause any relevant vibrations in/on the storage rack even if the travel speeds of the transport vehicle are 5 m/sec and more.

A particularly compact design of the bearing device which is protected from external influences such as dirt, spray water and such like can be achieved if the compensating element comprises a bearing sleeve, an inner sleeve and an elastomer ring disposed between the bearing sleeve and inner sleeve, the bearing sleeve forming a bore in which the axle of the guide wheel is retained.

Finally, it is also of advantage if the bearing device has a first bearing body and a second bearing body and an elastically flexible first compensating element, and the first guide wheel is rotatably mounted on the first bearing body and the second guide wheel on the second bearing body, and the first bearing body is rigidly mounted to the base frame and the second bearing body is connected via the first compensating element to the base frame such that the second guide wheel is movable relative to the base frame. Based on this embodiment, the albeit low damping action of the elastic facing on the first guide wheel on the one hand and the relatively higher damping action of the compensating element on the other hand can be used to compensate irregularities on the first guide and/or second guide. The plastic of the facing on the first guide wheel preferably has a hardness in the range of 70 Shore A to 100 Shore A, in particular 93 Shore A (DIN 53505) and the compensating element has a hardness in the range of 30 Shore A to 50 Shore A (DIN 53505). In this respect, it has also proved to be of advantage if the axle of the first guide wheel and the axle of the second guide wheel subtend an angle, the axle of the second guide wheel extending vertically.

The objective of the invention is also achieved by the following steps:

- detecting a unit load-property characteristic value specific to the unit load for every unit load, in particular a density of the unit loads, by means of a control system,
- detecting at least one threshold value for a unit load-property characteristic value, in particular a density of the unit load, by means of the control system,
- comparing the detected unit load-property characteristic values with the threshold value for the unit load-property characteristic value by means of the control system (comparison module),
- allocating/assigning the storage spaces to a first storage space category and to a second storage space category and detecting (storing) these storage space categories by means of the control system (memory module),
- determining unoccupied storage spaces of the first storage space category and determining unoccupied storage spaces of the second storage space category by means of the control system (warehouse management computer),
- storing first unit loads by means of the unit load receiving device and transport device in unoccupied storage spaces of the second storage space category if a deviation falling below a threshold value is determined, and
- storing second unit loads by means of the unit load receiving device and transport device in unoccupied storage spaces of the first storage space category if a deviation exceeding a threshold value is determined.

As proposed by the invention, against the background of physical properties of the storage rack and/or ambient conditions in the region of the storage rack, different storage space categories are set and the unit loads are selectively distributed in the storage spaces based on a comparison between a determined unit load-property characteristic value for each unit load and a set threshold value for the unit load-property characteristic value. The physical property is determined in particular by means of the vibration behavior of the storage rack. The ambient condition is derived in particular from the turbulent air flow created by the traveling movement of the unit load receiving device. If the determined unit load-property characteristic value (e.g. 40 g/dm$^3$) lies below the threshold value (ca. 50 g/dm$^3$), the unit load is stored by the unit load receiving device/transport device in an unoccupied storage space of the second storage space category, hence a "non-critical" storage space. If, on the other hand, the determined unit load-property characteristic value (e.g. 100 g/dm$^3$) lies above the threshold value (ca. 50 g/dm$^3$), the unit load can be stored by means of the unit load receiving device/transport device in an unoccupied storage space of the first storage space category, hence a "critical" storage space. Assigning the differently classified unit loads to the "critical" storage spaces and "non-critical" storage spaces avoids having to relocate those unit loads having a unit load-property characteristic value below the threshold value and deposited in storage spaces even at high moving speeds of the unit load receiving device/transport device. Repositioning of the unit loads in the storage rack can also be dispensed with if the unit loads have been in the storage rack for several days. A subsequent retrieval operation of the unit loads can therefore also be reliably carried out by the transport device. It is also of advantage to store the unit loads in the unoccupied storage spaces of the first storage space category and unoccupied storage spaces of the second storage space category using the chaotic storage principle.

In certain applications, it may also be of advantage if the at least one guide unit is mounted on the base frame of the unit load receiving device (transport vehicle) via the bearing device described above having at least one elastically flexible compensating element. Such an application might arise if, although it is established that there are barely any vibrations in the storage rack, the unit load receiving device(s) has (have) to be moved at the highest travel speed and turbulent air flows are being created by the resultant wind which causes undesired shifting of the unit loads deposited in the storage spaces.

In principle, however, the bearing device may also not be provided with an elastically flexible compensating element, in which case shifting of the unit loads in the storage rack is prevented solely by the method feature.

It is also of advantage if the storage spaces of the second storage space category lie in those regions of the storage rack in which the vibration induced in the storage rack by the traveling movement of the unit load receiving device has a minimum vibration amplitude. The storage spaces of the first storage space category, on the other hand, lie in those regions of the storage rack in which the vibration induced in the storage rack by the traveling movement of the unit load receiving device has a maximum vibration amplitude. It is therefore possible for one storage rack in each rack level (storage surface) to have storage spaces of different storage space categories, in which case storage spaces of the first storage space category and/or storage spaces of the second storage space category may be provided on a rack level (storage surface).

On at least some of the different rack levels (storage surfaces), the storage rack may in turn have storage spaces of different storage space categories, in which case storage spaces of the first storage space category and storage spaces of the second storage space category may be provided on a third rack level (storage surface) for example, and storage spaces of the first storage space category and storage spaces of the second storage space category may be provided on a sixth rack level (storage surface) for example. The distribution of the storage spaces of the first storage space category and storage spaces of the second storage space category on the rack levels may be different from one another. However, the storage rack may also have storage spaces of the same storage space category on at least some of the different rack levels (storage surfaces), in which case only storage spaces of the second storage space category (non-critical storage spaces) are provided on a first rack level (storage surface) for example and storage spaces of the first storage space category (critical storage spaces) are provided on a tenth rack level (storage surface).

It has also proved to be of advantage if in the rack levels lying one above the other, the storage rack has adjacent storage spaces respectively at a first depth position and a second depth position lying behind, and the storage spaces of the second storage space category lie in the second depth position and the first unit loads are stored in the storage spaces in the second depth position. As a result of this feature, undesired shifting of those unit loads having a unit load-property characteristic value (e.g. 40 g/dm$^3$) below the threshold value can also be prevented even if there are turbulent air flows because they were deposited in the second depth position.

Based on another embodiment of the invention, a length/width/height dimension and a weight are detected for every unit load and the unit load-property characteristic value is determined from the volume dimension and weight measurement. The length/width/height dimensions and the weight may either be already available as master data relating to the unit loads or may be determined by a measuring device. The unit load-property characteristic value can be easily calculated and enables an unambiguous allocation of the unit loads to a storage space of the first storage space category and to a storage space of the second storage space category.

It is also of advantage if a weight of every unit load is determined by means of a measuring device after a picking operation and the unit load-property characteristic value is determined again from the volume dimension and detected weight prior to storage. This means that the actual weight of the unit loads is always determined and the calculation of the unit load-property characteristic values is supported by the current weight status. This forms the basis for correct storage of the unit loads in the different storage spaces.

Based on one advantageous embodiment, the transport vehicle is equipped with two guide units on one vehicle side. The transport vehicle is therefore guided on one side on a first guide track and is able to move relative to the guide tracks in the direction perpendicular to the second guide plane regardless of existing manufacturing tolerances on the first guide track (manufacturing tolerances on the second guide track have no effect on guidance of the transport vehicle in the direction perpendicular to the second guide plane) without causing vibrations in the storage rack adjacent to the other vehicle side which does not have a guide unit.

The objective of the invention is also achieved due to the fact that the running wheels additionally have an elastic damping element between the wheel hub and the facing. This feature may be provided in order to prevent and/or compensate for vibrations on the transport vehicle and on the storage rack when traveling across connecting joints between mutually connected guide tracks. This in turn permits high travel speeds for the transport vehicle and the use of storage racks based on a thin-walled design, as described above. The elastic deformation of the damping element can be used to obtain a springing action when radial forces are acting on the running wheel. Accordingly, "impacts" of the running wheels are damped and transmitted to the base frame. Any sliding of the unit load on the receiving platform of the transport vehicle is therefore largely prevented.

Based on one embodiment of the invention, at least two of the running wheels may be attached to a (driven) drive shaft and the drive shaft is mounted on the base frame by means of bearing devices, and the bearing devices respectively have at least one elastically flexible compensating element which is disposed and configured so that the running wheels are movable in the radial direction relative to the base frame.

It is also of advantage if two running wheels are attached to a drive shaft respectively and the drive shafts are respectively mounted on the base frame by means of bearing devices, and the bearing devices of each drive shaft respectively have at least one elastically flexible compensating element which is disposed and configured so that the running wheels are movable in the radial direction relative to the base frame. In this context, only one of the drive shafts or both of the drive shafts may be driven. Such an embodiment enables the use of conventional running wheels, for example running wheels with a wheel hub made from metal or fiber-reinforced plastic and a facing made from wear-resistant plastic, because the bearing devices for the drive shaft(s) are provided with the elastic damping element.

Based on another embodiment of the invention, the running wheels respectively have a wheel hub and a facing disposed coaxially with the wheel hub and additionally have an elastic damping element between the wheel hub and the facing, and the miming wheels sit by means of the facing on the first guide in a rollable manner. Based on this embodiment, "impacts" on the running wheels are damped because they are provided with the elastic damping element. In principle, it would be possible to opt for a combination of the bearing devices for the drive shaft(s) and the elastic damping element.

It has proved to be of advantage if the elastic damping element is disposed coaxially with the wheel hub, and the elastic damping element comprises an inner ring, an outer ring, a central web connecting the inner ring and outer ring, and ribs which extend separately from one another in the axial direction of the inner and outer rings and which connect the inner ring and outer ring. Such an elastic damping element can be produced particularly inexpensively and is distinctive due to a high damping characteristic.

The wheel hub comprises an inner ring, an outer ring, a central web connecting the inner ring and outer ring, and ribs which extend separately from one another in the axial direction of the inner and outer rings and which connect the inner ring and outer ring. Such a wheel hub can be produced particularly inexpensively and is distinctive due to its high dimensional stability.

A particularly good damping action is achieved if the elastic damping element is made from an elastomeric material having a hardness of at most 50 Shore A.

To provide a clearer understanding, the invention will be described in more detail below with reference to the appended drawings.

Figure 2:
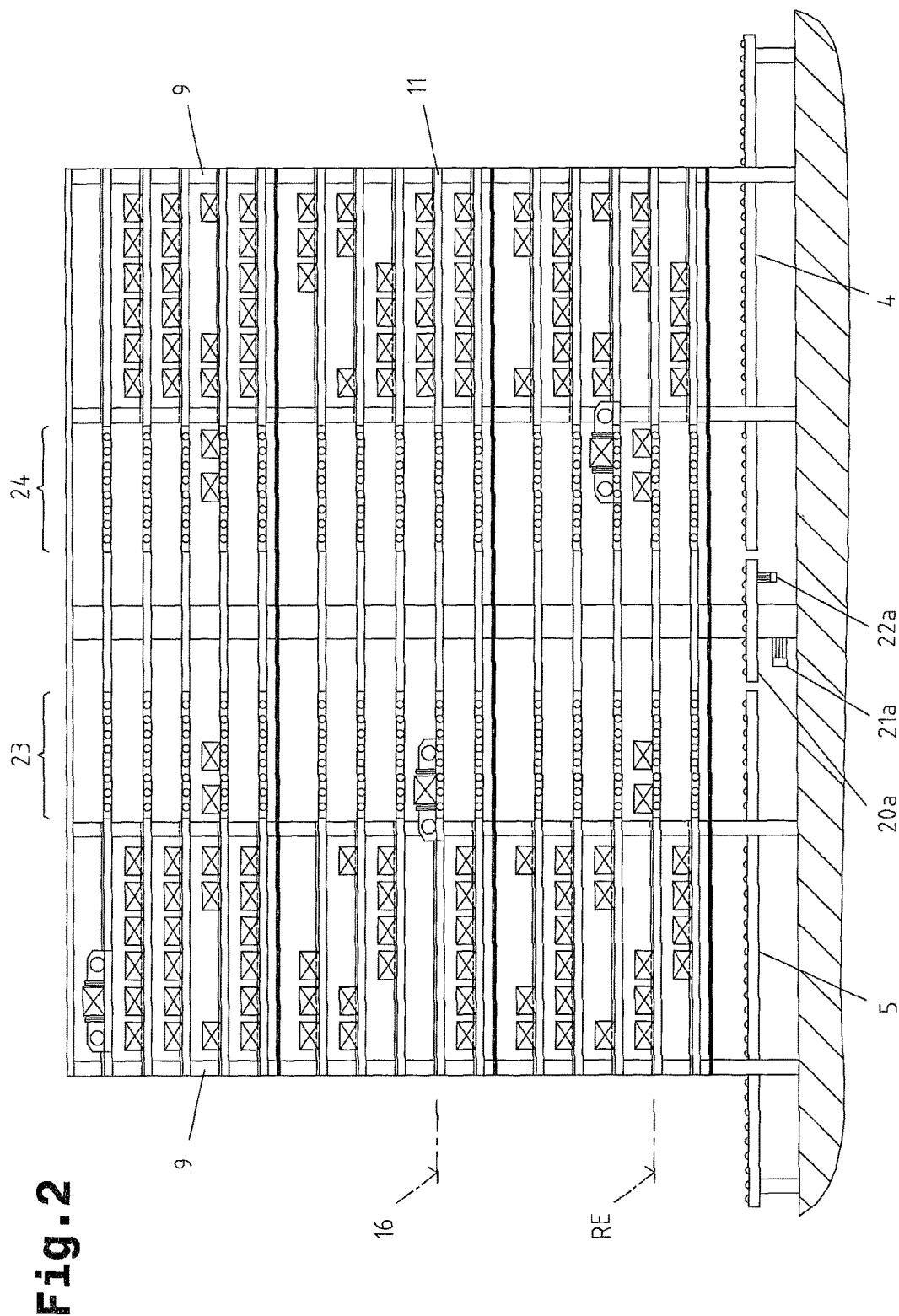
Figure 3:
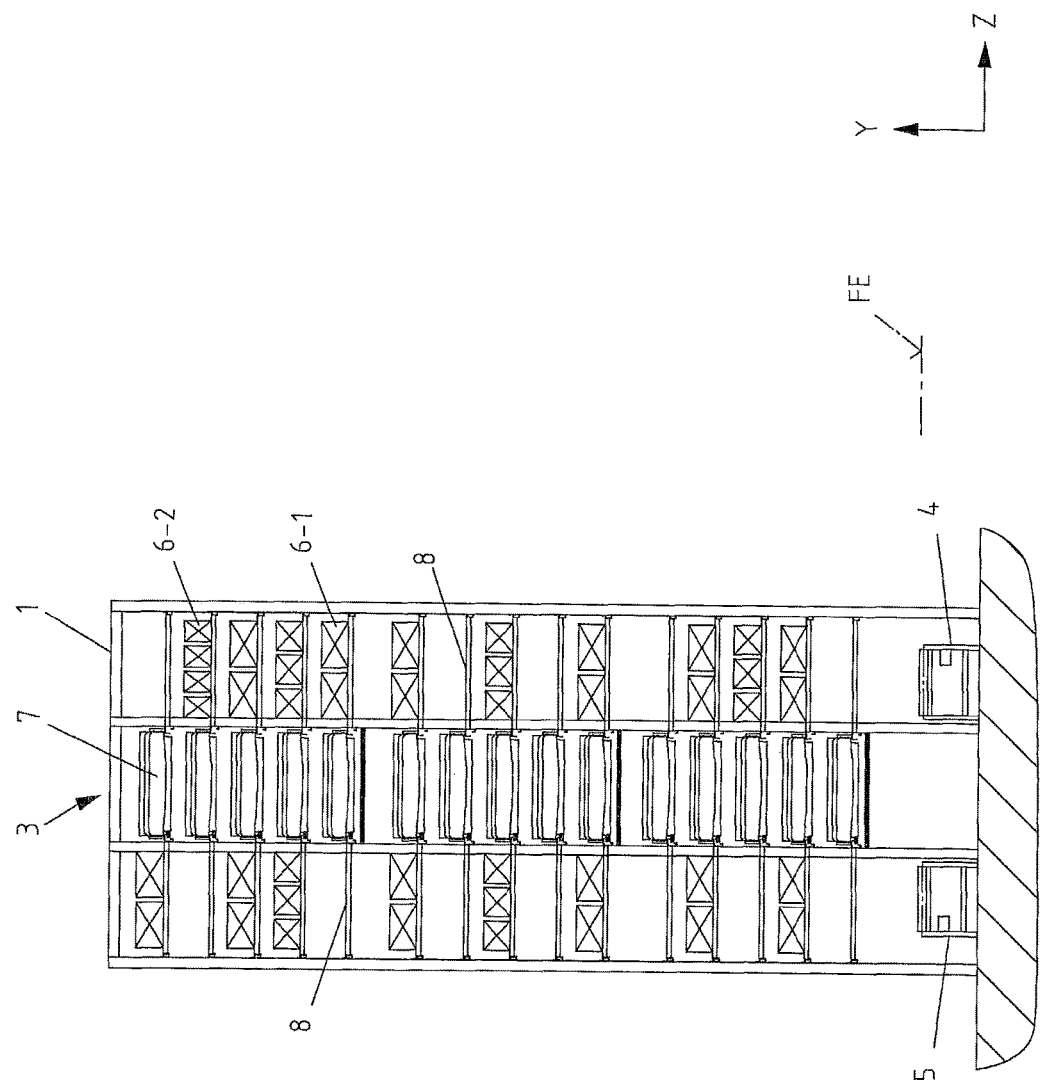
Figure 4:
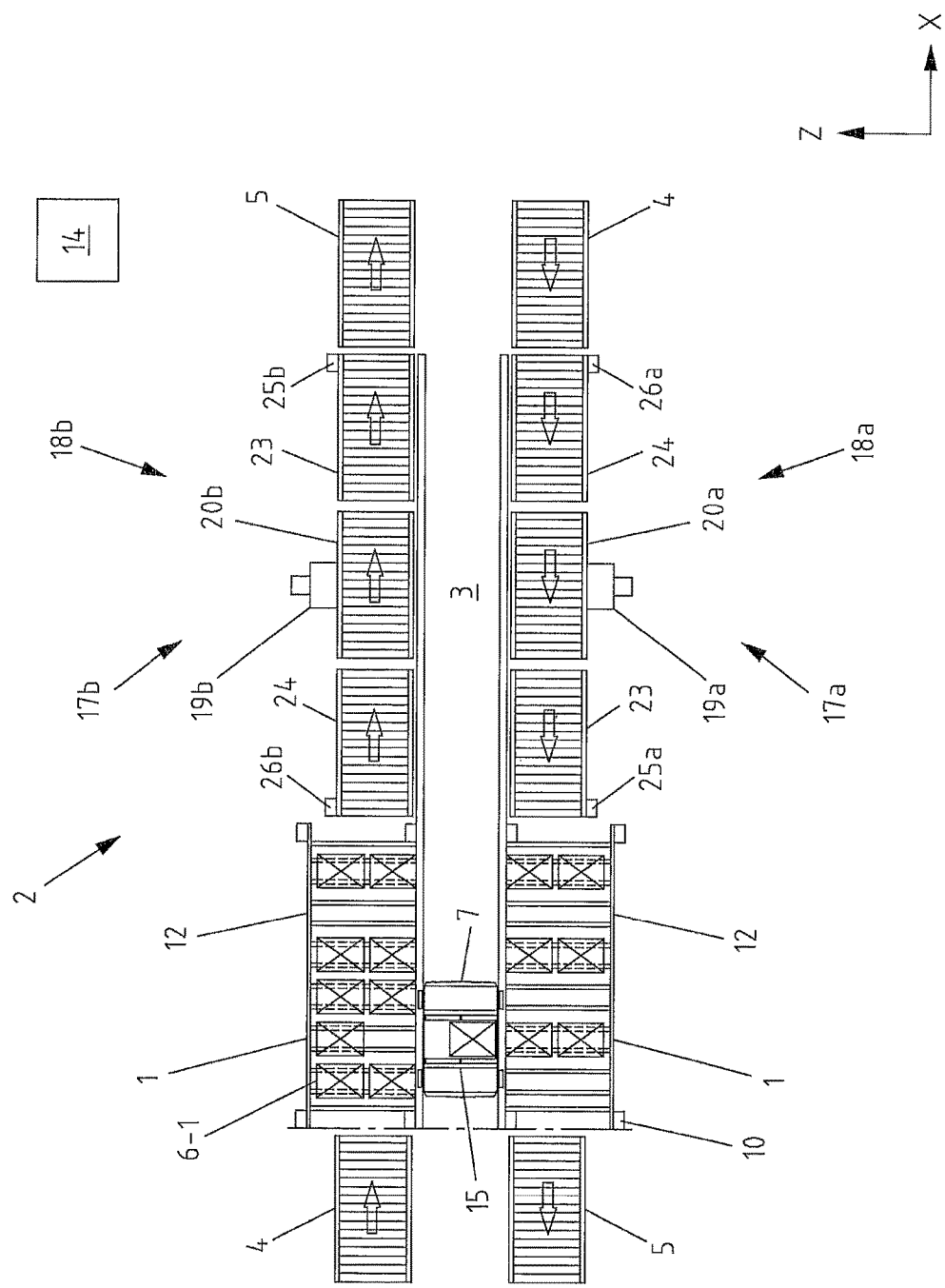
Figure 5:
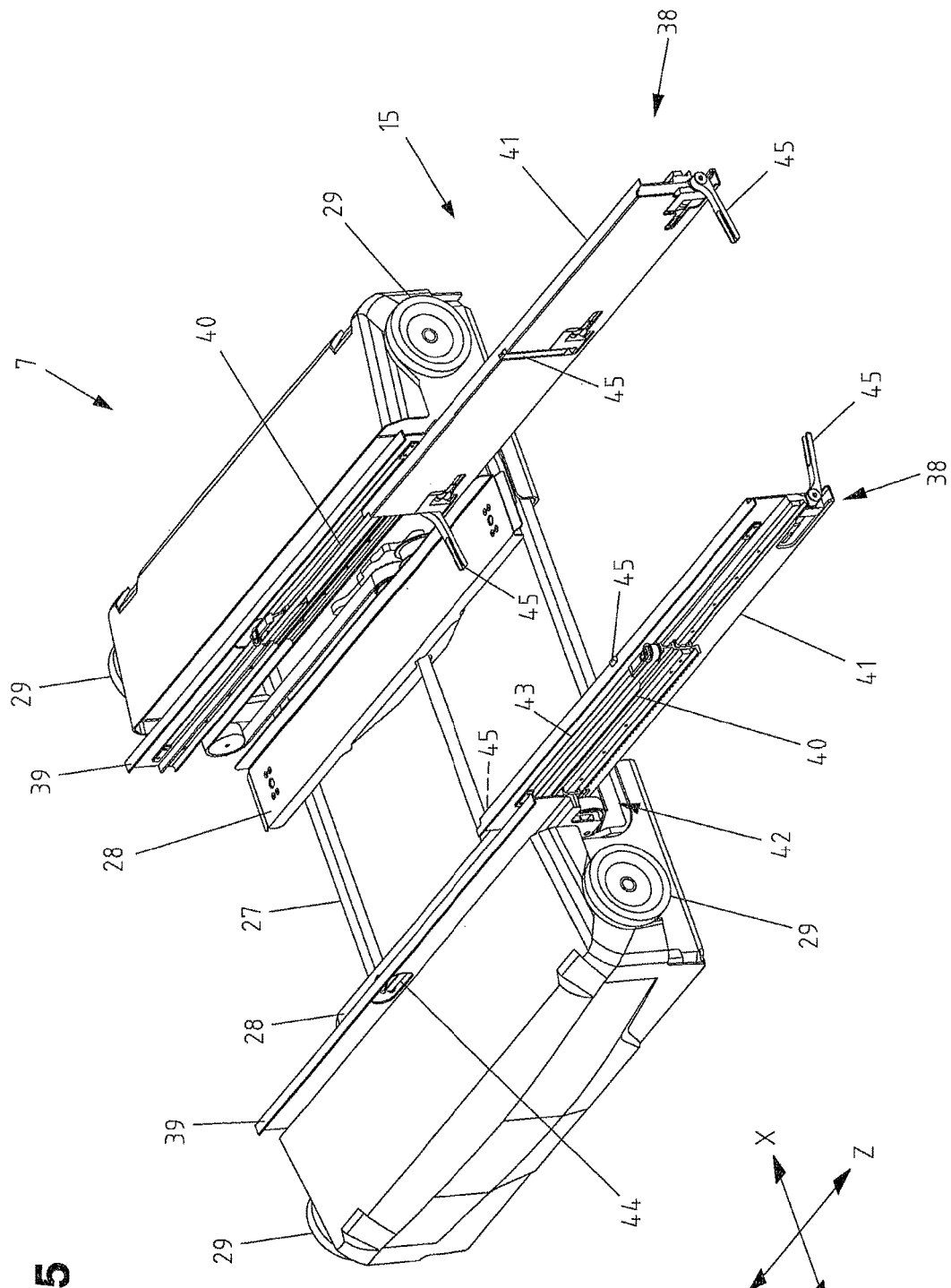
Figure 6:
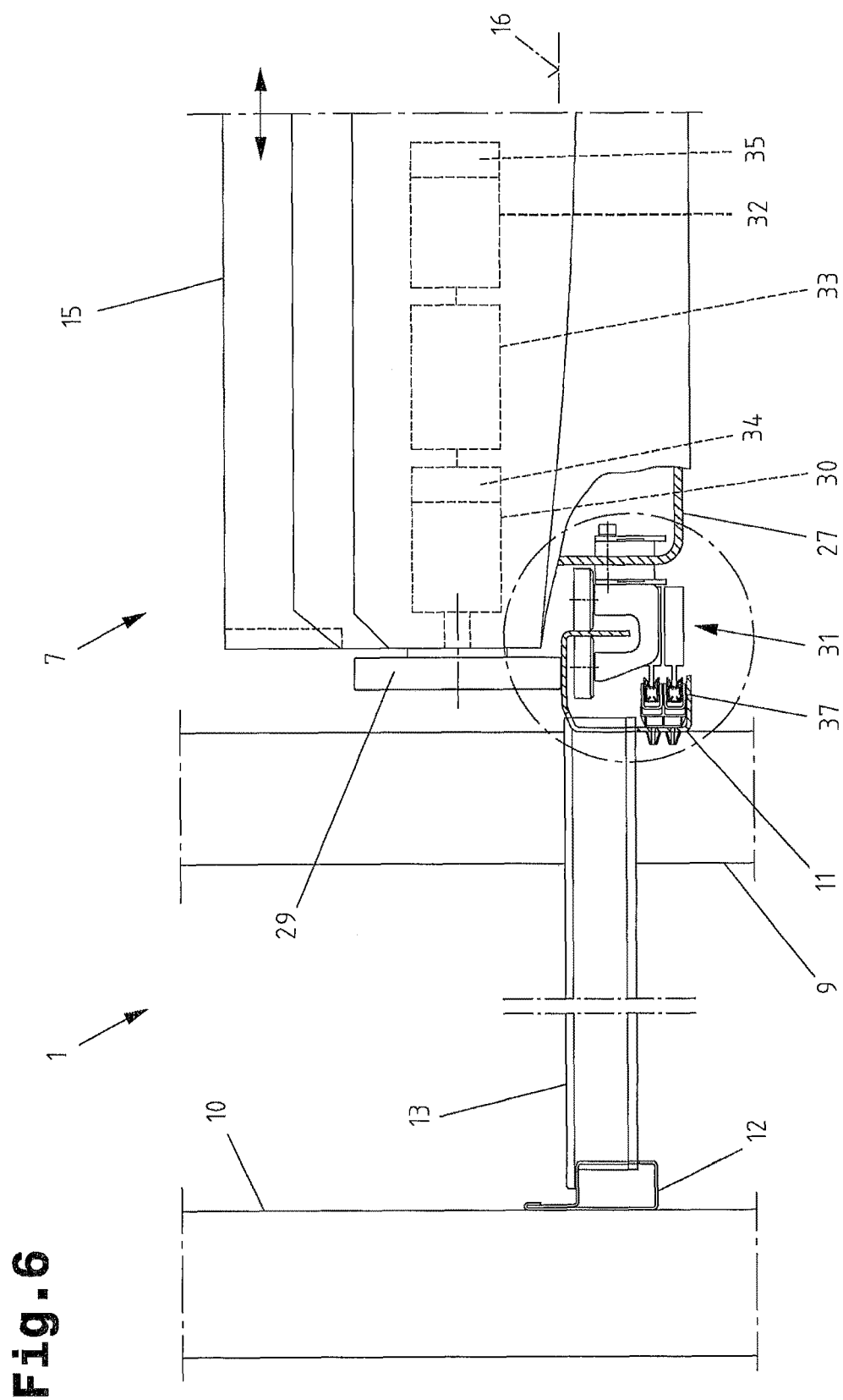
Figure 7:
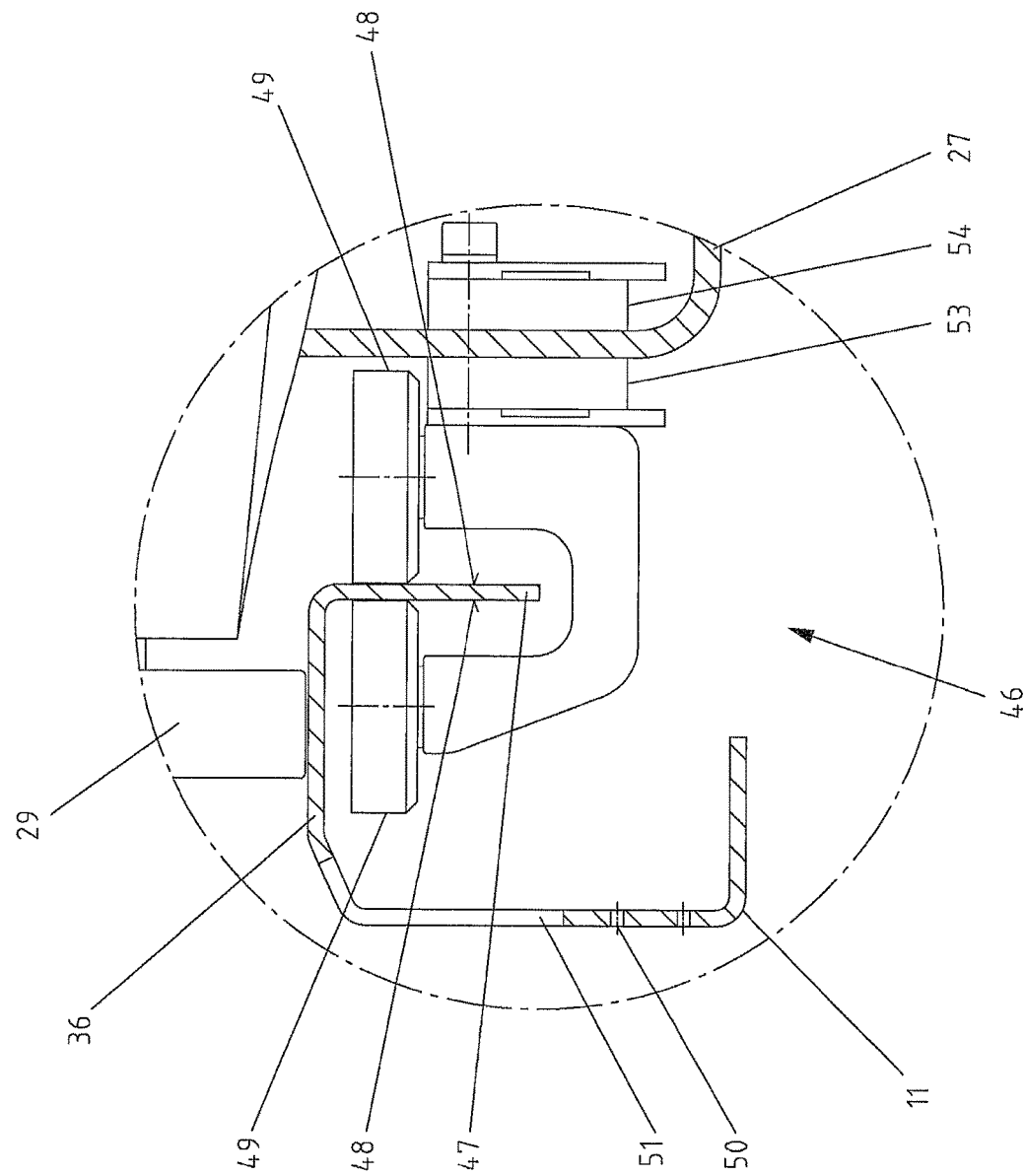
Figure 8:
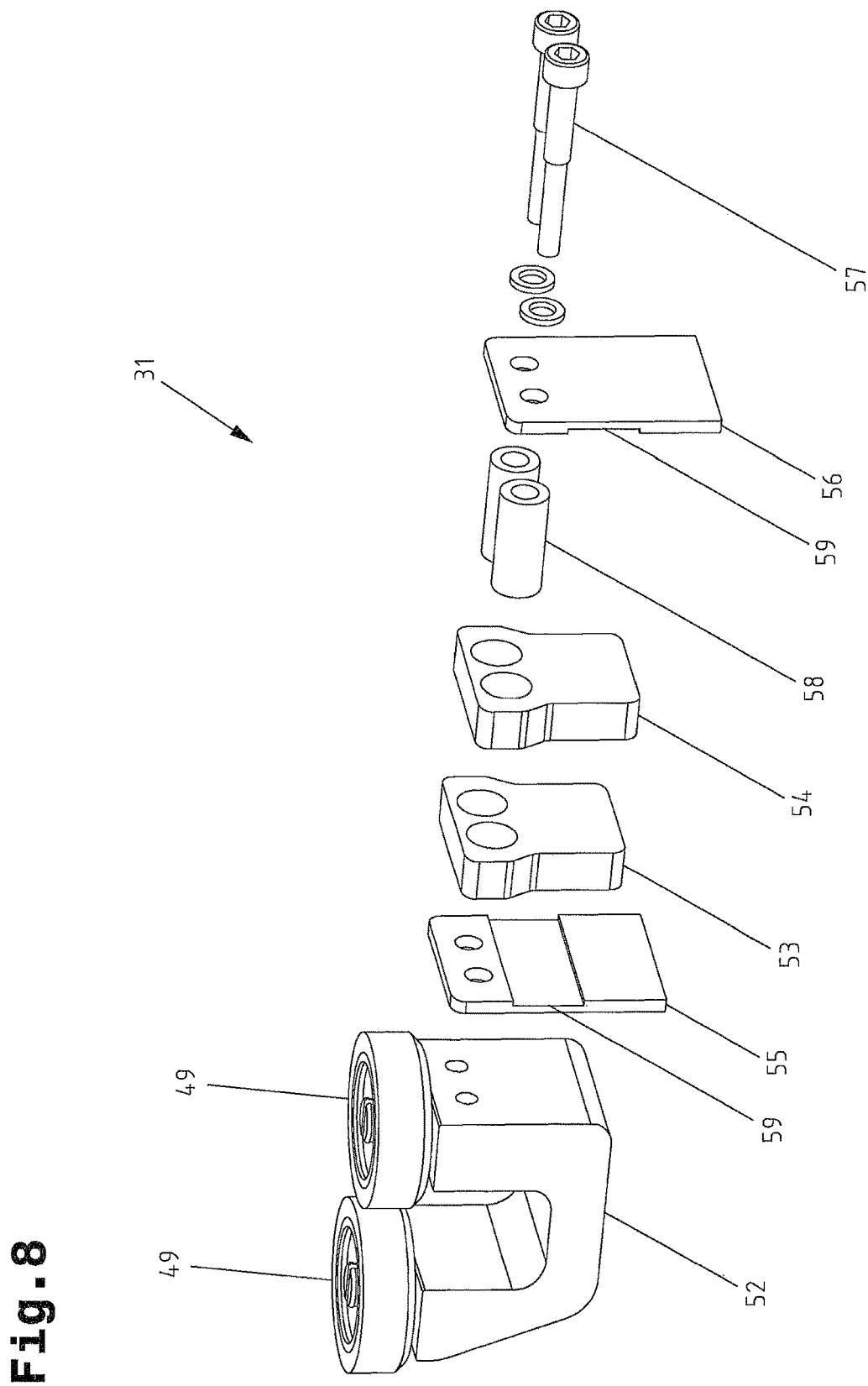
Figure 9:
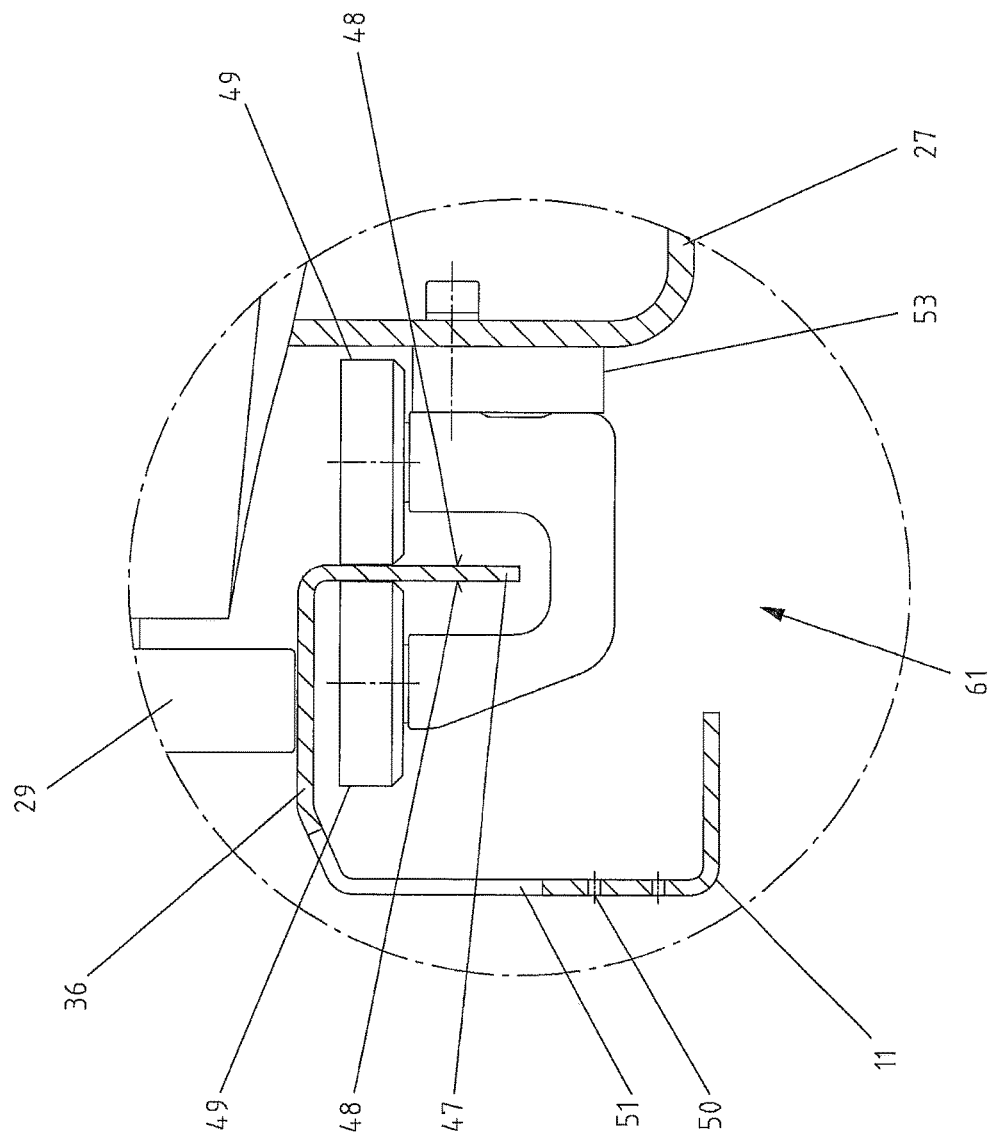
Figure 10:
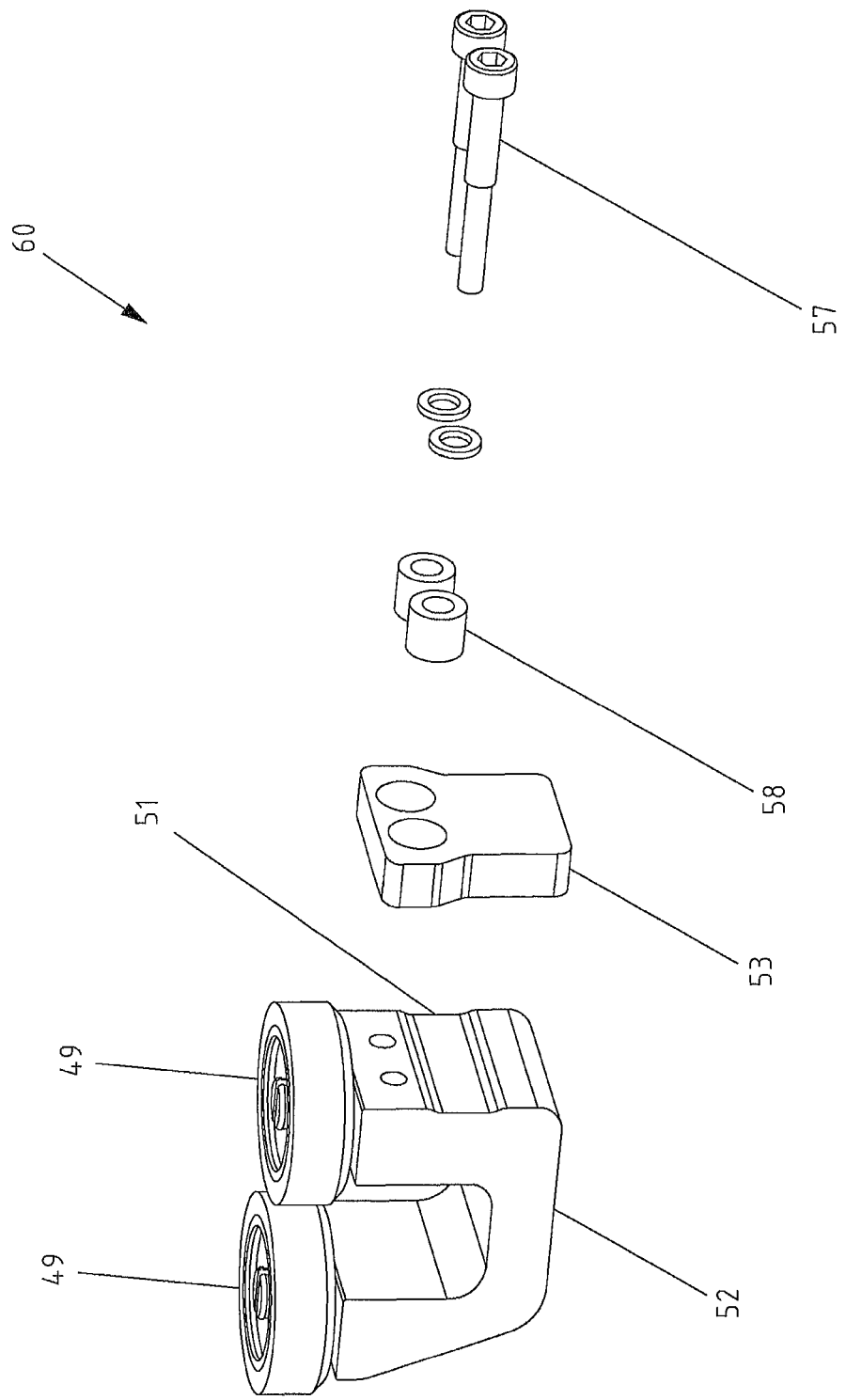
Figure 11:
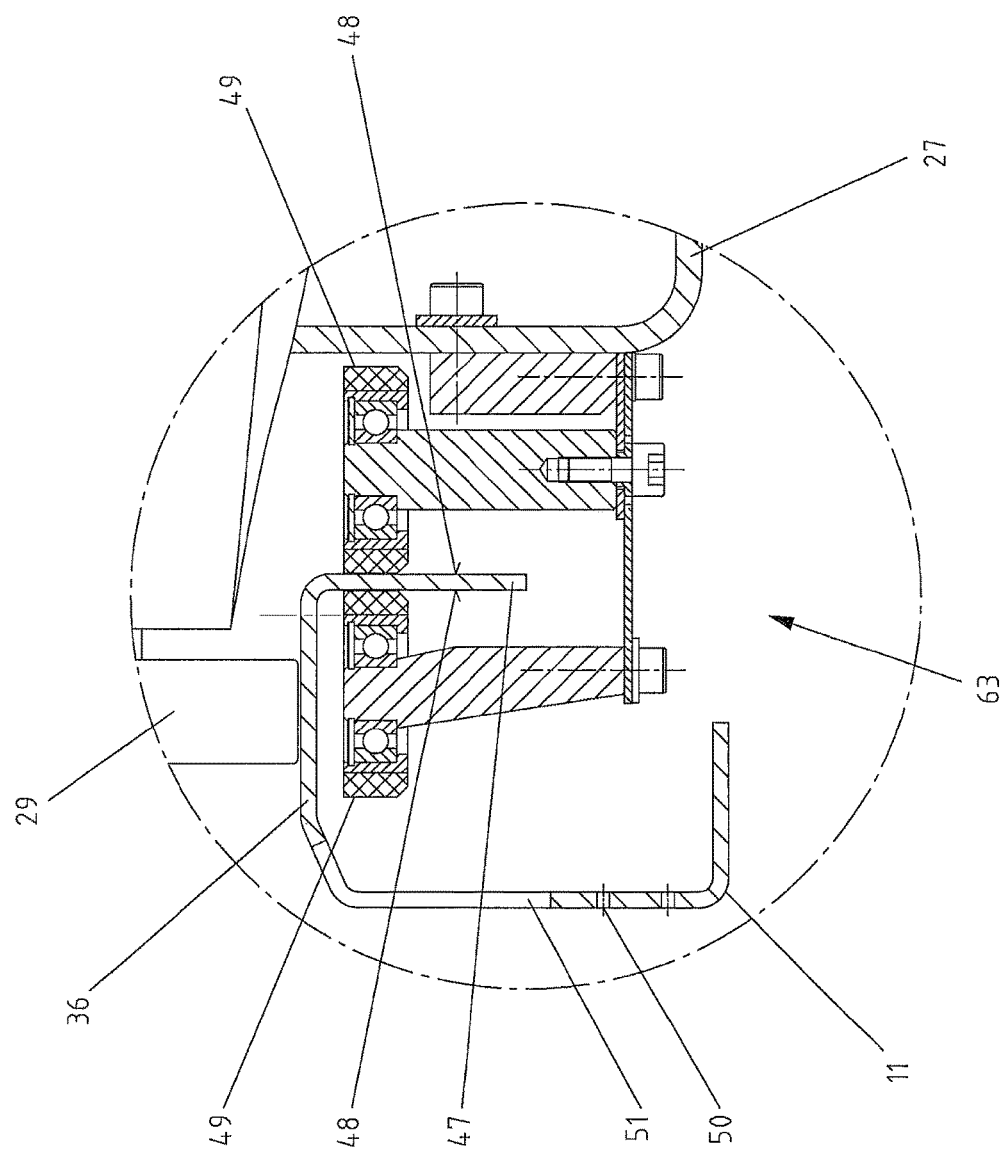
Figure 12:
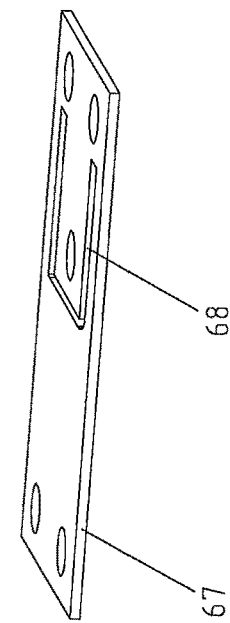
Figure 13:
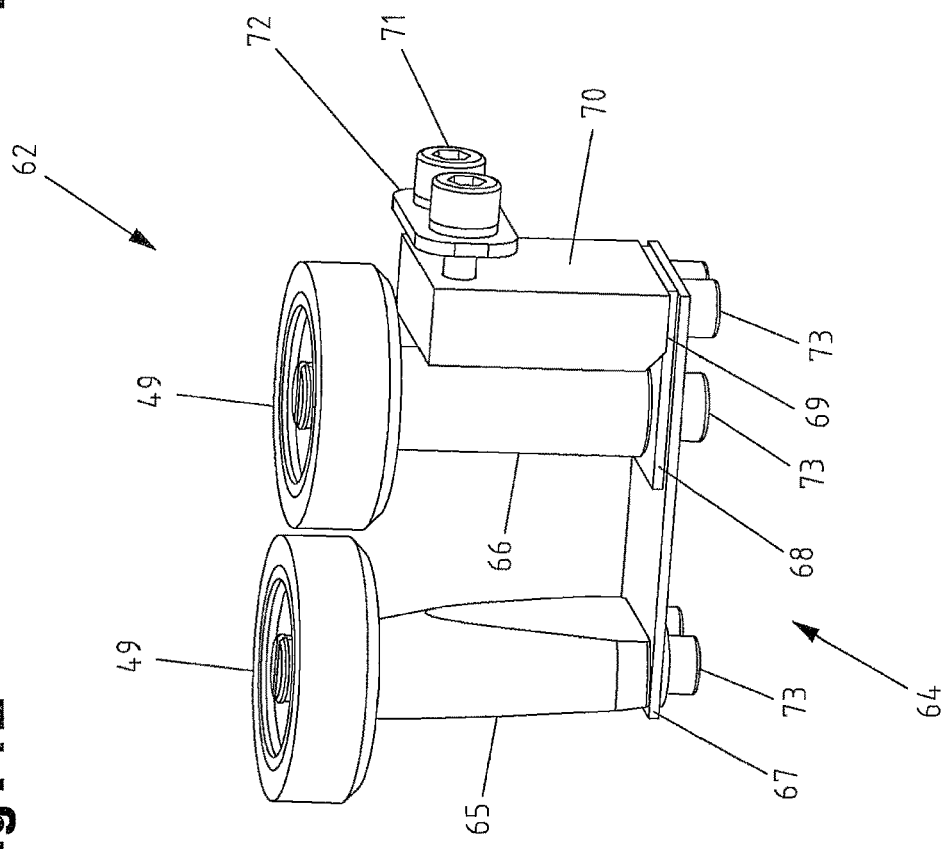
Figure 14:
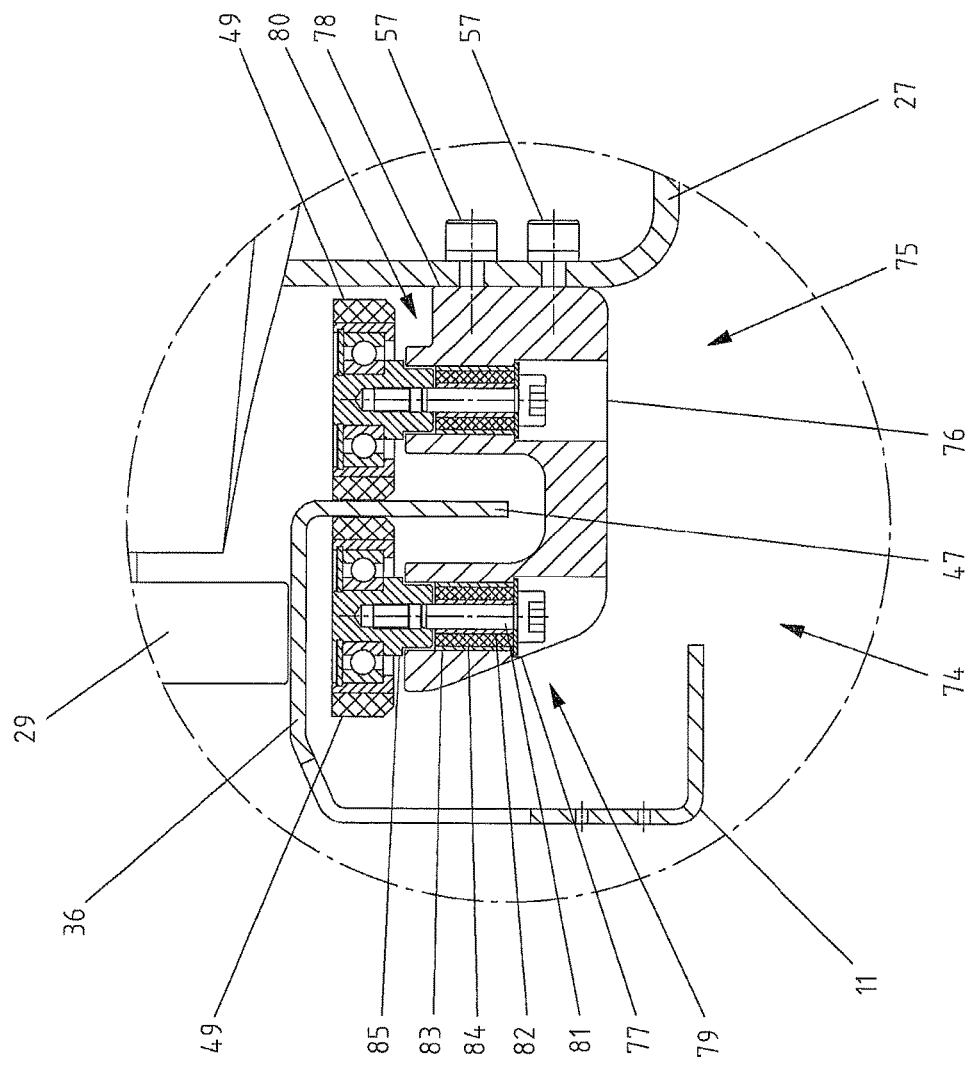
Figure 15:
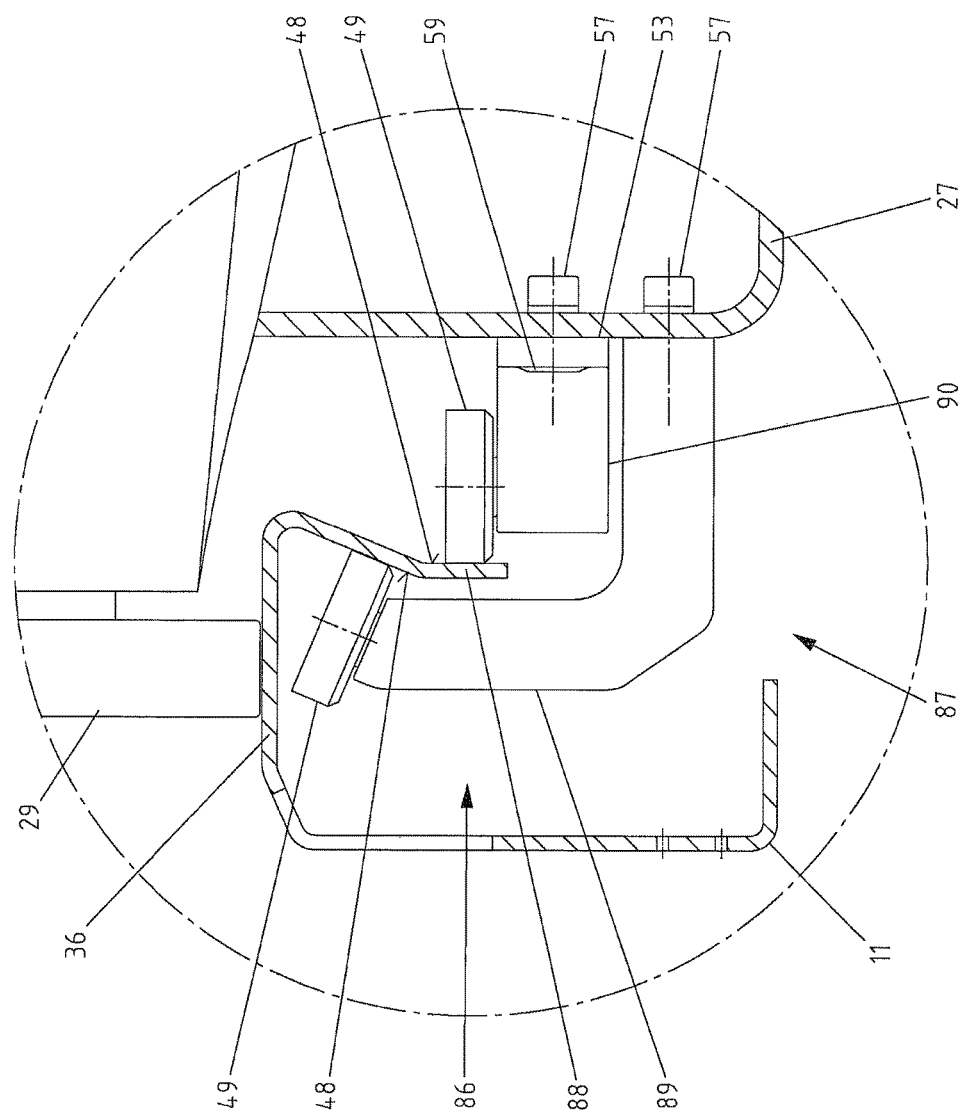
Figure 17:
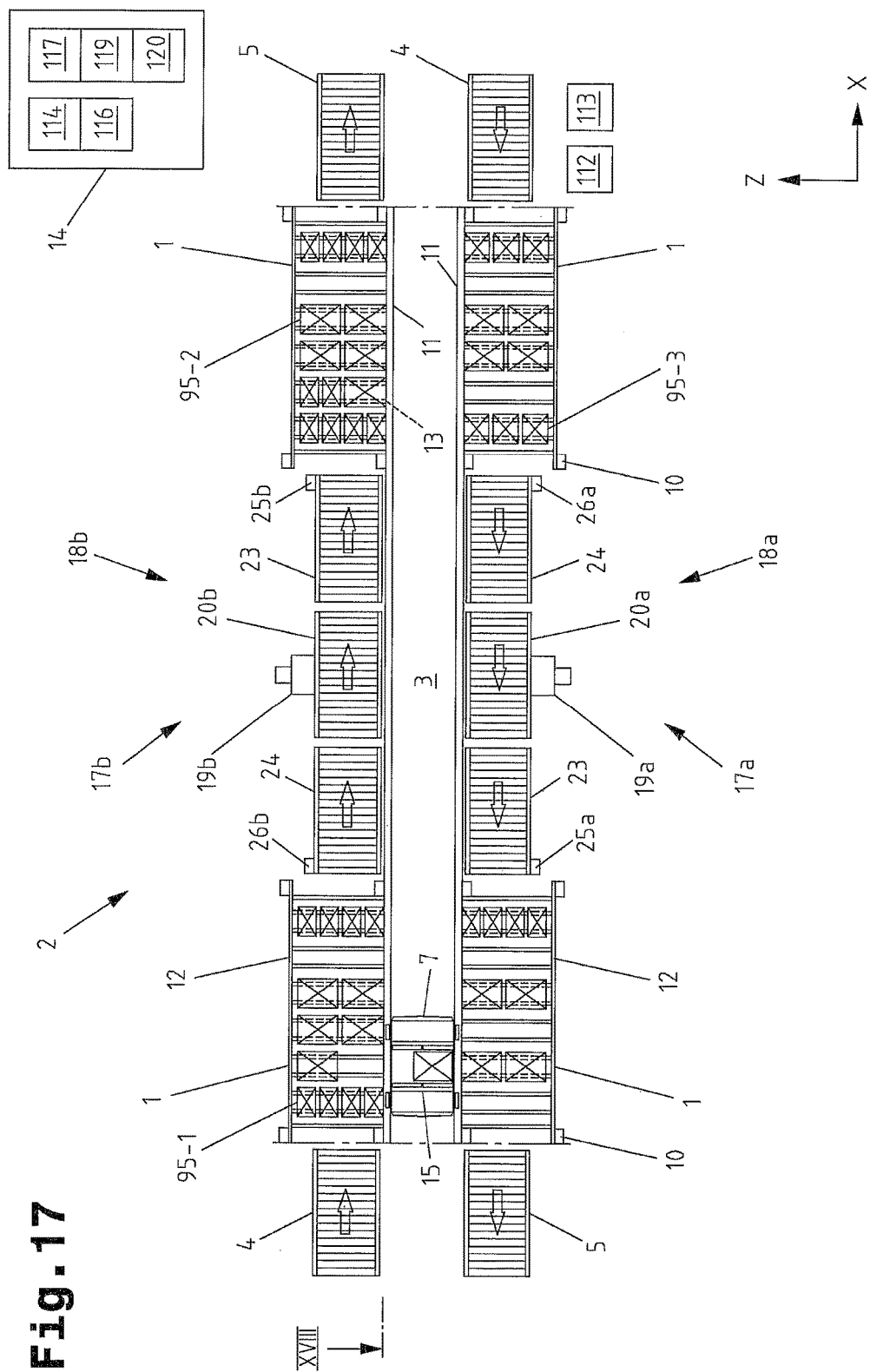
Figure 18:
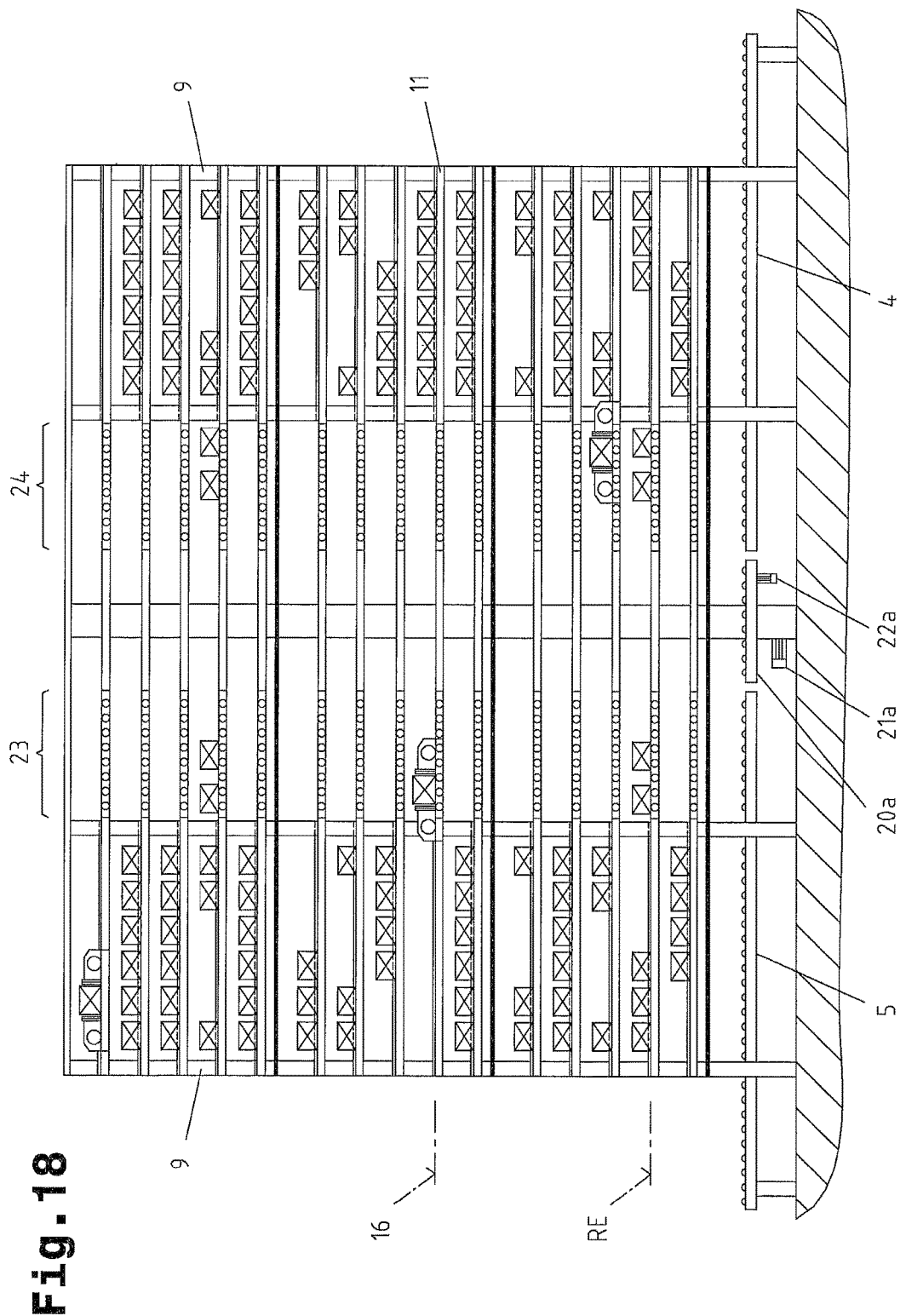
Figure 19:
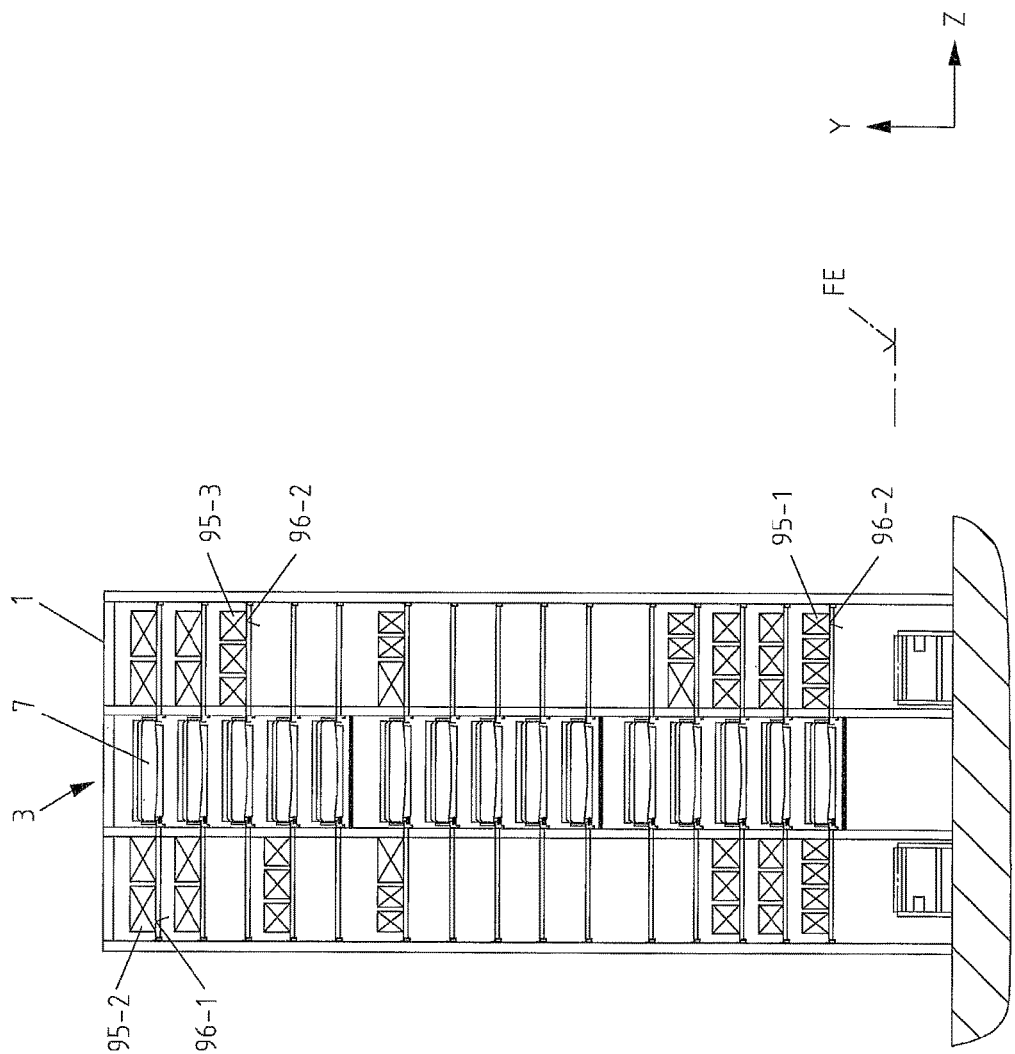
Figure 20:
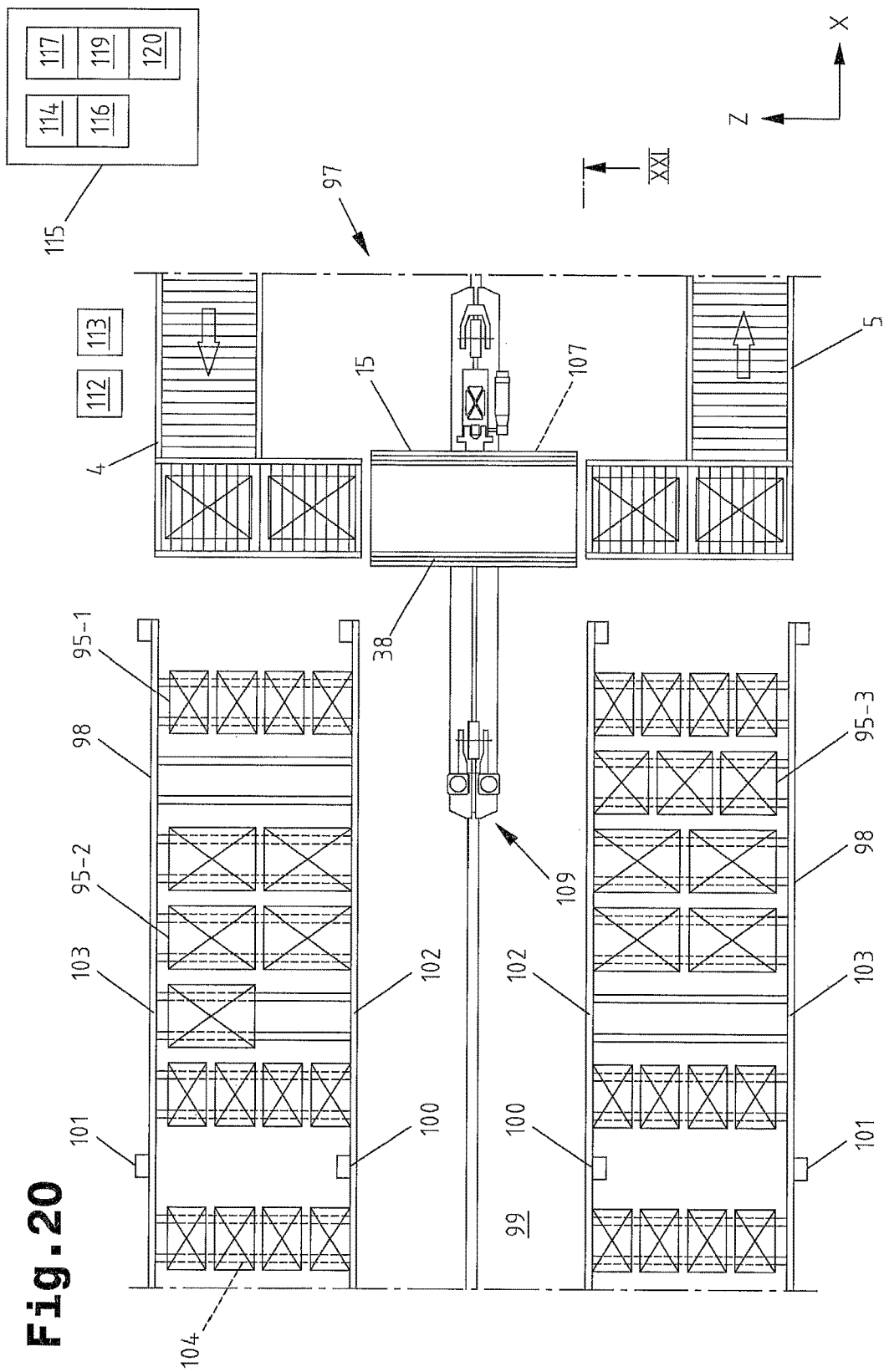
Figure 21:
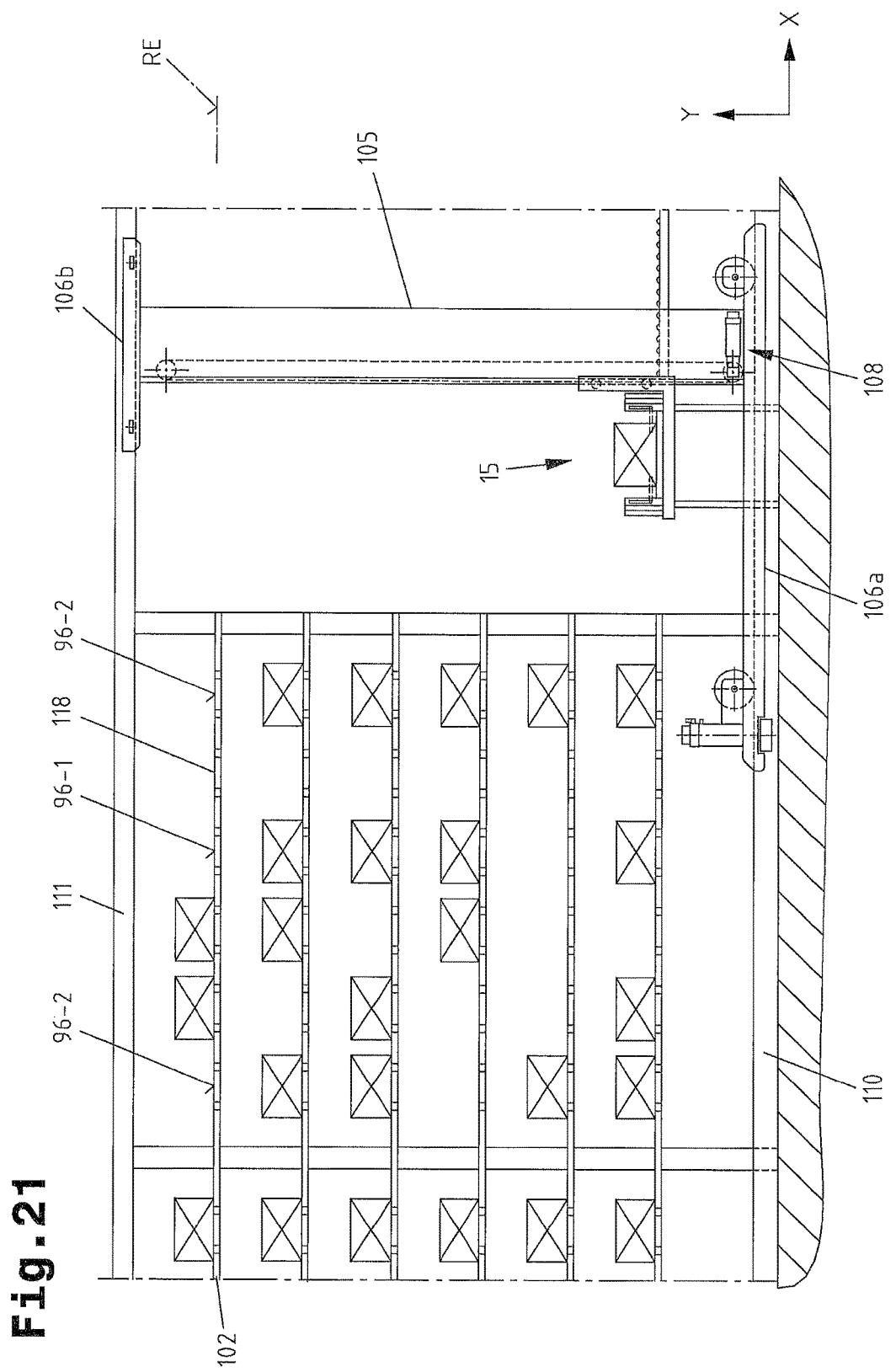
Figure 22:
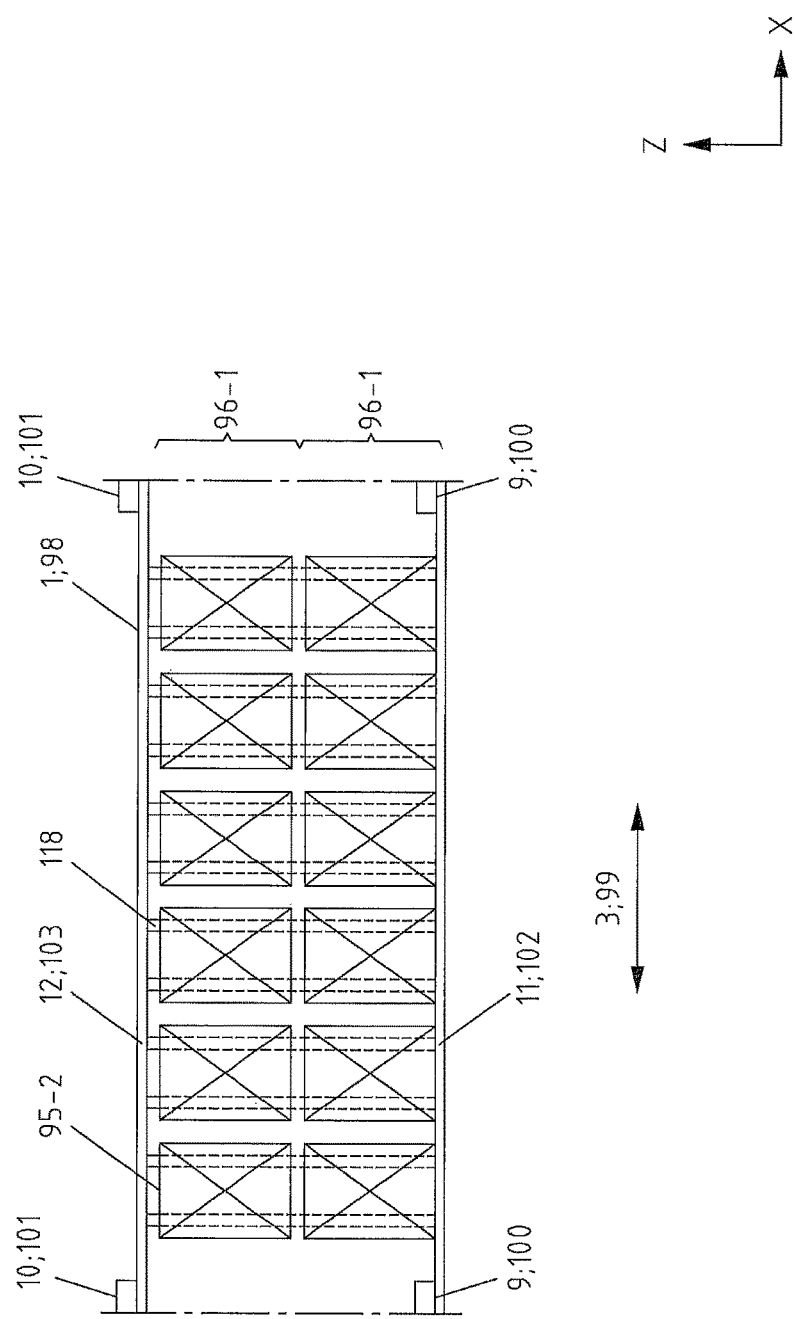
Figure 23:
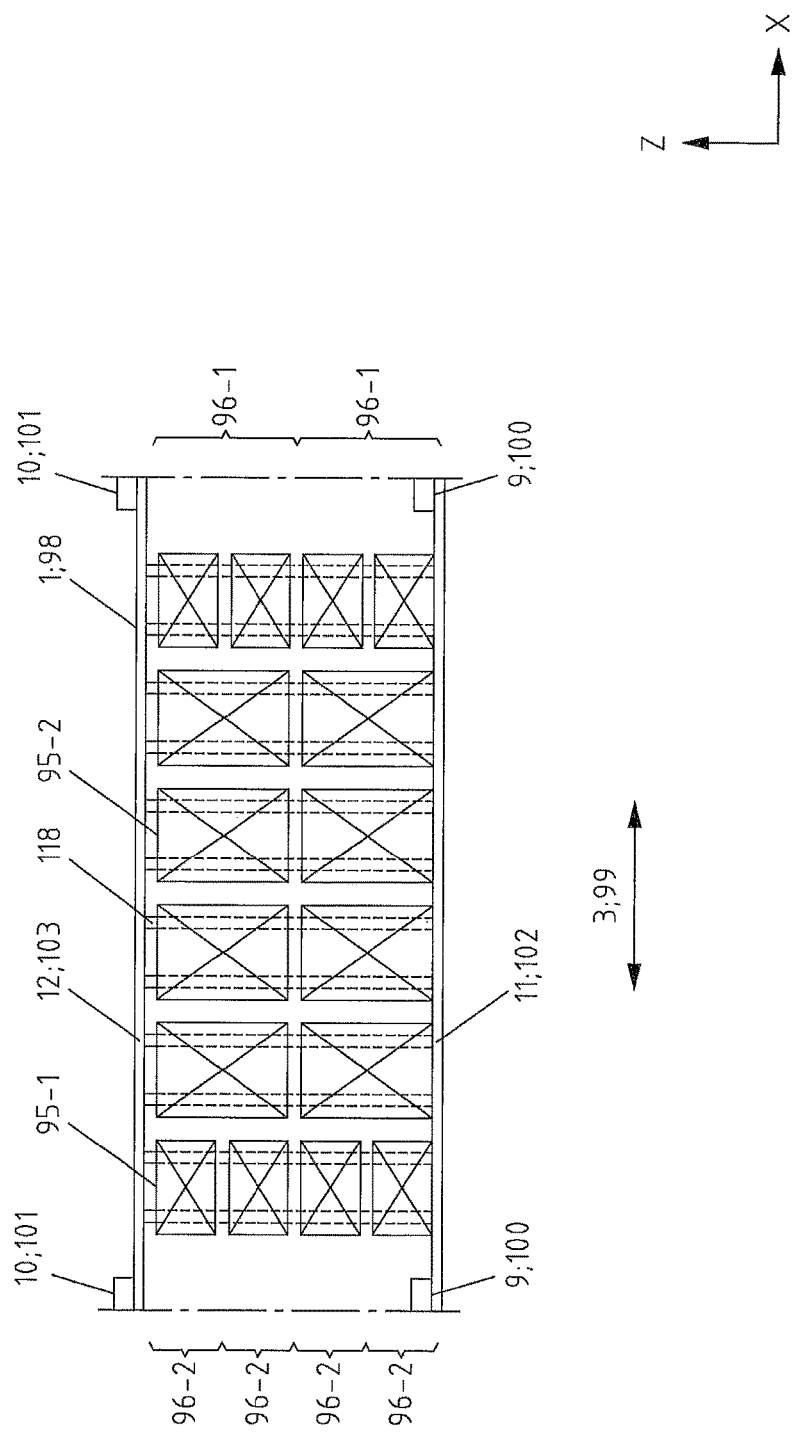
Figure 24:
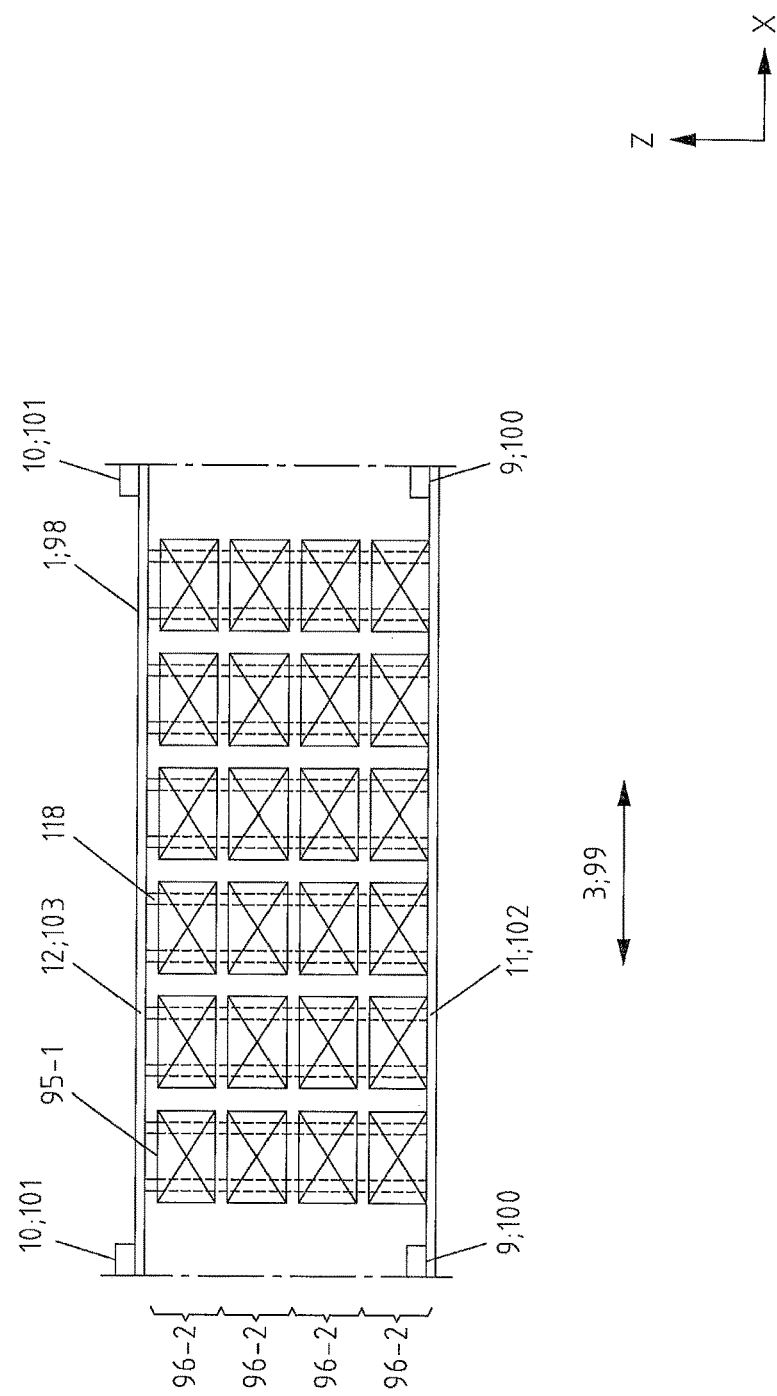
Figure 25:
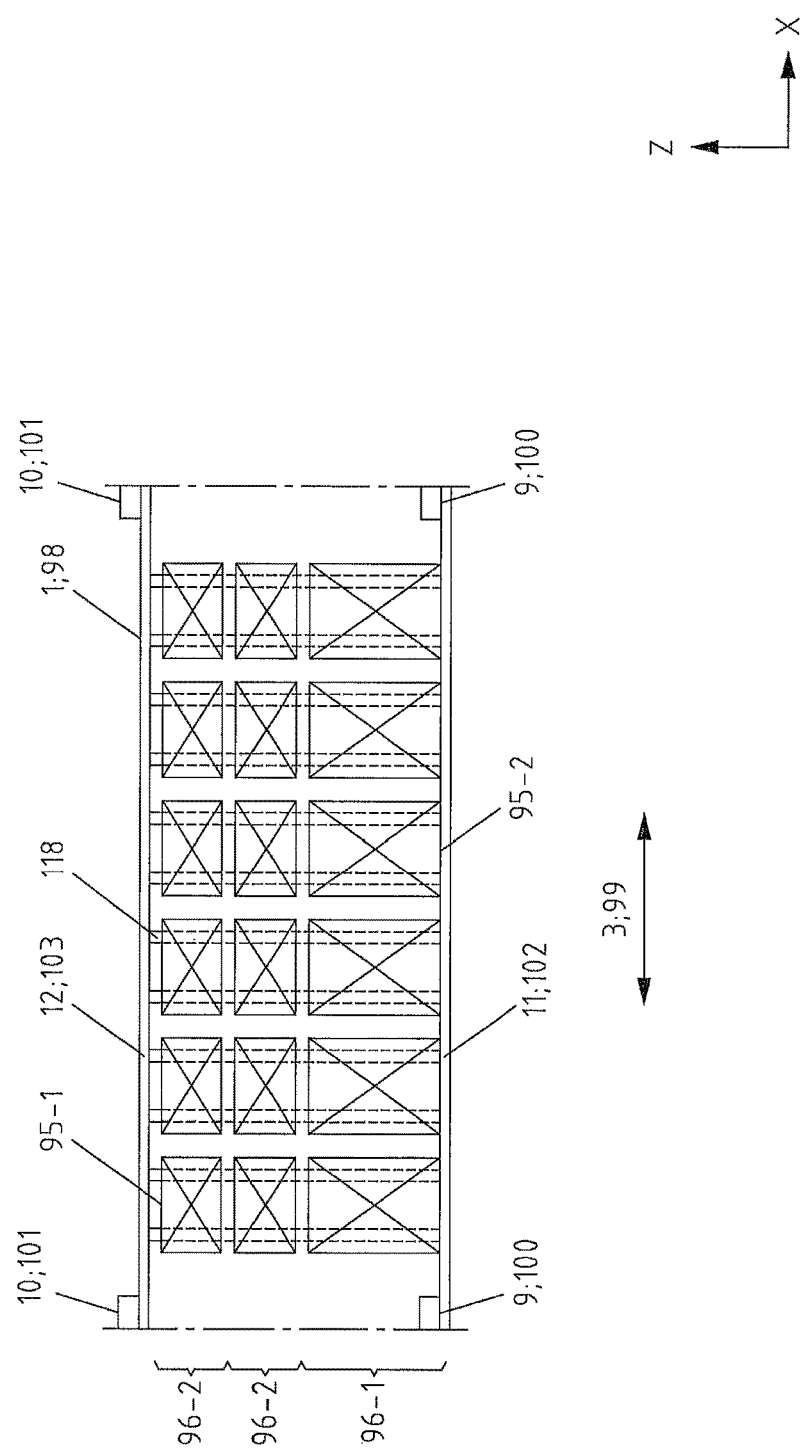
Figure 26:
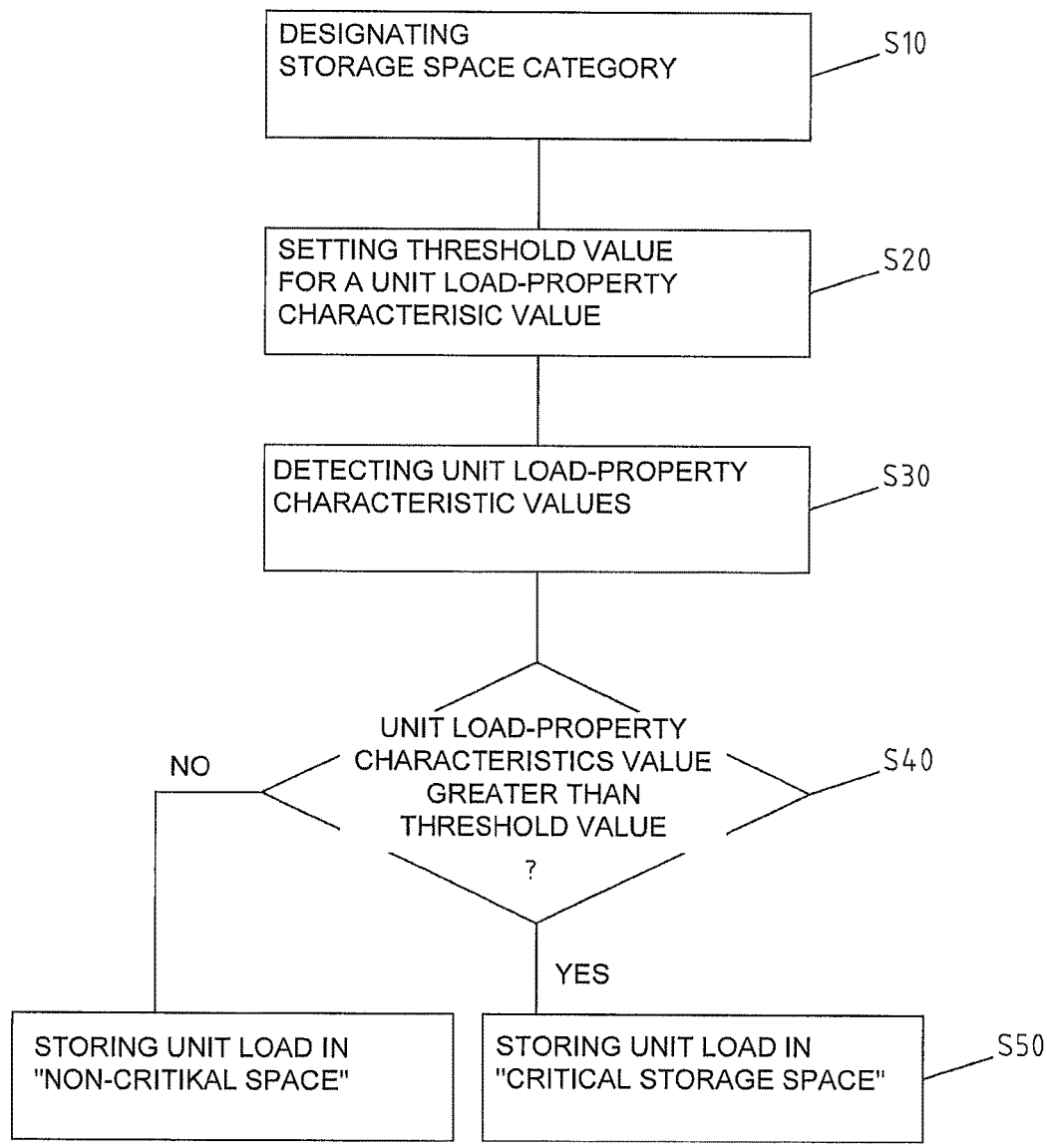
Figure 30:
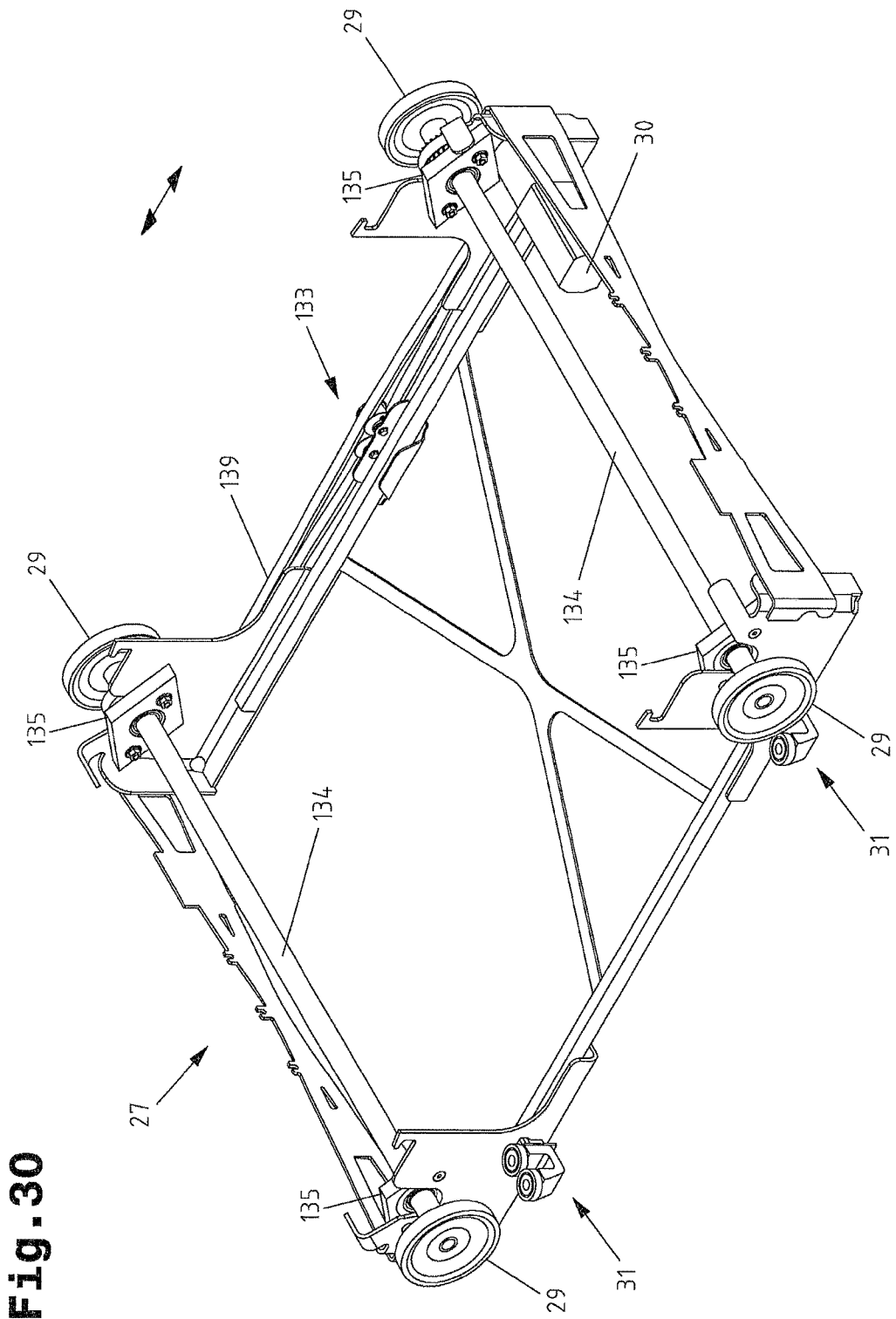
Figure 31:
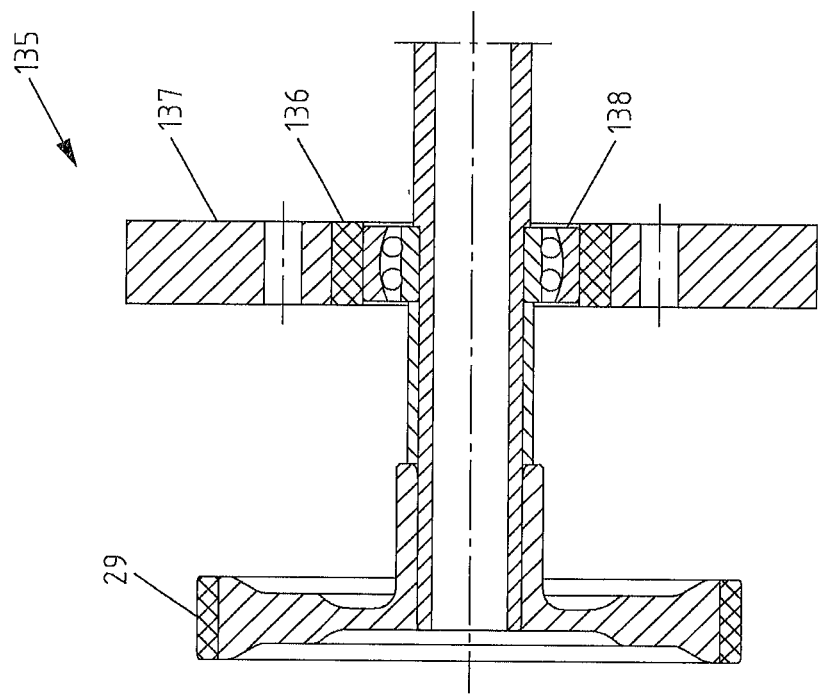

These are highly simplified, schematic diagrams respectively illustrating the following:

FIG. 1 a part of a storage system based on a first embodiment with storage racks and a unit load-handling unit seen in plan view onto a rack level;

FIG. 2 a view of the storage system along line II indicated in FIG. 1;

FIG. 3 a view in elevation showing the storage system without the unit load-handling unit of FIG. 1;

FIG. 4 a part of a storage system based on a second embodiment with storage racks and a unit load-handling unit seen in plan view onto a rack level;

FIG. 5 a perspective view of a transport vehicle having a transport device for storing unit loads in storage channels and removing unit loads from storage channels;

FIG. 6 an enlarged view of a detail of a storage rack and the transport vehicle with a first embodiment of a guide unit, based on FIG. 5, seen from the front;

FIG. 7 a larger view of the detail from FIG. 6 with the transport vehicle and guide unit;

FIG. 8 an exploded diagram of the guide unit illustrated in FIG. 7;

FIG. 9 a larger view of the detail from FIG. 6 with the transport vehicle and a second embodiment of a guide unit;

FIG. 10 an exploded diagram of the guide unit illustrated in FIG. 9;

FIG. 11 a larger view of the detail from FIG. 6 with the transport vehicle and a third embodiment of a guide unit, viewed in section;

FIG. 12 a perspective view of the guide unit illustrated in FIG. 11;

FIG. 13 another embodiment for the design of a leaf spring having an elastically flexible first compensating element and an elastically flexible second compensating element, seen in a perspective view;

FIG. 14 a larger view of the detail from FIG. 6 with the transport vehicle and a fourth embodiment of a guide unit;

FIG. 15 a larger view of the detail from FIG. 6 with the transport vehicle and a fifth embodiment of a guide unit;

FIG. 16 a flow diagram for a storage method based on the prior art;

FIG. 17 a part of a storage system based on a first embodiment for implementing a method based on the invention for storing unit loads, seen in plan view onto a rack level;

FIG. 18 the storage system viewed along line XVIII indicated in FIG. 17;

FIG. 19 the storage system without the unit load-handling unit illustrated in FIG. 17, viewed from the front;

FIG. 20 a part of a storage system based on a second embodiment for implementing a method based on the invention for storing unit loads, seen in plan view onto a rack level;

FIG. 21 the storage system viewed along line XXI indicated in FIG. 20;

FIG. 22 a plan view of a rack level with storage spaces of a first storage space category in which unit loads having a unit load-property characteristic value exceeding a threshold value are stored;

FIG. 23 a plan view of a rack level with storage spaces of a first storage space category in which unit loads having a unit load-property characteristic value exceeding a threshold value are stored and storage spaces of a second storage space category in which unit loads having a unit load-property characteristic value below a threshold value are stored;

FIG. 24 a plan view of a rack level with storage spaces of a second storage space category in which unit loads having a unit load-property characteristic value below a threshold value are stored;

FIG. 25 a plan view of a rack level with storage spaces of a first storage space category in which unit loads having a unit load-property characteristic value exceeding a threshold value are stored and storage spaces of a second storage space category in which unit loads having a unit load-property characteristic value below a threshold value are stored;

FIG. 26 a flow diagram of a method based on the invention for storing unit loads;

FIG. 27 a running wheel based on a modified embodiment with an elastic damping element, viewed in section along line XXVII indicated in FIG. 28;

FIG. 28 the running wheel from FIG. 27 viewed from the front;

FIG. 29 the running wheel from FIG. 27 viewed from behind;

FIG. 30 a base frame for the transport vehicle based on a modified embodiment of the bearing devices for the drive shafts, each having an elastic damping element, seen in a perspective view;

FIG. 31 a longitudinal section through the bearing device, drive shaft and running wheel, based on the embodiment in FIG. 30.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

FIGS. 1 to 3 illustrate one possible embodiment of a storage system which comprises storage racks 1 disposed in a parallel arrangement, a unit load-handling unit 2, at least one rack aisle 3 extending between the storage racks 1 and along the unit load-handling unit 2 in an x-direction, a conveyor system 4, 5 adjoining the unit load-handling unit 2 for conveying unit loads 6-1, 6-2 in and for conveying unit loads 6-1, 6-2 out and at least one transport vehicle 7 for placing the unit loads 6-1, 6-2 in storage in storage channels 8 and/or for removing unit loads 6-1, 6-2 from the storage channels 8. In the example illustrated, there are two storage racks 1. Within the scope of the invention, however, it would also be possible to provide more than two storage racks 1, in which case a rack aisle 3 will be provided respectively between adjacent storage racks 1. It would also be possible to provide only a single storage rack 1. With a view to ensuring greater clarity, only parts of the conveyor system 4, 5 are illustrated in FIG. 1.

The unit loads 6-1, 6-2 are boxes (packaging units) or loading aids (LHM), such as trays or containers, by means of which individual articles or at least one box per loading aid can be conveyed and stored. Individual articles, for example from the textile sector or food industry, are held in supply in the boxes.

The storage racks 1 may comprise vertical front rack posts 9 disposed respectively next to the rack aisle 3 and vertical rear racks post 10 disposed at a distance back from the rack aisle 3. The front rack posts 9 are connected to front longitudinal members 11 extending horizontally in the direction of the rack aisle 3 and the rear rack posts 10 are connected to rear longitudinal members 12 extending horizontally in the direction of the rack aisle 3. Transverse members 13 extending in the depth direction of a storage rack 1 (z-direction) may be provided between the longitudinal members 11, 12. In this case, the top face of the transverse members 13 constitutes a storage surface or storage channels 8. A unit load 6-1, 6-2 is stored on at least two transverse members 13 depending on the width dimension.

However, another embodiment (not illustrated) would also be possible in which the storage racks 1 respectively comprise front rack posts, rear rack posts, front longitudinal members and rear longitudinal members connected to the latter and a storage shelf, for example solid or mesh shelving, disposed on each rack level between the longitudinal members and mounted thereto. The top face of the storage shelf provides a storage surface extending in the depth direction (z direction) between the front longitudinal members and rear longitudinal members on each rack level. In the lengthways direction (x direction) of the storage rack, the storage surface extends at least between the successive front rack posts and rear rack posts on each rack level. In this case, the storage shelf constitutes a storage surface or storage channels 8.

Accordingly, every storage rack 1 forms a plurality of mutually adjacent storage channels 8 in rack levels (RE) lying one above the other which extend in the z direction between the mutually remote longitudinal sides of the storage rack 1.

Depending on a length dimension of the unit loads 6-1, 6-2 that are to be temporarily stored in the storage channels 8, every storage channel 8 is able to accommodate a corresponding number of unit loads 6-1, 6-2. In this respect, the length dimension extends in the direction of the longitudinal extension of the storage channel 8 once the unit load 6-1, 6-2 has been deposited in the storage channel 8. The width dimension of the unit loads 6-1, 6-2, on the other hand, will determine the number of adjacently lying storage channels 8. The width dimension extends transversely to the longitudinal extension of the storage channel 8 once the unit load 6-1, 6-2 has been deposited in the storage channel 8. With a view to retaining greater clarity, the unit loads 6-1, 6-2 in FIG. 1 are shown as having the same width dimension.

It should be pointed out that the expression "storage channel" should be construed as meaning a storage space "fictitiously" designated by an electronic control unit 14. Whilst a "usable" storage depth of the storage channels 8 does not vary, a storage width will vary depending on the width dimension of the unit loads 6-1, 6-2. For example, differing numbers of unit loads 6-1, 6-2 can be stored in the storage channels 8 respectively in depth positions disposed one after the other in the depth direction (z-direction) by means of a transport device 15 that will be described in more detail (FIG. 5).

Based on the embodiment illustrated, the storage system comprises transport vehicles 7 which can be moved in (horizontal) driving planes 16 lying one above the other in front of the storage rack 1 and which can be activated independently of one another by the control unit 14 in order to transfer unit loads 6-1, 6-2 to the storage channels 8 and/or remove unit loads 6-1, 6-2 from the storage channels 8. At least one transport vehicle 7 may be provided for every rack level (RE). A transport vehicle 7 therefore services a rack level by means of the transport device 15. The transport device 15 is able to transfer one or more unit loads 6-1, 6-2 to the storage channels 8 or retrieve them from the storage channels 8 in a transverse direction (z direction) on two sides. In the embodiment illustrated as an example, the driving planes 16 and rack levels (RE) lie substantially at the same height and the longitudinal members 11 extending in the longitudinal direction of the rack aisle 3 (x-direction) and lying opposite one another in pairs respectively constitute a driving plane 16 along which the transport vehicle 7 is moved. The front longitudinal members 11 therefore form guide tracks for the transport vehicle 7 which are connected to the storage rack 1.

However, in the case of other embodiments, although these are not illustrated, there may be fewer transport vehicles 7 than rack levels (RE) if the transport vehicle 7 comprises transport devices 15 disposed one above the other on different levels. The transport devices 15 can be activated by the control unit 14 independently of one another, and a first transport device 15 is able to transfer one or more unit loads 6-1, 6-2 to a storage channel 8 and/or retrieve them from a storage channel 8 in a transverse direction (z-direction) on a first rack level (RE) and a second transport device 15 is able to transfer one or more unit loads 6-1, 6-2 to a storage channel 8 or retrieve them from a storage channel 8 in a transverse direction (z-direction) on a second rack level (RE). Accordingly, a transport vehicle 7 is able to service more than one rack level, for example two rack levels, by means of two transport devices 15 for example. The driving planes 16 no longer lie in every rack level (RE) but are substantially on a level with every second rack level (RE), and the longitudinal members 11 extending in the longitudinal direction of the rack aisle 3 (x-direction) and lying opposite one another in pairs respectively constitute a driving plane 16 along which the transport vehicle 7 is moved.

If, on the other hand, a special lifting device is used, the number of transport vehicles 7 may also be less than the number of driving planes 16. In this instance, the transport vehicles 7 can be deployed between the driving planes 16. Such a lifting device is known from WO 2012/106744 A1 or WO 2012/106745 A1, for example.

The unit load-handling unit 2 illustrated in FIGS. 1 to 3 is disposed between oppositely lying ends of the storage racks 1 and comprises a first unit load lifting device 17*a*, a first buffer device 18*a*, a second unit load lifting device 17*b* and a second buffer device 18*b*.

The unit load lifting devices 17*a*, 17*b* are of a stationary construction and respectively comprise a transport device 20*a*, 20*b* which can be raised and lowered by means of a lifting drive 19*a*, 19*b*. The lifting drive 19*a*, 19*b* comprises a schematically illustrated drive motor 21*a*, 21*b* which is connected to the control unit 14. The transport devices 20*a*, 20*b* are each preferably mounted on a vertical mast. The transport devices 20*a*, 20*b* respectively comprise a conveyor device which can be driven by means of a conveyor drive 22*a*, 22*b* with a conveying direction extending parallel with the rack aisle 3, as indicated by the arrows in FIG. 1. The conveyor drive is connected to the control unit 14. The conveyor devices are roller conveyors, belt conveyors for example.

The buffer devices 18a, 18b respectively comprise first waiting devices 23 on one side of the unit load lifting device 17a, 17b in the direction of the rack aisle 3 and in at least some of the rack levels (RE) for temporarily buffering one or more unit loads 6-1, 6-2 waiting to be stored and second waiting devices 24 on the other side of the second unit load lifting device 17a, 17b in the direction of the rack aisle 3 and in at least some of the rack levels (RE) for temporarily buffering one or more unit loads 6-1, 6-2 waiting to be stored. As illustrated, the first waiting devices 23 and second waiting devices 24 are provided respectively in all rack levels (RE). The first waiting devices 23 constitute a first buffer region, namely a goods-in buffer region, and the second waiting devices 24 constitute a second buffer region, namely a goods-out buffer region, and every unit load lifting device 17a, 17b co-operates with the first and second buffer region. Based on this embodiment, the waiting devices 23, 24 each have a conveyor device which can be driven by means of a conveyor drive 25a, 25b, 26a, 26b, for example roller conveyors. Accordingly, the waiting devices 23, 24 are motor-driven waiting devices.

As may be seen from FIG. 1, the front longitudinal members 11 extend along the storage racks 1 and the unit load-handling unit 2 (unit load lifting device 17a, 17b and buffer devices 18a, 18b) in the longitudinal direction of the rack aisle 3 (x-direction) and in at least some of the rack levels (RE), preferably in every rack level (RE). The transport vehicles 7 may be moved along the longitudinal members 11 for storing unit loads 6-1, 6-2 and retrieving unit loads 6-1, 6-2 and unit loads 6-1, 6-2 to be retrieved can be removed from the storage channels 8 and transferred to the waiting devices 24 of buffer device 18a or buffer device 18b by means of their transport device 15 on the one hand, and unit loads 6-1, 6-2 to be transferred into storage can be removed from the waiting devices 23 of buffer device 18a or buffer device 18b and transferred to storage channels 8 by means of their transport device 15 on the other hand.

The process of storing and retrieving unit loads 6-1, 6-2 by means of the conveyor systems 4, 5, the unit load-handling unit 2 and the transport vehicles 7 is described in detail in WO 2013/090970 A2 which is included in the subject matter of this disclosure.

With a view to retaining clarity, the conveyor systems 4, 5 are only partially illustrated in FIG. 1. The conveyor system 4 for conveying unit loads 6-1, 6-2 to the unit load lifting device 17a, 17b and the conveyor system 5 for conveying unit loads 6-1, 6-2 away from the unit load lifting device 17a, 17b extend parallel with the rack aisle 3 underneath the storage racks 1 and constitute a conveyor system plane (FE).

The transport device 20a, 20b, which can be raised and lowered, can be positioned on a level with the conveyor system plane (FE) between the oppositely lying conveyor systems 4, 5 and on a level with the rack levels (RE) between the oppositely lying waiting devices 23, 24 in order to convey unit loads 6-1, 6-2 to be transferred to storage/retrieved from storage between the transport device 20a, 20b and the respective conveyor system 4, 5 and between the transport device 20a, 20b and the respective waiting device 23, 24 of the first/second buffer device 18a, 18b.

Based on another embodiment illustrated in FIG. 4, the unit load-handling unit 2 described above is disposed in front of the end of the storage racks 1. The front longitudinal members 11 (guide tracks) again extend along the storage racks 1 and unit load-handling unit 2 (unit load lifting device 17a, 17b and buffer devices 18a, 18b) in the longitudinal direction of the rack aisle 3 (x-direction) and in at least some of the rack levels (RE), preferably in every rack level (RE). Unit loads 6-1, 6-2 can be transferred to storage and retrieved from storage as described above.

FIGS. 5 and 6 illustrate one possible design of the transport vehicle 7, which is configured as a single-level storage and retrieval device.

As is also the case with the previous drawing, the transport vehicle 7 has a base frame 27, a receiving platform 28, running wheels 29, a travel drive with at least one drive motor 30 for driving at least one running wheel 29, at least one guide unit 31, an actuator drive with at least one drive motor 32 for extending/retracting the transport device 15, an electronic control system 33 and the transport device 15, for example for transferring unit loads 6-1, 6-2 to and/or from a storage rack 1. An appropriate sensor system may be provided for detecting the travel position of the transport vehicle 7 in the x-direction. By preference, a sensor 34 is provided in the form of a rotary encoder and is mounted on the drive motor 30. The distance by which the transport device 15 is extended in the z-direction can likewise be detected by an appropriate sensor system. By preference, a sensor 35 is provided in the form of a rotary encoder and is mounted on the drive motor 32.

The running wheels 29 are rotatably mounted on the base frame 27 (about a horizontal axis) and lie on a horizontal first guide 36 (FIG. 7) in a rollable manner, and the first guide 36 extends parallel with the longitudinal direction of the storage rack 1 and in a first guide plane extending parallel with the driving plane 16. The first guide 36 is preferably formed by the front longitudinal member 11.

As schematically illustrated in FIG. 6, the power and/or data supply of the transport vehicles 7, in particular the drive motors 30, 32 and electronic control system 33, is provided via a contact line arrangement 37 which is mounted to every one of the front longitudinal members 11 (guide tracks) in every driving plane 16 and extends across the entire length of the longitudinal member 11. The transport vehicle 7 comprises current collectors by means of which it contacts the contact lines of the contact line arrangement 37 for a supply of power and/or data.

As illustrated in more detail in FIG. 5, the transport device 15 (load receiving device) may comprise telescopic units 38 disposed parallel with one another on the support frame 27 and which can be synchronously extended from an initial position in both directions so that unit loads 6-1, 6-2 can be transferred to and unit loads 6-1, 6-2 can be retrieved from storage racks 1 disposed on either side of the transport vehicle 7.

The telescopic units 38 each have a base frame 39 and a rail 40, 41 which can be horizontally retracted and/or extended relative to the frame 39 in one direction (z-direction). The telescopic units 38 form telescopic arms. The first rail 40 is mounted on the base frame 39 so as to be displaceable by means of a guide arrangement and the second rail 41 is mounted on the first rail 40 so as to be displaceable by means of a guide arrangement. The first rail 40 can be moved relative to the base frame 39 with the aid of a schematically illustrated drive device 42, for example a toothed belt and rack arrangement. As may also be seen from FIG. 5, the first belt 43 is looped around a (front) first roller mounted on the first rail 40 and is mounted by its first end to the base frame 39 and by its second end to the second rail 41. A second belt 44 is looped around a (rear) second roller mounted on the first rail 40 and is mounted by its first end to the base frame 39 and by its second end to the second rail 41. When the first rail 40 is moved by the drive device 42, the second rail 41 is also moved by the belts 43, 44, in other words either retracted or extended.

The second rails 41 respectively comprise transport elements 45 for transporting unit loads 6-1, 6-2 between the storage channel 8 and the transport vehicle 7. The outer transport elements 45 are disposed in oppositely lying end regions of the second rail 41 and the inner transport element 45 is disposed centrally between the outer transport elements 45, and each transport element 45 is coupled with an electric drive motor and can be moved by means of the latter between an initial position and an operating position.

As may also be seen in FIG. 5, the receiving platform may be formed by unit load supports 28 extending in the z-direction. A single unit load 6-1 having the first length dimension or alternatively several unit loads 6-2 having the second length dimension may be transported on the receiving platform 28. Alternatively, in another embodiment although not illustrated, the receiving platform has a motorized conveyor device having a conveying direction extending parallel with the z-direction. The conveyor device is a belt conveyor or roller conveyor for example, which is operated substantially in synchronization with the actuation speed of the telescopic units.

FIGS. 7 and 8 illustrate a first embodiment of the guide unit 31 which is mounted on the base frame 27 of the transport vehicle 7 by means of a bearing device 46. The latter comprises guide wheels 49 which lie on a vertical second guide 47 and are able to roll on guide sections 48 facing away from one another and extending in a parallel arrangement, and the guide wheels 49 are rotatably mounted on the bearing device 46 (about a vertical axis). The second guide 47 extends parallel with the longitudinal direction of the storage rack 1 and in a second guide plane extending substantially perpendicular to the driving plane 16. On its traveling movement along the storage rack 1, the transport vehicle 7 can be moved in a guided manner by the guide unit 31 transversely, in particular perpendicular to the second guide plane. The second guide 47 is preferably formed by the front longitudinal member 11. If the guide tracks (longitudinal members 11) in each driving plane 16 are arranged in pairs, one of the guide tracks in each driving plane 16 has the first guide 36 and/or second guide 47.

Accordingly, the front longitudinal member 11 comprises both the first guide 36 and the second guide 47. However, within the scope of the invention, it is also possible for the first guide 36 and second guide 47 to be provided separately and disposed on different longitudinal members.

In detail, the front longitudinal member 11 comprises a first guide arm, a second guide arm, a mounting arm and a profiled arm. The mounting arm is formed by a vertical bottom profiled arm and a top profiled arm angled away from the latter in the direction towards the first guide arm. The first guide arm forms the horizontal first guide 36 or horizontal running surface on which the running wheels 29 sit in a rollable manner. The second guide arm forms the oppositely lying vertical guide sections 48 or vertical guide surfaces against which the guide wheels 49 lie in a rollable manner. The mounting arm forms mounting bores 50 arranged in a spaced pattern in the longitudinal direction of the longitudinal member 11 for attaching the front longitudinal member 11 to the storage rack 1 and/or to the front posts 9. As also schematically indicated in FIG. 7, the front longitudinal member 11 forms slit shaped recesses 51 from the angled top profiled arm down to the vertical bottom profiled arm in which the transverse member 13 of the storage rack 1 can be suspended or hooked. The slit-shaped recesses 51 are disposed at regular distances along the longitudinal members 11.

FIG. 8 illustrates the guide unit 31 with its bearing device 46 in detail. In the embodiment illustrated, the bearing device 46 has a rigid bearing body 52, an elastically flexible first compensating element 53 and an elastically flexible second compensating element 54. The guide wheels 49 are rotatably mounted on the bearing body 52 at a fixed distance (about vertical axes). The bearing body 52 is preferably of a U-shaped design and the guide wheels 49 are mounted on the bearing arms projecting out from a base. The compensating elements 53, 54 are disposed on both sides of the base frame 27, as may be seen from FIG. 7, and the first compensating element 53 is disposed between the base frame 27 and the bearing body 52. In addition, a first stop plate 55 may be disposed between the first compensating element 53 and the bearing body 52 which lies against the bearing body 52 in the mounted state. The second compensating element 54 is disposed between the base frame 27 and a second stop plate 56.

The first compensating element 53 and second compensating element 54 are respectively provided in the form of a spring element, in particular a compensating plate or damping plate made from plastic, in particular elastomer, such as polyurethane elastomer, or rubber. The bearing body 52 is able to move relative to the base frame 27 by means of the guide wheels 49.

The bearing body 52, compensating elements 53, 54 and stop plates 55, 56 are connected to the base frame 27 by means of a fixing element 57, for example screws. To this end, the bearing body 52 has threaded bores and the compensating elements 53, 54 and stop plates 55, 56 have end-to-end bores. The stop plates 55, 56 may be held in a spaced arrangement by means of spacer sleeves 58. The spacing is dimensioned so that the compensating elements 53, 54 are respectively biased between the stop plates 55, 56 and the base frame 27 when the guide unit 31 is mounted on the base frame 27.

In addition, the stop plates 55, 56 may respectively form a recess 59 at their internal face facing the compensating element 53, 54 in which material can "escape" during an elastic deformation of the compensating elements 53, 54.

This now results in a situation where any guidance inaccuracies there might be due to irregularities on the first guide 36 and/or second guide 47 and/or at a connecting joint between mutually connected longitudinal members 11 (guide tracks) can be largely or completely compensated by the bearing device 46 and vibrations on/in the storage rack 1 prevented when the transport vehicle 7 is traveling along the longitudinal member 11. In other words, the transport vehicle 7 is able to compensate for guidance inaccuracies in the z-direction in spite of being forcibly guided, as a result of which vibrations on the guide body 52 are directly damped by means of the elastically flexible compensating elements 53, 54. The storage racks 1 may therefore be based on a "thin-walled" and hence inexpensive design.

FIGS. 9 and 10 illustrate a second embodiment of a guide unit 60 which is mounted on the base frame 27 of the transport vehicle 7 by means of a bearing device 61. It comprises guide wheels 49 on a second guide 47 as described above lying in a rollable manner against guide sections 48 facing away from one another and extending parallel, and the guide wheels 49 are rotatably mounted on the bearing device 61 (about a vertical axis).

In the embodiment illustrated, the bearing device 61 has the rigid bearing body 52 and a single elastically flexible compensating element 53. The guide wheels 49 are rotatably mounted on the bearing body 52 at a fixed distance (about vertical axes). The bearing body 52 is preferably of a U-shaped design and the guide wheels 49 are mounted on the bearing arms projecting out from a base. The compensating element 53 is disposed on a side of the base frame 27, preferably between the base frame 27 and bearing body 52, as illustrated in FIG. 9. The compensating element 53 is provided in the form of a spring element, in particular a compensating plate or damping plate made from plastic, in particular elastomer, such as polyurethane elastomer, or rubber. The bearing body 52 is movable by means of the guide wheels 49 relative to the base frame 27.

The bearing body 52 and the compensating element 53 are connected to the base frame 27 by means of a fixing element 57, for example screws. To this end, the bearing body 52 has threaded bores and the compensating element 53 has end-to-end bores. The bearing body 52 and the base frame 27 may be held in a spaced arrangement by means of spacer sleeves 58. The spacing is dimensioned so that the compensating element 53 is biased between the bearing body 52 and base frame 27 when the guide unit 60 is mounted on the base frame 27.

In addition, the bearing body 52 may form a recess 51 at its internal face facing the compensating element 53 in which material can "escape" during an elastic deformation of the compensating element 53.

Also with this embodiment, the transport vehicle 7 is able to compensate for guidance inaccuracies in the z-direction in spite of being forcibly guided, as a result of which vibrations on the guide body 52 are directly damped by the elastically flexible compensating element 53.

FIGS. 11 and 12 illustrate a third embodiment of a guide unit 62 which is mounted substantially rigidly on the base frame 27 of the transport vehicle 7 by means of a bearing device 63. It comprises guide wheels 49 on a second guide 47 as described above lying in a rollable manner against guide sections 48 facing away from one another and extending parallel.

The bearing device 63 has a bearing body 64 with a first bearing arm 65 and a second bearing arm 66, an elastically flexible first compensating element 67 and an elastically flexible second compensating element 68. As may be seen, the first compensating element 67 is longer than the second compensating element 68 and the latter are disposed one above the other.

The compensating elements 67, 68 are respectively provided in the form of leaf springs, in particular made from spring steel, and are clamped to a mount 69 at one end. The first bearing arm 65 is connected to the first compensating element 67 and the second bearing arm 66 is connected to the second compensating element 68, in particular by means of a fixing means 73, such as screws for example. The bearing arms 65, 66 are respectively mounted in a stiff (rigid) arrangement on the compensating element 67, 68 by their bottom end in an end portion freely projecting out from the mount 69, in particular by means of a fixing means 73, such as screws for example. The first guide wheel 49 is rotatably mounted on the top end of the first bearing arm 65 (about a vertical axis). The second guide wheel 49 is rotatably mounted on the top end of the second bearing arm 66 (about a vertical axis). The first compensating element 67 may also have a first end-to-end bore in which the fixing means 73, such as a screw for example, can be positioned by means of a stepped spacer washer, as illustrated in FIG. 11. Similarly, the second compensating element 67 may have a second end-to-end bore in which the fixing means 73, such as a screw for example, can be positioned by means of a stepped spacer washer, as illustrated in FIG. 11. The end-to-end bores are disposed concentrically with a longitudinal axis of the screw.

The mount 69 comprises a mounting block 70 which sits against an external face of the base frame 27 facing the bearing device 63 when the bearing device 63 is mounted by means of a fixing element 71, for example screws, on the base frame 27, as illustrated in FIG. 11. In addition, a mounting plate 72 may be provided, which sits against an internal face of the base frame 27 facing away from the bearing device 63 when the bearing device 63 is mounted on the base frame 27 by means of the fixing element 71. To this end, the mounting block 70 has threaded bores and the mounting plate 72 has end-to-end bores. The compensating elements 67, 68 are connected to the mounting block 70 in a stiff (rigid) arrangement, in particular by means of a fixing means 73, such as screws for example.

The guidance inaccuracies which exist due to irregularities on the first guide 36 and/or second guide 47 and/or on a connecting joint between mutually connected longitudinal members 11 (guide tracks) are largely or totally compensated by the bearing device 63 and vibrations on/in the storage rack 1 are prevented when the transport vehicle 7 is traveling along the longitudinal member 11. To this end, the guide wheels 49 are movable relative to the base frame 27. The first guide wheel 49 and second guide wheel 49 may also move relative to one another so that a distance between the guide wheels 49 can be varied to a limited degree as the transport vehicle 7 travels along the longitudinal member 11 and there are guidance inaccuracies.

FIG. 13 illustrates a leaf spring such as might be used in the third embodiment. This leaf spring forms both the elastically flexible first compensating element 67 and the elastically flexible second compensating element 68. The compensating elements 67, 68 extend in one plane whereas in the embodiment illustrated in FIG. 11, the compensating elements 67, 68 extend in parallel planes one above the other. The leaf spring is a part formed from sheet metal without machining, in particular spring steel, in which the second compensating element 68 is produced by a free region in the sheet metal part. The first bearing arm 65 is mounted to the first compensating element 67 and the second bearing arm 66 is mounted to the second compensating element 68 by means of a fixing means, in particular screws. The (single) leaf spring is clamped on the mount 69 at one end as described above.

FIG. 14 illustrates a fourth embodiment of a guide unit 74 which is mounted in a substantially rigid manner on the base frame 27 of the transport vehicle 7 by means of a bearing device 75. It comprises guide wheels 49 mounted on a second guide 47 as described above in a rollable manner against guide sections 48 facing away from one another and extending parallel.

The bearing device 75 has a bearing body 76 with a first bearing arm 77 and a second bearing arm 78, an elastically flexible first compensating element 79 and an elastically flexible second compensating element 80. The bearing body 76 is connected to the base frame 27 in a stiff (rigid) arrangement by means of a fixing element 57, for example screws. To this end, the bearing body 52 has threaded bores. The first guide wheel 49 is mounted by means of its axle 81 via the elastically flexible first compensating element 79 on the first bearing arm 77 and the second guide wheel 49 is mounted by means of its axle 81 via the elastically flexible second compensating element 80 on the second bearing arm 78 so that the guide wheels 49 are movable relative to the bearing body 76 and relative to the base frame 27.

In the embodiment illustrated, the first compensating element 79 may comprise a bearing sleeve 82, an inner sleeve 83 and an elastomer ring 84 or rubber ring disposed between the bearing sleeve 82 and inner sleeve 83, and the bearing sleeve 82 forms a bore in which the axle 81 (bearing axle) of the guide wheel 49 is inserted. The bearing sleeve 82 and inner sleeve 83 are preferably deep-drawn metal parts. The axle 81 is a bearing bolt providing a bearing portion and a threaded portion. The bearing portion acts as a bearing for the first compensating element 79, in particular the bearing sleeve 82. The threaded portion is used to mount the guide wheel 49. To this end, the guide wheel 49 has a bearing collar 85 provided with a threaded bore. The bearing collar 85 is partially accommodated in a gap in the bearing arms 77, 78. The second compensating element 80 is of the same design and disposition. The compensating element 79, 80 forms a rubber bearing which is pressed into a bore in the first bearing arm 77 respectively second bearing arm 78.

Based on another embodiment, although this is not illustrated, it would also be possible for the first compensating element 79 to be disposed between the bearing collar 85 and the bearing of the first guide wheel 49 and/or for the second compensating element 80 to be disposed between the bearing collar 85 and the bearing of the second guide wheel 49.

FIG. 15 illustrates a fifth embodiment of a guide unit 86 which is mounted on the base frame 27 of the transport vehicle 7 by means of a bearing device 87. It comprises guide wheels 49 on a second guide 47 as described above lying in a rollable manner against guide sections 48 facing away from one another. By contrast with the previous drawings, the guide sections 48 of the second guide 47 do not extend parallel with one another but extend at an angle to one another and subtend an angle.

In the embodiment illustrated, the bearing device 87 has a rigid first bearing body 89, a rigid second bearing body 90 and an elastically flexible compensating element 53 and the bearing bodies 89, 90 are separated from one another.

The first bearing body 89 is of an L-shaped design and is fixedly connected to the base frame 27 by its first end portion by means of a fixing element 57, in particular screws. The first guide wheel 49 is rotatably mounted on the second end portion (about an inclined axis). The distance between the first guide wheel 49 and the base frame 27 does not vary.

The second bearing body 90 is rectangular in shape and the second guide wheel 49 is rotatably mounted (about a vertical axis). As illustrated in the drawing, the compensating element 53 is disposed between the second bearing body 90 and the base frame 27. This compensating element 53 is again provided in the form of a spring element, in particular a compensating plate or damping plate made from plastic, in particular elastomer, such as polyurethane elastomer, or rubber. The second bearing body 90 is therefore movable with the second guide wheel 49 relative to the base frame 27.

The second bearing body 90 and the compensating element 53 are connected to the base frame 27 by means of a fixing element 57, for example screws. To this end, the second bearing body 90 has threaded bores and the compensating element 53 has end-to-end bores. The recess 59 described above may also be provided in the second bearing body 90.

It should also be pointed out that the guide wheels 49, as illustrated in more detail in FIG. 11 for example, respectively comprise a bearing (roller bearing), a wheel hub and an elastically flexible facing, in particular made from plastic, such as polyurethane. Due to its elastic property, the facing is in principle suitable for compensating for irregularities to a limited degree but the facing should not be too soft because it would be subjected to too much wear. It has been found in practice that the combination of guide wheels 49 having an elastically flexible facing and the provision of at least one elastically flexible compensating element 53; 54; 67, 68; 79, 80 enables outstanding damping characteristics to be achieved so that irregularities on the first guide 36 respectively second guide 47; 88 will not affect the smooth running of the transport vehicle 7. The plastic of the facing of the first guide wheel 49 and/or second guide wheel 49 has a hardness in the range of 70 Shore A to 100 Shore A, in particular 93 Shore A (DIN 53505) so that a precise guiding action is obtained. The compensating element 53; 54; 67, 68; 79, 80 has a hardness in the range of 30 Shore A to 50 Shore A (DIN 53505) so that a sufficiently precise guiding action and a high damping action relative to the guide wheel 49 can be achieved.

It should also be noted that the transport vehicle 7 may also be equipped with two guide units 31; 60; 62; 74; 86 on one vehicle side, as described above. This is illustrated in FIG. 30.

As explained in the description given above, any guidance inaccuracies which exist due to irregularities on the second guide and/or on a connecting joint between mutually connected guides are compensated by means of the compensating element so that barely any vibrations are induced on/in the storage rack 1 even at high travel speeds of the transport vehicles 7 (unit load receiving devices).

A method feature for distributing unit loads 95-1, 95-2, 95-3 to storage spaces 96-1, 96-2 in a storage system in a coordinated manner by means of an electronic control system 14; 115 will be described below, based on a first example of an embodiment in a storage system (FIGS. 17 to 19) having single-level storage and retrieval devices and based on a second example of an embodiment in a storage system (FIGS. 20 to 21) having a multi-level storage and retrieval device, distribution of the unit loads 95-1, 95-2, 95-3 being dependent on a unit load-property characteristic value specific to the unit load. The unit loads 95-1, 95-2, 95-3 have different length/width/height dimensions (volume dimensions) and/or different weights.

The unit loads 95-1, 95-2; 95-3 are boxes (packaging units) or loading aids (LHM), such as trays or containers, by means of which individual articles or at least one box can be conveyed and stored in each loading aid. The boxes contain individual articles, for example from the textile sector or food industry.

FIGS. 17 to 19 illustrate the storage system, which may comprise parallel storage racks 1, a unit load-handling unit 2, at least one rack aisle 3 extending between the storage racks 1 and along the unit load-handling unit 2 in an x-direction, a conveyor system 4, 5 adjoining the unit load-handling unit 2 for transporting unit loads 95-1, 95-2, 95-3 in and for transporting unit loads 95-1, 95-2, 95-3 out and unit load receiving devices (transport vehicles 7) for transporting the unit loads 95-1, 95-2, 95-3 to the storage spaces 96-1, 96-2 and/or transporting the unit loads 95-1, 95-2, 95-3 out of the storage spaces 96-1, 96-2. It should be pointed out at this stage that that only some of the unit loads 95-1, 95-2, 95-3 are illustrated in the views shown in FIGS. 17 to 19.

The unit load receiving devices are single-level storage and retrieval devices. In the example illustrated, there are two storage racks 1. Within the scope of the invention, however, there may also be more than two storage racks 1, in which case a rack aisle 3 is disposed respectively between adjacent storage racks 1. It may also be that only a single storage rack 1 is provided. To retain greater clarity, only parts of the conveyor system 4, 5 are illustrated in FIG. 17.

The storage racks 1 illustrated by way of example may comprise vertical front rack posts 9 disposed respectively adjacent to the rack aisle 3 and vertical rear rack posts 10 disposed at a distance back from the rack aisle 3. The front rack posts 9 are connected to front longitudinal members 11 extending horizontally in the direction of the rack aisle 3 and the rear rack posts 10 are connected to rear longitudinal members 12 extending horizontally in the direction of the rack aisle 3. Transverse members 13 extending in the depth direction of a storage rack 1 (z-direction) may be provided between the longitudinal members 11, 12. In this case, the transverse members 13 form a storage surface and/or storage spaces 96-1, 96-2. A unit load 95-1, 95-2, 95-3 is stored on at least two transverse members 13 depending on the width dimension.

Accordingly, every storage rack 1 forms a plurality of mutually adjacent storage spaces 96-1, 96-2 in rack levels (RE) lying one above the other. The unit loads 95-1, 95-2, 95-3 are therefore stored in storage spaces 96-1, 96-2 at depth positions lying one behind the other in the depth direction (z-direction) of the storage rack 1. A unit load 95-1, 95-2, 95-3 is allocated to each storage space 96-1, 96-2. As illustrated in FIGS. 17 and 19, the number of storage spaces 96-1, 96-2 lying one behind the other varies depending on a length dimension of the unit load 95-1, 95-2, 95-3. For example, four unit loads 95-1, three unit loads 95-2 or two unit loads 95-3 may be stored in the depth direction (z-direction). To the person skilled in the art, this type of storage is known as multiple depth storage. However, it would also be possible for just one unit load 95-1, 95-2, 95-3 to be stored in the depth direction (z-direction). To the person skilled in the art, this type of storage is known as single depth storage. Although the unit loads 95-1, 95-2, 95-3 are illustrated as all having the same width in the drawings with a view to retaining greater clarity, they may also be of different width dimensions.

In the embodiment illustrated, the storage system comprises unit load receiving devices (transport vehicles 7) which can be moved in (horizontal) driving planes 16 lying one above the other in front of the storage rack 1 and which can be activated independently of one another by the control system 14 in order to transfer the unit loads 95-1, 95-2, 95-3 to the storage spaces 96-1, 96-2 and/or to retrieve unit loads 95-1, 95-2, 95-3 from the storage spaces 96-1, 96-2. At least one unit load receiving device may be provided for every rack level (RE). A unit load receiving device therefore services a rack level by means of the transport device 15.

The unit load receiving device corresponds to the transport vehicle 7 described above and reference may be made to this disclosure. The unit load receiving device is provided with the transport device 15 by means of which the unit loads 95-1, 95-2, 95-3 are transferred to the storage spaces 96-1, 96-2 or the unit loads 95-1, 95-2, 95-3 are retrieved from the storage spaces 96-1, 96-2. The transport device 15 corresponds to the unit load-transport device described above (FIG. 5) and reference may be made to this disclosure. The transport device 15 may be extended/retracted in a transverse direction (z-direction) from an initial position in both directions and transfer one or more unit loads 95-1, 95-2, 95-3 to the storage spaces 96-1, 96-2 or retrieve them from the storage spaces 96-1, 96-2.

In the embodiment illustrated as an example, the driving planes 16 and rack levels (RE) lie at substantially the same height and the longitudinal members 11 extending in the longitudinal direction of the rack aisle 3 (x-direction) and lying opposite one another in pairs respectively form a driving plane 16. The longitudinal members 11 (guide tracks) are connected to the storage rack 1. In particular, the guide tracks are screwed to the front rack posts 9. The guide tracks extend parallel with the storage rack 1, i.e. in the x-direction.

The unit load receiving device is guided by means of a guide unit on at least one of the longitudinal members 11 (guide tracks) in each driving plane 16 and can be moved along the longitudinal members 11 in every driving plane 16. To this end, at least one of the longitudinal members 11 in every driving plane 16 may have a guide 47; 88 extending parallel with the longitudinal direction of the storage rack 1 and extending in a guide plane intersecting the driving plane 16 (FIG. 7; 9; 11; 14; 15). The guide unit is mounted on the base frame 27 by means of a bearing device and has guide wheels 49 lying on the guide 47; 88 in a rollable manner against guide sections 48 facing away from one another and extending parallel, the guide wheels 49 being rotatably mounted on the bearing device 46; 61; 63; 75; 87.

The unit load receiving device 7 is guided and can be moved along at least one of the guide tracks in every storage level or driving plane in front of the storage rack 1 in a first direction (x-direction). The guide tracks in this embodiment are disposed horizontally adjacent to one another in every rack level/driving plane.

Based on one of the embodiments described above (FIGS. 7; 9; 11; 13; 14 and 15), the bearing device may be provided with one or more elastically flexible compensating element(s) or may not have an elastically flexible compensating element.

At this stage, it should be noted that based on another embodiment, although this is not illustrated, it would also be possible to provide fewer transport vehicles 7 than there are rack levels (RE), as described above. The unit load-handling unit 2 corresponds to the unit load-handling unit described above and reference may be made to this disclosure. The same applies to the conveyor system 4, 5 for transporting unit loads 95-1, 95-2, 95-3 in and for transporting unit loads 95-1, 95-2, 95-3 out.

Based on this embodiment, the unit loads 95-1, 95-2, 95-3 are conveyed to the storage spaces 96-1, 96-2 on the receiving platform 28 (FIG. 5) which can be moved in a first direction (x-direction) and are transferred from the unit load receiving device 7 into the storage spaces 96-1, 96-2 by means of the transport device 15 in a third direction (z-direction) (FIG. 5). Before this, the unit loads 95-1, 95-2, 95-3 are conveyed by means of the unit load lifting device 17a, 17b in the second direction (y-direction) to the corresponding waiting devices 23, as described above.

FIGS. 20 and 21 illustrate another embodiment of a storage system, which comprises parallel storage racks 98, at least one automated unit load receiving device 97 for transporting the unit loads 95-1, 95-2, 95-3 to the storage spaces 96-1, 96-2 and/or for transporting the unit loads 95-1, 95-2, 95-3 from the storage spaces 96-1, 96-2 and an automated conveyor system for transporting unit loads 95-1, 95-2, 95-3 in and for transporting unit loads 95-1, 95-2, 95-3 out. It should be noted that in the different views shown in FIGS. 20 and 21, only some of the unit loads 95-1, 95-2, 95-3 are illustrated.

The automated conveyor system comprises a first conveyor device 4 for transporting incoming unit loads 95-1, 95-2, 95-3 to the unit load receiving device 97 and a second conveyor device 5 for transporting outgoing unit loads 95-1, 95-2, 95-3 from the unit load receiving device 97.

The storage racks 98 illustrated by way of example may comprise vertical front rack posts 100 respectively adjacent to the rack aisle 99 and vertical rear rack posts 101 disposed at a distance back from the rack aisle 99. The front rack posts 100 are connected to front longitudinal members 102 extending horizontally in the direction of the rack aisle 99 and the rear rack posts 101 are connected to rear longitudinal members 103 extending horizontally in the direction of the rack aisle 99. Transverse members 104 extending in the depth direction of a storage rack 98 (z-direction) may be provided between the longitudinal members 102, 103. In this case, the transverse members 104 form a storage surface or storage spaces 96-1, 96-2. A unit load 95-1, 95-2, 95-3 is stored on at least two transverse members 104 depending on the width dimension.

Accordingly, every storage rack 98 forms a plurality of mutually adjacent storage spaces 96-1, 96-2 in rack levels (RE) lying one above the other. The unit loads 95-1, 95-2, 95-3 are therefore stored in storage spaces 96-1, 96-2 at depth positions lying one behind the other in the depth direction (z-direction) of the storage rack 98. A unit load 95-1, 95-2, 95-3 is allocated to every storage space 96-1, 96-2. As illustrated in FIGS. 20 and 21, the number of storage spaces 96-1, 96-2 lying one behind the other varies depending on a length dimension of the unit load 95-1, 95-2, 95-3. For example, four unit loads 95-1, three unit loads 95-2 or two unit loads 95-3 may be stored in the depth direction (z-direction). To the skilled person, this type of storage is known as multiple depth storage. However, it would be possible for just one unit load 95-1, 95-2, 95-3 to be stored in the direction (z-direction). To the skilled person, this type of storage is known as single depth storage. Although the unit loads 95-1, 95-2, 95-3 are illustrated as all having the same width in the drawings with a view to retaining greater clarity, they may also be of different width dimensions.

The unit load receiving device 97 illustrated in FIGS. 20 and 21 is a storage and retrieval machine, for example of the type known from EP 2 419 365 B1. The storage and retrieval machine comprises a vertical mast 105, a bottom running gear 106a mounted to the mast base, a top running gear 106b mounted to the mast head, at least one receiving platform 107 disposed on the mast 105, a lifting drive 108 for moving the receiving platform 107 in the y-direction and a travel drive 109 for moving the storage and retrieval machine in the x-direction. The bottom running gear 106a is guided on a bottom guide track 110 and the top running gear 106b is guided on a top guide track 111. The bottom guide track 110 is mounted on the floor of a building by means of fixing devices (not illustrated). The top guide track 111 may be either mounted to the storage racks 98 by means of cross-members (not illustrated) or mounted on the ceiling of a building by means of fixing devices (not illustrated).

The receiving platform 107 is mounted so as to be height-adjustable on the vertical mast 105 in the y-direction by means of the lifting drive 108. The lifting drive is provided in the form of a traction drive and at least one electric drive motor (FIG. 21) coupled therewith. A single unit load 95-1, 95-2, 95-3 or alternatively several unit loads 95-1, 95-2, 95-3 can be transported on the receiving platform 107.

The storage and retrieval machine is mounted so that it can be moved on the guide tracks 110, 111 in the x-direction by means of the travel drive 109. The guide tracks 110, 111 extend parallel with the storage rack 98, i.e. in the x-direction. The bottom running gear 106a comprises the travel drive 109, which is provided in the form of at least one electric drive motor and a drive roller coupled therewith. It is preferable to provide two drive motors and two drive rollers.

Accordingly, the unit load receiving device 97 can be moved and is guided in front of the storage rack 98 in a first direction (x-direction) along the bottom guide track 109 and top guide track 111. The guide tracks 109, 111 in this embodiment are disposed vertically one above the other.

As may be seen from the drawings, the unit load receiving device 97 is provided with a transport device 15 by means of which the unit loads 95-1, 95-2, 95-3 are transferred to the storage spaces 96-1, 96-2 or the unit loads 95-1, 95-2, 95-3 are retrieved from the storage spaces 96-1, 96-2. The transport device 15 may comprise telescopic units 38 which may be extended synchronously in a transverse direction (z-direction) from an initial position in two directions so that unit loads 95-1, 95-2, 95-3 can be stored and/or unit loads 95-1, 95-2, 95-3 retrieved from the storage racks 98 disposed on both sides of the storage and retrieval machine. The transport device 15 corresponds to the unit load-transport device described above (FIG. 5) and reference may be made to this disclosure.

Based on this embodiment, the unit loads 95-1, 95-2, 95-3 are conveyed on the movable receiving platform 107 in a first direction (x-direction) and second direction (y-direction) to the storage spaces 96-1, 96-2 and are conveyed by means of the transport device 15 in a third direction (z-direction) from the unit load receiving device 97 into the storage spaces 96-1, 96-2.

As illustrated in FIGS. 17 and 20, at least one detection device 112 is provided for identifying the unit loads 95-1, 95-2, 95-3. The detection device 112 may read a data carrier (not illustrated) on the unit load 95-1, 95-2, 95-3 and the control system 14; 115 unambiguously identifies the unit load 95-1, 95-2, 95-3. The data carrier is a barcode or RFID (Radio Frequency Identification Device), for example, and the detection device 112 is a barcode reading device or a camera system, for example. The detection device 112 is connected to the electronic control system 14; 115 in order to transmit thereto the identification data relating to every unit load 95-1, 95-2, 95-3.

Furthermore, in order to detect a unit load-property characteristic value specific to the unit load, a measuring device 113 is provided by means of which the dimensions (length, width, height) or the weight, or the dimensions (length, width, height) and the weight of every unit load 95-1, 95-2, 95-3 are detected. The dimensions of the unit loads 95-1, 95-2, 95-3 are detected contactlessly and preferably during the conveying movement on the conveyor device 4, for example by means of an optoelectronic measuring system. The weight measurement may preferably likewise be taken during the conveying movement on the conveyor device 4. The length/width/height dimensions for every unit load 95-1, 95-2, 95-3 may be determined by image processing algorithms using the image from a camera system. Alternatively and/or in addition, what is known as a vertical light curtain (not illustrated) is provided through which the unit load 95-1, 95-2, 95-3 passes when being conveyed and which is configured to detect an external contour of the unit load 95-1, 95-2, 95-3.

The measuring device 113 is connected to the electronic control system 14; 115 in order to transmit thereto measurement signals (measurement data) for evaluating/calculating a length/width/height dimension (volume dimension) for every unit load 95-1, 95-2, 95-3 and/or measurement signals for evaluating/calculating a weight for every unit load 95-1, 95-2, 95-3. It is preferable to take a volume measurement and a weight measurement for every unit load 95-1, 95-2, 95-3.

The electronic control system 14; 115 comprises an evaluation module 114 which is configured to calculate a unit load-property characteristic value based on the determined length/width/height dimensions and/or the determined weight. Accordingly, detection of the unit load-property characteristic value for every unit load 95-1, 95-2, 95-3 is based on actual values. The evaluation module 114 is able to calculate a density for every unit load 95-1, 95-2, 95-3 from the directly measured or determined (calculated) length/width/height dimensions and the measured weight and the density constitutes a unit load-property characteristic value.

In the case of the first embodiment described above, a volume measurement and weight measurement or a volume measurement or weight measurement are obtained for every unit load 95-1, 95-2, 95-3 but in the case of a second embodiment, data stored in a data bank relating to every unit load 95-1, 95-2, 95-3 can be accessed. The data contains data for every unit load 95-1, 95-2, 95-3 relating to length/width/height dimensions and/or weight. In this case, the measuring operation can be dispensed with and the unit load-property characteristic value can be calculated by the evaluation module 114 based on the stored length/width/height dimensions and/or stored weight. It is preferable if the unit load-property characteristic value determined is the density. Accordingly, detection of the unit load-property characteristic value for every unit load 95-1, 95-2, 95-3 is based on desired values. In this case, it is sufficient for the unit loads 95-1, 95-2, 95-3 to be identified using a data carrier, for example a barcode or an RFID (Radio Frequency Identification Device) and the detection device 112 (unit load identification unit), for example a reading device or image processing device. In particular, an identification code is read, in particular a barcode is scanned, from a data carrier directly applied by the supplier to the unit load 95-1, 95-2, 95-3 (package) or to a load carrier (for example pallet) on which unit loads 95-1, 95-2, 95-3 are stacked. This identification code can be used to access the data bank and the stored target values for the length/width/height dimensions and/or weight of the respective unit load 95-1, 95-2, 95-3.

In principle, a combination of the first embodiment and second embodiment would also be possible. For example, the length/width/height dimensions are stored in a data bank and are therefore the target values that are applied whereas the weight is measured and is therefore the actual value applied. This embodiment is primarily used if a picking operation is being run and a leftover quantity is being returned to the storage rack 1; 98. The actual value after the picking operation is smaller than the actual value before the picking operation. The actual value before the picking operation therefore corresponds to the target value.

In accordance with the invention, the unit loads 95-1, 95-2, 95-3 are selectively distributed to the storage spaces 96-1, 96-2 depending on a unit load-property characteristic value for every unit load 95-1, 95-2, 95-3. This prevents any inadmissible shifting of the unit loads 95-1, 95-2, 95-3 in the storage rack 1; 98 when they are being placed in the storage spaces 96-1, 96-2. This is the case even if vibrations are induced in the storage rack 1; 98 due to the traveling movement of the single-level storage and retrieval devices (FIG. 17 to 19) or due to the traveling movement of the storage and retrieval machines (FIG. 20, 21) and/or due to turbulent air flows caused by the traveling movement of the single-level storage and retrieval devices or by the traveling movement of the storage and retrieval machines.

To this end, the electronic control system 14; 115 comprises a memory module 117, in which a list of values with different identification values for the storage spaces 96-1, 96-2 is stored. This list of values is created before starting up the storage system and is stored in the memory module 117 from where it can be retrieved. The identification values are determined in such a way that the storage spaces 96-1, 96-2 are either storage spaces 96-1, 96-2 belonging to a first storage space category or storage spaces 96-1, 96-2 belonging to a second storage space category. The storage space category for at least some, but preferably every, storage space 96-1, 96-2 in the storage rack 1; 98 is detected by the control system 14; 115. In other words, the list of values corresponds to an assignment list which predetermines the assignment of available storage spaces 96-1, 96-2 respectively to a storage space 96-1 of the first storage space category and a storage space 96-1 of the second storage space category.

The measured/determined length/width/height dimensions and/or measured weight or calculated unit load-property characteristic value, in particular the density, for every unit load 95-1, 95-2 may also be stored in this memory module 117.

A threshold value for the unit load-property characteristic value (that will be described in more detail below) may likewise be stored in the memory module 117.

A storage space of the first storage space category is a storage space 96-1 in which a unit load 95-2 placed in it will tend to shift due to the traveling movements of the at least one unit load receiving device 7; 97 and a storage space of the second storage space category is a storage space 96-2 in which a unit load 95-1 placed in it is less likely to shift due to the traveling movements of the at least one unit load receiving device 7; 97. The first storage spaces 96-1 may also be described as "critical" storage spaces and the second storage spaces 96-2 may also be described as "non-critical" storage spaces.

With reference to FIGS. 22 to 25, examples of different storage space distributions will be described below. The following embodiments are based on the storage system illustrated in FIGS. 17 to 19 and the storage system illustrated in FIGS. 20 and 21.

FIG. 22 is a plan view illustrating a storage surface 118 of one of the storage levels of the storage rack 1; 98, for example in the upper height region of the storage rack 1; 98, and the storage surface 118 has a plurality of storage spaces disposed adjacent to one another and one behind the other. As illustrated, all of the storage spaces 96-1 on this storage surface 118 are first storage spaces 96-1 and hence "critical" storage spaces. Second unit loads 95-2 are stored in these storage spaces 96-1, as will be described below.

FIG. 23 is a plan view illustrating a storage surface 118 of one of the storage levels of the storage rack 1; 98, for example in the mid-height region of the storage rack 1; 98, and the storage surface 118 has a plurality of storage spaces disposed adjacent to one another and one behind the other. In this example of an embodiment, the second storage spaces 96-2 (non-critical storage spaces) are disposed here in the region close to the rack posts 9, 10; 100, 101 and the first storage spaces 96-1 (critical storage spaces) are disposed at a distance away from the rack posts 9, 10; 100, 101. As will be described below, second unit loads 95-2 are stored in the first storage spaces 96-1 and first unit loads 95-1 are stored in the second storage spaces 96-2, as will also be described below.

FIG. 24 is a plan view illustrating a storage surface 118 of one of the storage levels of the storage rack 1; 98, for example in the lower height region of the storage rack 1; 98, and the storage surface 118 has a plurality of storage spaces disposed adjacent to one another and one behind the other. As illustrated, all of the storage spaces 96-2 on this storage surface 118 are second storage spaces 96-2 and hence "non-critical" storage spaces. As will be explained below, first unit loads 95-1 are stored in these storage spaces 96-2.

In other words, there may be different storage space distributions in a storage rack 1; 98 on different storage levels/storage surfaces 118, as illustrated in FIGS. 22 to 24.

FIG. 25 is a plan view illustrating a storage surface 118 of one of the storage levels of the storage rack 1; 98, and the storage surface 118 has a plurality of storage spaces 96-1, 96-2 disposed adjacent to one another and one behind the other. As illustrated, those storage spaces adjacent to the unit load receiving device 7; 97 are first storage spaces 96-1 and hence "critical" storage spaces and those storage spaces disposed at a distance apart from the unit load receiving device 7; 97 are second storage spaces 96-2 and hence "non-critical" storage spaces. As will be described below, second unit loads 95-2 are stored in the first storage spaces 96-1 and first unit loads 95-1 are stored in the second storage spaces 96-2, as will be described below.

In other words, there may be storage space distributions based on that illustrated in FIG. 25 in a storage rack 1; 98 on at least some of the storage levels/storage surfaces 118.

Based on another embodiment, a storage space distribution in storage racks 1; 98 may be such that in a first storage rack 1; 98, there may be one of the storage space distributions described above or a combination of these storage space distributions, whereas in a second storage rack 1; 98, there may be a different designated storage space distribution.

This is the case, for example if the unit load receiving device 7; 97 is guided in such a way that vibrations are induced either only in the first storage rack 1; 98 or only in the second storage rack 1; 98 due to the traveling movement of the unit load receiving device 7; 97 (FIG. 20, 21). Accordingly, the guide track along which the unit load receiving device 7; 97 is guided as it moves is connected either to the first storage rack 1; 98 or to the second storage rack 1; 98. The first storage rack 1; 98 and second storage rack 1; 98 are disposed on both sides of the rack aisle 3; 99, as illustrated in FIGS. 17 and 20.

For example, FIG. 6 illustrates the guide track connected to the (left-hand) second storage rack 1 and the unit load receiving device 7 guided along this guide track. The guide unit is provided for this purpose and is mounted on the left-hand side of the base frame 27. No guide unit is provided on the right-hand side of the base frame 27 and it is only the running wheels 29 which lie on the guide track in a rollable manner. A lateral guide is not provided. This means that vibrations are induced in the (left-hand) second storage rack 1 only. The vibrations induced in the (right-hand) first storage rack 1 are negligible.

This means, firstly, that the first storage rack 1; 98 in which no vibrations are induced by the traveling movement of the unit load receiving device 7; 97 (FIG. 20, 21) may have only storage spaces 96-2 of the second storage space category in the majority of rack levels, which will simplify the storage space distribution in the majority of rack levels, preferably in all of the rack levels, as illustrated in FIG. 24. Accordingly, the unit loads 95-1 stored there will be predominantly or exclusively those which might have a tendency to shift in the storage space.

When there is a drop below a threshold value that will be described below, the unit load 95-1 will be transferred by means of the unit load receiving device 7; 97/transport device 15 to an unoccupied storage space of the second storage space category in the first storage rack 1; 98. If all of these storage spaces are occupied, subsequent unit loads 95-1 can be transferred to an unoccupied storage space of the second storage space category in the second storage rack 1; 98, as described above. To this end, the unit load receiving device (7; 97)/transport device 15 is activated with corresponding control commands by the control system 14; 115, in particular a control module.

The ultimate storage space distribution across all of the storage levels/storage surfaces 118 and/or storage racks 1; 98 is determined, for example, by the rigidity of the storage rack 1; 98 and/or its vibration behavior and/or based on a knowledge of air flows/air turbulence generated by the dynamic traveling movement of the unit load receiving device(s) 7; 97 and/or a knowledge of the layout of the guide track(s) on the storage rack.

For example, the storage spaces 96-1 of the first storage space category may lie in those regions of the storage rack 1; 98 in which vibration induced by the traveling movement of the unit load receiving device(s) 7; 97 in the storage rack 1; 98 has a maximum vibration amplitude.

The storage spaces 96-2 of the second storage space category may lie in those regions of the storage rack 1; 98 in which vibration induced by the traveling movement of the unit load receiving device(s) 7; 97 in the storage rack 1; 98 has a minimum vibration amplitude.

The control system 14; 115 comprises a warehouse management computer 116 which is configured to determine unoccupied storage spaces 96-1, 96-2 of the first storage space category and unoccupied storage spaces 96-1, 96-2 of the second storage space category.

The control system. 14; 115 comprises an electronic control module 119 which is configured to activate the unit load receiving device(s) 7; 97 and the transport device 15 and to transfer the unit loads 95-1, 95-2 selectively to the unoccupied storage spaces 96-1, 96-2 of the first storage space category and unoccupied storage spaces 96-1, 96-2 of the second storage space category, as will be described in more detail with reference to FIG. 26.

To enable this selective transfer of the unit loads 95-1, 95-2 into the storage spaces 96-1, 96-2 of the first storage space category and unoccupied storage spaces 96-1, 96-2 of the second storage space category, the control system 14; 115 comprises a comparison module 120, which is configured to evaluate the unit load-property characteristic value specific to the unit load determined for every unit load 95-1, 95-2 with reference to a threshold value for a unit load-property characteristic value.

If it is ascertained by the comparison module 120 that there is a variance of the determined unit load-property characteristic value specific to the unit load from the threshold value for the unit load-property characteristic value which falls below a threshold value, the unit load 95-1 is then transferred by means of the unit load receiving device 7; 97/transport device 15 to an unoccupied storage space 96-2 of the second storage space category. In other words, that (first) unit load 95-1 that, if deposited in the storage space, would have more of a tendency to shift there if vibrations were induced in the in the storage rack or a turbulent air flow were generated than that (second) unit load 95-2 that, if deposited in the storage space, would have less of a tendency to shift there if vibrations were induced in the storage rack or a turbulent air flow were generated, is stored in a "non-critical" storage space 96-2.

If, on the other hand, it is ascertained by the comparison module 120 that there is a variance of the determined unit load-property characteristic value specific to the unit load from the threshold value for the unit load-property characteristic value that exceeds a threshold value, the unit load 95-2 is transferred by means of the unit load receiving device 7; 97/transport device 15 to an unoccupied storage space 96-1 of the first storage space category. In other words, that (second) unit load 95-2 that, if deposited in the storage space, would have less of a tendency to shift there if vibrations were induced in the storage rack or a turbulent air flow were generated than that (first) unit load 95-1 that, if deposited in the storage space, would have more of a tendency to shift there if vibrations were induced in the storage rack or a turbulent air flow were generated is (and/or can be) stored in a "critical" storage space 96-1.

In practice, a threshold value for the unit load-property characteristic value of approximately 50 g/dm$^3$ and/or 0.05 kg/l has proved to be effective.

FIG. 26 is a sequence diagram illustrating the designation of the storage space configuration/threshold value for the unit load-property characteristic value and the procedure for storing unit loads 95-1, 95-2.

Step S10 in which a storage space category is designated for some of the storage spaces 96-1, 96-2, preferably for each storage space 96-1, 96-2 in the storage rack 1; 98 or preferably for each storage space 96-1, 96-2 in the storage racks 1; 98 if storage racks are provided on both sides of the rack aisle 3; 99, is implemented prior to starting up the storage system. As described above, the storage space category is determined from the vibration behavior and/or rigidity of the storage rack 1; 98 and/or on the basis of a knowledge of the air flows/air turbulence induced by the dynamic traveling movement of the unit load receiving device(s) 7; 97 and/or on the basis of a knowledge of the layout of the guide track(s) on the storage rack 1; 98. A corresponding list of values with different identification values/storage space categories for the storage spaces 96-1, 96-2 is stored in the memory module 117. Accordingly, a distinction is made between "critical" storage spaces and "non-critical" storage spaces. The allocation/assignment of available storage spaces 96-1, 96-2 respectively to a storage space 96-1 of the first storage space category and a storage space 96-1 of the second storage space category can be defined in the list of values/assignment list described above.

In step S20, a threshold value for the unit load-property characteristic value is set and stored in the memory module 117. This step is likewise preferably implemented prior to starting up the storage system. The threshold value may be defined as a fixed value or as a variable.

In step S30, the unit load-property characteristic values relating to the unit loads 95-1, 95-2, 95-3 are detected as described above, based on either the actual values or target values of the volume dimension/weight or the actual values and target values of the volume dimension/weight.

In step S40, the comparison is run for the unit loads 95-1, 95-2, 95-3 between the calculated unit load-property characteristic value specific to the unit loads and the threshold value set for the unit load-property characteristic value.

If there is a drop below the threshold value (50 g/dm$^3$), for example the calculated unit load-property characteristic value specific to the unit load is 30 g/dm$^3$, the unit load 95-1 is transferred by means of the unit load receiving device 7; 97/transport device 15 to an unoccupied storage space of the second storage space category, hence a "non-critical" storage space 96-2, in a step S50. To this end, the unit load receiving device 7; 97/transport device 15 is activated with corresponding control commands by the control system 14; 115, in particular the control module 119. FIGS. 17 and 19 also illustrate this situation for the unit loads 95-3. This storage space 96-2 may be located in any one of the storage levels and in any one of the storage racks 1; 98 if several storage racks 1; 98 are provided.

If the threshold value (50 g/dm$^3$) is exceeded, for example the calculated unit load-property characteristic value specific to the unit load is 70 g/dm$^3$, the unit load 95-2 is transferred by means of the unit load receiving device 7; 97/transport device 15 to an unoccupied storage space of the first storage space category, hence a "critical" storage space 96-1, in a step S50. To this end, the unit load receiving device 7; 97/transport device 15 is activated with corresponding control commands by the control system 14; 115, in particular the control module 119. This storage space 96-1 may be located in any one of the storage levels and in any one of the storage racks 1; 98 if several storage racks 1; 98 are provided.

FIGS. 27 to 29 illustrate one of the running wheels 29' based on a modified embodiment. This modified running wheel 29' may be used instead of the running wheels 29 illustrated in FIG. 5.

The modified running wheel 29' comprises a wheel hub 121 and a facing 122 disposed coaxially with the wheel hub 121 in addition to an elastic damping element 123 (which flexes resiliently when subjected to radial forces) disposed between the wheel hub 121 and the facing 122. The elastic damping element 123 is disposed coaxially with the wheel hub 121. The running wheels 29' lie on a first guide 36 (see FIG. 7 for example) in a rollable manner by means of the facing 122. The running wheel 29' may also comprise a bearing bush 124 in the end-to-end bore of the wheel hub 121. The running wheels 29' are attached to a drive shaft (see FIG. 30), preferably pressed onto the ends of the drive shaft.

The wheel hub 121 comprises an inner ring 125, an outer ring 126, a central web 127 and ribs 128. The central web 127 and ribs 128 connect the inner ring 125 and outer ring 126. The inner ring 125 is preferably longer than the outer ring 126. The radially oriented ribs 128 extend separately from one another in the axial direction of the inner and outer rings 125, 126.

The elastic damping element 123 comprises an inner ring 129, an outer ring 130, a central web 131 and ribs 132. The central web 131 and the ribs 132 connect the inner ring 129 and outer ring 130. The radially oriented ribs 132 extend separately from one another in the axial direction of the inner and outer rings 129, 130.

The facing 122 is disposed coaxially with the elastic damping element 123 and surrounds the elastic damping element 123.

The facing 122 and the elastic damping element 123 have different material properties and in particular, a spring stiffness (spring constant) of the facing 122 is higher than a spring stiffness (spring constant) of the damping element 123.

The facing 122 is made from a wear-resistant plastic, for example polyurethane, with a hardness of at least 70 Shore A (DIN 53505). A plastic with a hardness in the range of 60 to 100 Shore A (DIN 53505) is preferably selected.

The elastic damping element 123 is made from an elastomeric material with a hardness of at most 50 Shore A (DIN 53505). A plastic with a hardness in the range of 30 to 50

Shore A (DIN 53505) is preferably selected. The elastomeric material may be polyurethane or a rubber or silicone rubber blend.

The wheel hub 121 may be made from metal or a plastic. The plastic of the wheel hub 121 may be a polyamide, for example. It is preferable to use a fiber-reinforced plastic. If the wheel hub 121 is made from plastic, as illustrated, the bearing bush 124 is pressed into the end-to-end bore of the wheel hub 121. If the wheel hub 121 is made from metal, for example an aluminum alloy, the bearing bush 124 can be dispensed with and the running wheel 29' is then pushed onto the drive shaft directly.

The running wheel 29' (wheel hub 121, facing 122 and damping element 123) may be produced integrally by injection molding, in particular multi-component injection molding. The plastic material is then injection molded onto the bearing bush 124. The bearing bush 124 is therefore embedded in the plastic material.

It is also possible for only the facing 122 and damping element 123 to be produced integrally from plastic by injection molding, in particular multi-component injection molding, and the wheel hub 121 is made from metal. The plastic material is then injection molded onto the wheel hub 121 on the outer ring 126. If the wheel hub 121 is also made from plastic, however, the prefabricated components, namely the first component consisting of the facing 122 and damping element 123 and the second component being the wheel hub 121, can be connected to one another by a joining process. The joining process may or may not involve the use of an additional material, in particular adhesive.

Alternatively, the wheel hub 121, facing 122 and damping element 123 may each be made from plastic by injection molding and the prefabricated components are then connected to one another by a joining process. The joining process may or may not involve the use of an additional material, in particular adhesive.

Although not illustrated, the elastic damping element 123 may also be formed by a simple cylindrical plastic coat (elastomeric material) between the wheel hub 121 and facing 122. The plastic coat has a hardness of at most 50 Shore A (DIN 53505).

FIGS. 30 and 31 illustrate one possible embodiment of the base frame 27 and travel drive 133 of the transport vehicle 7. As may be seen in FIG. 30, the guide unit, for example guide unit 31 (or the guide unit 60; 62; 74; 86), described above is disposed on a first side of the base frame 27 of the travel drive 133 and on a second side of the base frame 27. Two guide units 31 (or guide units 60; 62; 74; 86) are preferably provided, which are disposed on one of the sides of the base frame 27. The guide units 31 (or guide units 60; 62; 74; 86) are disposed in the region close to the running wheels 29 provided on the (second) side of the base frame 27. Also disposed on this side of the base frame 27 is the contact line arrangement 37 (FIG. 6) described above.

Two running wheels 29 are mounted on each drive shaft 134. The drive shafts 134 are respectively mounted on the base frame 27 by means of bearing devices 135. The bearing devices 135 of each drive shaft 134 respectively have at least one elastically flexible compensating element 136 (FIG. 31) which is disposed and configured so that the running wheels 29 are able to move in the radial direction relative to the base frame 27. It should be noted that instead of running wheels 29, it would also be possible to use running wheels 29'.

FIG. 31 illustrates one possible embodiment of the bearing devices 135. In the embodiment illustrated, the bearing devices 135 are fixedly mounted on the base frame 27 and respectively comprise a bearing holder 137 on which the elastically flexible compensating element 136 is provided in a receiving bore. The compensating element 136 is provided in the form of an elastically flexible damping ring disposed coaxially with the drive shaft 134. In addition, in order to mount the drive shaft 134, a bearing 138 is provided for each bearing device 135. The compensating element 136 is disposed between the bearing holder 137 and bearing 138. The compensating element 136 is made from an elastomeric material with a hardness of at most 50 Shore A (DIN 53505). A plastic with a hardness in the range of 30 to 50 Shore A (DIN 53505) is preferably selected. The elastomeric material may be polyurethane or a rubber or silicone rubber blend.

For example, the bearing 138 may be injection molded with a simple cylindrical plastic coat (which forms the damping ring) and this prefabricated component is connected to a bearing holder 137 made from metal by a joining process. The joining process may or may not involve the use of an additional material, in particular adhesive.

As may be seen in FIG. 30, the travel drive 133 comprises a drive motor 30 and a traction drive coupled with the drive motor 30, for example. The running wheels 29 on a first side of the base frame 27 disposed one after the other in a travel direction (double arrow) are drivingly connected via a traction means 139 of the traction drive and in addition, the running wheels 29 on the second side of the base frame 27 are drivingly connected respectively to the running wheels 29 on the first side of the base frame 27 via a drive shaft 134. The traction means 139 is coupled with the drive motor 30.

In principle, however, a drive concept whereby only one of the drive shafts 134 is motor driven would also be possible.

Finally, it should be pointed out that a combination of mechanical means (FIG. 7, 8; 9, 10; 11, 12; 13; 14; 15; 27; 30) and motor-driven means (FIGS. 17 to 26) may also prove to be of advantage. This may be the case in particular if the unit load receiving devices 7 are moved in a highly dynamic manner and turbulent air turbulence is generated. This being the case, the vibrations induced in the storage rack 1 by the traveling movement may be minimized by providing the bearing device 46; 61; 63; 75; 87, as described above, and shifting of the unit loads 95-1, 95-2 largely prevented if unit loads 95-1 having a calculated unit load-property characteristic value specific to the unit load below the set threshold value are stored in the "non-critical" storage spaces 96-2 (see FIG. 25). Similarly, a combination of the mechanical feature for the guide units 31; 60; 62; 74; 86 (FIG. 7; 8; 9, 10; 11, 12; 13; 14; 15) and the mechanical feature for the running wheels 29' (FIGS. 27 to 29) and/or mounting of the running wheels 29 (FIGS. 30 and 31) is also possible.

The embodiments illustrated as examples represent possible variants of the transport vehicle (unit load receiving device) and guide unit, and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

Furthermore, individual features or combinations of features from the different embodiments illustrated and described may be construed as independent inventive solutions or solutions proposed by the invention in their own right.

Above all, the individual embodiments of the subject matter illustrated in FIGS. 1 to 31 constitute independent solutions proposed by the invention in their own right.

For the sake of good order, finally, it should be pointed out that, in order to provide a clearer understanding of the structure of the transport vehicle and guide unit, they and their constituent parts are illustrated to a certain extent out of scale and/or on an enlarged scale and/or on a reduced scale.

| List of reference numbers | |
|---|---|
| 1 | Storage rack |
| 2 | Unit load-handling unit |
| 3 | Rack aisle |
| 4 | Conveyor system |
| 5 | Conveyor system |
| 6 | Unit load |
| 7 | Transport vehicle |
| 8 | Storage channel |
| 9 | Front rack post |
| 10 | Rear rack post |
| 11 | Front longitudinal member |
| 12 | Rear longitudinal member |
| 13 | Transverse member |
| 14 | Control unit/control system |
| 15 | Transport device |
| 16 | Driving plane |
| 17 | Unit load lifting device |
| 18 | Buffer device |
| 19 | Lifting drive |
| 20 | Transport device |
| 21 | Drive motor |
| 22 | Conveyor drive |
| 23 | Waiting device |
| 24 | Waiting device |
| 25 | Conveyor drive |
| 26 | Conveyor drive |
| 27 | Base frame |
| 28 | Receiving platform |
| 29 | Running wheel |
| 30 | Drive motor (travel drive) |
| 31 | Guide unit |
| 32 | Drive motor (transport device) |
| 33 | Electronic control system |
| 34 | Sensor |
| 35 | Sensor |
| 36 | First guide |
| 37 | Contact line arrangement |
| 38 | Telescopic unit |
| 39 | Base frame |
| 40 | First rail |
| 41 | Second rail |
| 42 | Drive device |
| 43 | First belt |
| 44 | Second belt |
| 45 | Transport element |
| 46 | Bearing device |
| 47 | Second guide |
| 48 | Guide section |
| 49 | Guide wheel |
| 50 | Mounting bore |
| 51 | Recess |
| 52 | Bearing body |
| 53 | Compensating element |
| 54 | Compensating element |
| 55 | Stop plate |
| 56 | Stop plate |
| 57 | Fixing element |
| 58 | Spacer sleeve |
| 59 | Recess |
| 60 | Guide unit |
| 61 | Bearing device |
| 62 | Guide unit |
| 63 | Bearing device |
| 64 | Bearing body |
| 65 | Bearing arm |
| 66 | Bearing arm |
| 67 | Compensating element |
| 68 | Compensating element |
| 69 | Mount |
| 70 | Mounting block |
| 71 | Fixing element |
| 72 | Mounting plate |
| 73 | Fixing means |
| 74 | Guide unit |
| 75 | Bearing device |
| 76 | Bearing body |
| 77 | Bearing arm |
| 78 | Bearing arm |
| 79 | Compensating element |
| 80 | Compensating element |
| 81 | Axle |
| 82 | Bearing sleeve |
| 83 | Inner sleeve |
| 84 | Elastomer ring |
| 85 | Bearing collar |
| 86 | Guide unit |
| 87 | Bearing device |
| 88 | Second guide |
| 89 | First bearing body |
| 90 | Second bearing body |
| 95 | Unit load |
| 96 | Storage space |
| 97 | Unit load receiving device |
| 98 | Storage rack |
| 99 | Rack aisle |
| 100 | Front rack post |
| 101 | Rear rack post |
| 102 | Front longitudinal member |
| 103 | Rear longitudinal member |
| 104 | Transverse member |
| 105 | Mast |
| 106 | Running gear |
| 107 | Receiving platform |
| 108 | Lifting drive |
| 109 | Travel drive |
| 110 | Bottom guide track |
| 111 | Top guide track |
| 112 | Detection device |
| 113 | Measuring device |
| 114 | Evaluation module |
| 115 | Control system |
| 116 | Warehouse management computer |
| 117 | Memory module |
| 118 | Storage surface |
| 119 | Control module |
| 120 | Comparison module |
| 121 | Wheel hub |
| 122 | Facing |
| 123 | Damping element |
| 124 | Bearing bush |
| 125 | Inner ring wheel hub |
| 126 | Outer ring wheel hub |
| 127 | Central web wheel hub |
| 128 | Ribs wheel hub |
| 129 | Inner ring damping element |
| 130 | Outer ring damping element |
| 131 | Central web damping element |
| 132 | Ribs damping element |
| 133 | Travel drive |
| 134 | Drive shaft |
| 135 | Bearing device |
| 136 | Compensating element |
| 137 | Bearing holder |
| 138 | Bearing |
| 139 | Traction means |

The invention claimed is:

1. Storage system having storage racks (1) having adjacently disposed storage channels (8) in rack levels lying respectively one above the other, a rack aisle (3) between the storage racks (1), guide tracks (11) which are attached to the storage racks (1) and which are disposed respectively in pairs in driving planes (16) lying one above the other, one of the guide tracks (11) of the pairs of guide tracks in each driving plane (16) forming a first guide (36) and a second guide (47), and the first guide (36) extends parallel with the longitudinal direction of the storage rack (1) and in a first guide plane extending parallel with the driving plane (16), and the second guide (47) extends parallel with the longitudinal direction of the storage rack (1) and in a second guide plane intersecting the driving plane (16), one or more transport vehicles (7) for storing unit loads (6-1, 6-2) in the storage rack (1) and removing unit loads (6-1, 6-2) from the storage rack (1) which is able to move along the guide tracks (11), the transport vehicle (7) comprising:

a base frame (27), running wheels (29), of which first running wheels (29) on a first vehicle side lie on the first guide (36) of the first guide track (11) in a rollable manner and second running wheels (29) on a second vehicle side lie on the first guide (36) of a second guide track (11) in a rollable manner, the running wheels (29) being rotatably mounted on the base frame (27), a travel drive (30) which is coupled with at least one running wheel (29), a transport device (15) for storing unit loads (6-1, 6-2) in the storage channels (8) and removing unit loads (6-1, 6-2) from the storage channels (8), at least one guide unit (31), which is mounted on the base frame (27) via a bearing device (46) and which has guide wheels (49) on both sides of the second guide (47) which rest on the second guide (47) in a rollable manner on guide sections (48) facing away from one another in order to move the transport vehicle (7) in a guided manner during the travel movement along the storage rack (1) transversely to the second guide plane, and the bearing device (46) has a bearing body (52) on which the guide wheels (49) of the at least one guide unit (31) are rotatably disposed at a fixed distance, wherein the bearing device (46) additionally has an elastically flexible first compensating element (53) and an elastically flexible second compensating element (54), and the compensating elements (53, 54) are disposed in mirror image on both sides of the base frame (27) and one of the compensating elements (53, 54) is disposed between the base frame (27) and the bearing body (52) and the compensating elements (53, 54) are configured such that the bearing body (52) with the guide wheels (49) is movable relative to the base frame (27).

2. Storage system according to claim 1, wherein the elastically flexible compensating elements (53, 54) are respectively a preferably biased spring element.

3. Storage system according to claim 1, wherein the compensating element (53, 54) is a compensating plate made from plastic, in particular elastomer, or rubber.

4. Storage system according to claim 1, wherein the transport vehicle (7) is equipped with two guide units (31) on one vehicle side.

5. Storage system according to claim 1, wherein at least two of the running wheels (29; 29') are attached to a drive shaft (134) and the drive shaft (134) is mounted on the base frame (27) via bearing devices (135), and the bearing devices (135) each have at least one elastically flexible compensating element (136) which is disposed and configured such that the running wheels (29; 29') are movable in radial direction relative to the base frame (27).

6. Storage system according to claim 1, wherein two running wheels (29; 29') are attached to a drive shaft (134) in each case and the drive shafts (134) are each mounted on the base frame (27) via bearing devices (135), and the bearing devices (135) of each drive shaft (134) respectively have at least one elastically flexible compensating element (136) which is disposed and configured such that the running wheels (29; 29') are movable in radial direction relative to the base frame (27).

7. Storage system according to claim 1, wherein the running wheels (29') respectively have a wheel hub (121) and a facing (122) disposed coaxially with the wheel hub (121) and additionally an elastic damping element (123) between the wheel hub (121) and the facing (122), and the running wheels (29') lie on the first guide (36) by means of the facing (122) in a rollable manner.

8. Storage system according to claim 7, wherein the elastic damping element (123) is disposed coaxially with the wheel hub (121) and the elastic damping element (123) comprises
an inner ring (129),
an outer ring (130),
a central web (131) connecting the inner ring (129) and outer ring (130), and
ribs (132) which extend separately from one another in the axial direction of the inner and outer rings (129, 130) and which connect the inner ring (129) and outer ring (130).

9. Storage system according to claim 7, wherein the wheel hub (121) comprises
an inner ring (125),
an outer ring (126),
a central web (127) connecting the inner ring (125) and outer ring (126), and
ribs (128) which extend separately from one another in the axial direction of the inner and outer rings (125, 126) and which connect the inner ring (125) and outer ring (126).

10. Method for storing different unit loads (95-1, 95-2, 95-3) in at least one storage rack (1; 98) having adjacently disposed storage spaces (96-1, 96-2) in storage levels lying one above the other, whereby the unit loads (95-1, 95-2, 95-3) are conveyed to the storage spaces (96-1, 96-2) by means of at least one unit load receiving device (7; 97) which can be moved along a guide track (11; 110, 111) in front of the storage rack (1; 98) and from the unit load receiving device (7; 97) into the storage rack (1; 98) onto the storage spaces (96-1, 96-2) by means of a transport device (15),
comprising the steps
detecting the density (unit load-property characteristic value specific to the unit load) for every unit load (95-1, 95-2, 95-3) by means of a control system (14; 115),
detecting at least one threshold value for the density of the unit load by means of the control system (14; 115),
comparing the density detected for each unit load (95-1, 95-2, 95-3) with the at least one threshold value for the density of the unit load by means of the control system (14; 115),
assigning the storage spaces (96-1, 96-2) to a first storage space category and to a second storage space category and detecting these storage space categories by means of the control system (14; 115), a storage space of the first storage space category being a storage space (96-1) on which a load unit (95-2) deposited thereon will have a higher tendency to shift due to the traveling movements of the at least one load unit receiving device (7; 97), and a storage space of the second storage space category being a storage space (96-2) on which a load unit (95-1) deposited thereon will have a lower tendency to shift due to the traveling movements of the at least one unit load receiving device (7; 97), determining unoccupied storage spaces (96-1) of the first storage space category and determining unoccupied storage spaces (96-2) of the second storage space category by means of the control system (14; 115), storing the unit loads (95-1, 95-2) selectively in storages spaces (96-1, 96-2) of the first storage space category and second storage space category in order to prevent unacceptable shifting of the unit loads (95-1, 95-2) in the storage rack (1; 98) when the unit loads (95-1, 95-2) have been deposited on the storage spaces (96-1, 96-2) of the first storage space category and second storage space category, the process of storing the unit loads (95-1, 95-2) comprising the steps:

storing first unit loads (95-1) by means of the unit load receiving device (7; 97) and transport device (15) in unoccupied storage spaces (96-2) of the second storage space category if a deviation falling below a threshold value is determined, and storing second unit loads (95-2) by means of the unit load receiving device (7; 97) and transport device (15) in unoccupied storage spaces (96-1) of the first storage space category if a deviation exceeding a threshold value is determined.

11. Method according to claim 10, wherein in the storage levels lying one above the other, the storage rack (1; 98) has adjacent storage spaces (96-1, 96-2) respectively at a first depth position and a second depth position lying behind, and the storage spaces (96-2) of the second storage space category lie in the second depth position and the first unit loads (95-1) are stored in the storage spaces (96-2) in the second depth position.

12. Method according to claim 10, wherein a length/width/height dimension and a weight are detected for every unit load (95-1, 95-2, 95-3) and the unit load-property characteristic value is determined from the volume dimension and weight measurement.

13. Method according to claim 10, wherein a weight of every unit load (95-1, 95-2, 95-3) is determined by means of a measuring device (113) after a picking operation and the unit load-property characteristic value is determined again from the volume dimension and the detected weight prior to storage.

14. Method for storing different unit loads (95-1, 95-2, 95-3) in at least one storage rack (1; 98) having adjacently disposed storage spaces (96-1, 96-2) in storage levels lying one above the other, whereby the unit loads (95-1, 95-2, 95-3) are conveyed to the storage spaces (96-1, 96-2) by means of at least one unit load receiving device (7; 97) which can be moved along a guide track (11; 110, 111) in front of the storage rack (1; 98) and from the unit load receiving device (7; 97) into the storage rack (1; 98) onto the storage spaces (96-1, 96-2) by means of a transport device (15), comprising the following steps:

detecting a unit load-property characteristic value specific to the unit load for every unit load (95-1, 95-2, 95-3), in particular a density of the unit loads, by means of a control system (14; 115), detecting at least one threshold value for a unit load-property characteristic value, in particular a density of the unit load, by means of the control system (14; 115), comparing the detected unit load-property characteristic values with the at least one threshold value for the unit load-property characteristic value by means of the control system (14; 115), designating storage space categories prior to starting up the storage system for some of the storage spaces (96-1, 96-2) or each of the storage spaces (96-1, 96-2) based on the vibration behavior of the storage rack (1; 98) and/or a knowledge of the air flows (air turbulence) induced by the dynamic traveling movement of the unit load receiving device (7; 97), assigning the storage spaces (96-1, 96-2) to a first storage space category and to a second storage space category and detecting these storage space categories by means of the control system (14; 115), a storage space of the first storage space category being a storage space (96-1) on which a load unit (95-2) deposited thereon has a higher tendency to shift due to the traveling movements of the at least one load unit receiving device (7; 97) and a storage space of the second storage space category being a storage space (96-2) on which a load unit (95-1) deposited thereon has a lower tendency to shift due to the traveling movements of the at least one load unit receiving device (7; 97), determining unoccupied storage spaces (96-1) of the first storage space category and determining unoccupied storage spaces (96-2) of the second storage space category by means of the control system (14; 115), storing the unit loads (95-1, 95-2), the process of storing the unit loads (95-1, 95-2) comprising the steps:

storing first unit loads (95-1) by means of the unit load receiving device (7; 97) and transport device (15) in unoccupied storage spaces (96-2) of the second storage space category if a deviation falling below a threshold value is determined, and storing second unit loads (95-2) by means of the unit load receiving device (7; 97) and transport device (15) in unoccupied storage spaces (96-1) of the first storage space category if a deviation exceeding a threshold value is determined.

* * * * *